United States Patent
Wen et al.

(10) Patent No.: US 12,061,636 B1
(45) Date of Patent: Aug. 13, 2024

(54) DIALOGUE CONFIGURATION SYSTEM AND METHOD

(71) Applicant: PolyAI Limited, London (GB)

(72) Inventors: Tsung-Hsien Wen, London (GB); Ivan Vulić, London (GB); Nikola Mrkšić, London (GB); Pei-Hao Su, London (GB); Pawel Franciszek Budzianowski, London (GB); Răzvan-Emanuel Kusztos, London (GB); Paul Julian Annetts, London (GB); Ho Man Yau, London (GB); Catherine Rachel Oxley, London (GB); Emmanuel Sevrin, London (GB); Vincent Yohann Dollet, London (GB); Iñigo Casanueva Perez, London (GB); Benjamin Peter Levin, London (GB); Duong Hà Anh Nguyên, London (GB); Swaroop Jagadeesh, London (GB); Qian Zheng, London (GB); Joshua Luke Jeffries Hook, London (GB); Samuel John Coope, London (GB)

(73) Assignee: POLYAI LIMITED, London (GB)

( * ) Notice: Subject to any disclaimer, the term of this patent is extended or adjusted under 35 U.S.C. 154(b) by 0 days.

(21) Appl. No.: 18/317,656

(22) Filed: May 15, 2023

(51) Int. Cl.
G10L 15/22 (2006.01)
G06F 16/332 (2019.01)
G10L 15/26 (2006.01)

(52) U.S. Cl.
CPC .......... G06F 16/3329 (2019.01); G10L 15/26 (2013.01)

(58) Field of Classification Search
CPC ................................ G10L 15/22; G10L 15/08
See application file for complete search history.

(56) References Cited

U.S. PATENT DOCUMENTS 6,173,266 B1 * 1/2001 Marx ............... H04M 3/527
704/E15.04
10,546,067 B2 1/2020 Gelfenbeyn et al.
(Continued)

FOREIGN PATENT DOCUMENTS

GB 2606081 A 10/2022

OTHER PUBLICATIONS

Casanueva et al., "Efficient Intent Detection with Dual Sentence Encoders", Proceedings of the 2nd Workshop on Natural Language Processing for Conversational AI, pp. 38-45, Jul. 9, 2020.
(Continued)

Primary Examiner — Jialong He
(74) Attorney, Agent, or Firm — Pillsbury Winthrop Shaw Pittman, LLP

(57) ABSTRACT

A dialogue system, comprising: a first input configured to obtain first input data relating to speech or text provided by a user through a first interface; a first output configured to provide first output data relating to speech or text information specified by a determined dialogue act through the first interface; one or more processors, configured to: receive second input data through a second interface; store information specifying one or more configuration settings based on the second input data; and perform a dialogue method using a dialogue platform, the dialogue method comprising: determining dialogue information from the first input data; determining a dialogue act based on the determined dialogue information using a dialogue management module, wherein determining the dialogue act comprises selecting a next state from a plurality of states stored in the dialogue management module, wherein at least some of the plurality of states comprise information specifying a dialogue act and at least some of the plurality of states comprise transition information specifying a transition to another state, the transitions
(Continued)

defining one or more dialogue pathways, wherein selecting the next state comprises selecting a state which is specified by the transition information in a current state or selecting a state which is specified by a rule in a first set of one or more rules, wherein at least one of the plurality of states comprises stored information specifying a configuration setting based on the second input data; updating a configuration of the dialogue platform for the next user input when the selected next state comprises stored information specifying a configuration setting. See FIG. 1(b).

20 Claims, 30 Drawing Sheets

(56) References Cited

U.S. PATENT DOCUMENTS

| | | | |
|---|---|---|---|
| 11,132,988 | B1 | 9/2021 | Steedman Henderson et al. |
| 11,210,306 | B2 | 12/2021 | Steedman Henderson et al. |
| 11,430,446 | B1 | 8/2022 | Wen et al. |
| 11,537,661 | B2 | 12/2022 | Coope et al. |
| 2019/0354874 | A1 | 11/2019 | Shah et al. |
| 2020/0050669 | A1* | 2/2020 | Hiraoka .................. G06N 3/006 |
| 2020/0152184 | A1* | 5/2020 | Steedman Henderson .................. G10L 15/1822 |
| 2021/0124562 | A1* | 4/2021 | Kannan ................ G10L 15/1815 |
| 2021/0141799 | A1 | 5/2021 | Steedman Henderson |
| 2021/0249002 | A1 | 8/2021 | Ahmadidaneshashtiani et al. |
| 2021/0368844 | A1 | 12/2021 | Meydani et al. |
| 2022/0107979 | A1 | 4/2022 | Coope et al. |

OTHER PUBLICATIONS

Henderson et al., ConVEx: "Data-Efficient and Few-Shot Slot Labeling", Proceedings of the 2021 Conference of the North American Chapter of the Association for Computational Linguistics: Human Language Technologies, pp. 3375-3389, Jun. 6-11, 2021.

Fuisz et al., "Improved and Efficient Conversational Slot Labeling through Question Answering", arXiv:2204.02123v1 [cs.CL], pp. 1-12, Apr. 5, 2022.

Moore et al., "Conversational UX Design", In Proceedings of the 2017 CHI Conference Extended Abstracts on Human Factors in Computing Systems (CHI EA '17), Association for Computing Machinery, New York, NY, USA, pp. 492-497, May 6-11, 2017.

"SIP URI scheme", Wikipedia.org, retrieved Aug. 23, 2023, pp. 1-3, available at <https://en.wikipedia.org/wiki/SIP_URI_scheme>.

"Asterisk (PBX)", Wikipedia.org, retrieved Aug. 23, 2023, pp. 1-4, available at <https://en.wikipedia.org/wiki/Asterisk_(PBX)>.

Joy, Margaret, "SIP vs VoIP: A Simple Guide to Similar but Different Terms", retrieved Aug. 23, 2023, pp. 1-2, available at <https://www.onsip.com/voip-resources/voip-fundamentals/sip-vs-voip>.

"How to Improve Recognition of Specific Words", NVIDIA, dated Jul. 18, 2023, pp. 1-5, available at <https://docs.nvidia.com/deeplearning/riva/user-guide/docs/tutorials/asr-improve-recognition-for-specific-words.html#word-boosting>.

"Improve transcription results with model adaptation", Google Cloud, dated Aug. 14, 2023, pp. 1-14, available at <https://cloud.google.com/speech-to-text/docs/adaptation-model>.

"Dialogflow CX documentation", Google Cloud, retrieved Aug. 23, 2023, pp. 1-2, available at <https://cloud.google.com/dialogflow/cx/docs>.

"TwiML™ for Programmable Voice", Twilio, retrieved Aug. 23, 2023, pp. 1-13, available at <https://www.twilio.com/docs/voice/twiml>.

Braun, Daniel, et al., "Evaluating natural language understanding services for conversational question answering systems", Aug. 2017, In Proceedings of SIGDIAL, pp. 174-185.

Henderson, Matthew, et al., "ConveRT: Efficient and accurate conversational representations from transformers", Apr. 29, 2020, arXiv preprint arXiv: 1911.03688, pp. 1-11.

* cited by examiner

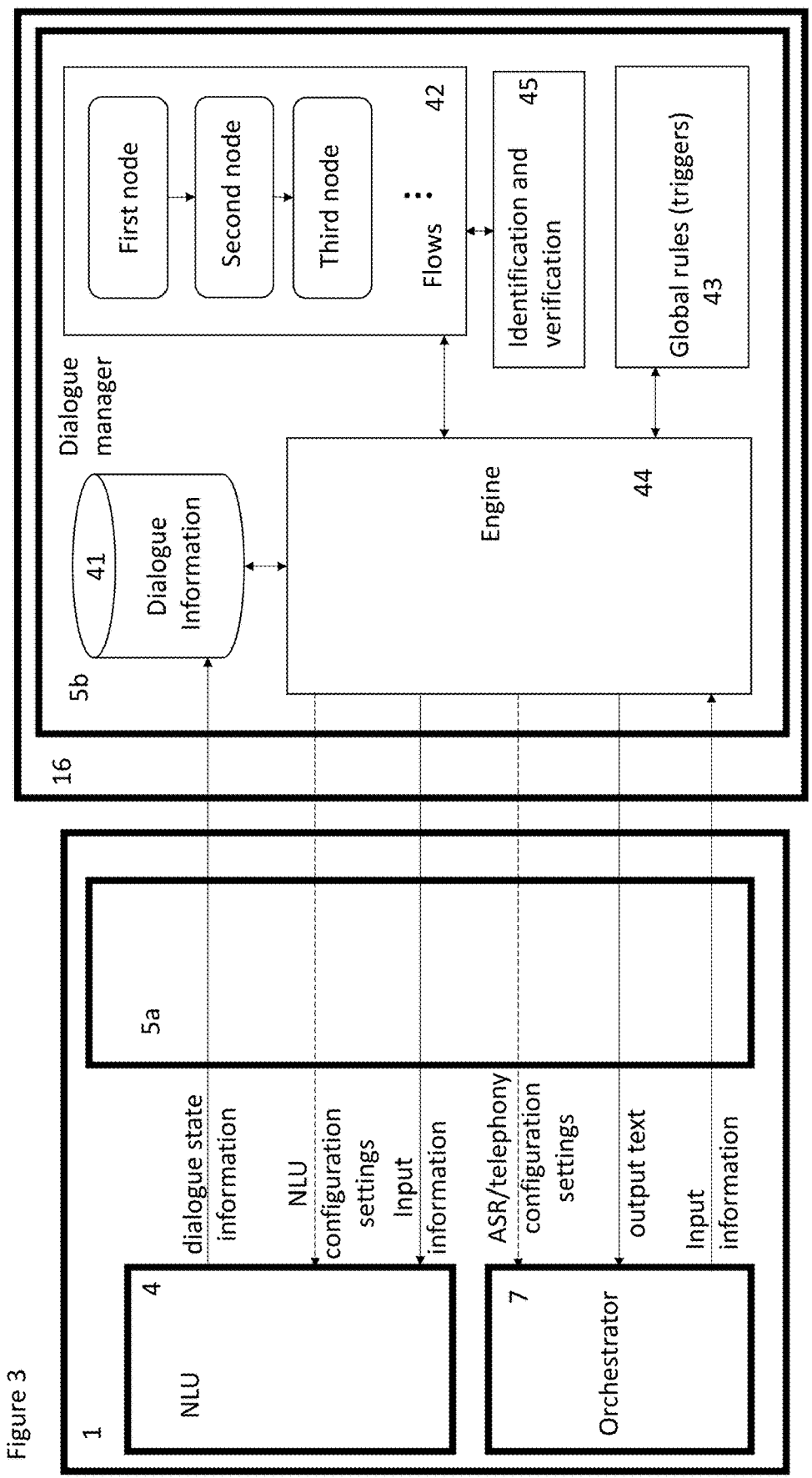

BUILD

- Flows
- Intents
- Entities
- Audio
- Data Store
- Scenarios

ANALYZE
Analytics, Conversations log

CONFIGURE
Phone numbers, Language

Flows
20 flows ( Create flow )

1 - 20 of 20 results                                                                 Page 1 of 1

| | Flow name | Tags | Description | Variants | Trigger |
|---|---|---|---|---|---|
| ☐ | main | | main flow containing the StartNode | 1 | None |
| ☐ | global | | global flow containing Silence and OOD nodes | 1 | ⚡ |
| ☐ | airport | | airport | 1 | ⚡ |

DIALOGUE CONFIGURATION SYSTEM AND METHOD

FIELD

The present disclosure relates to a dialogue system and a dialogue method.

BACKGROUND

Dialogue systems, or conversational user interfaces, for example chatbots or voice-based agents, are used in many applications, such as voice or chat-based search, recommendation, and booking. For example, a dialogue system for restaurant reservation should help a user to book a reservation at the restaurant, such that when a user asks "Can I make a booking for 4 people on Saturday", the dialogue system might respond with "What time would you like the booking?".

Inaccuracies in processing of the user input by the dialogue system can lead to inefficiencies in conversations with dialogue systems. For example, a dialogue system may receive a spoken user input and perform automatic speech recognition to convert the spoken user input to text. The text is then processed by the dialogue system to formulate the system response to the user. An inaccuracy in the automatic speech recognition may cause the dialogue system to output an incorrect response.

There is a continuing need to improve the functioning and efficiency of such dialogue systems.

SUMMARY

According to a first aspect, there is provided a dialogue system, comprising:
 a first input configured to obtain first input data relating to speech or text provided by a user through a first interface;
 a first output configured to provide first output data relating to speech or text information specified by a determined dialogue act through the first interface;
 one or more processors, configured to:
  receive second input data through a second interface;
  store information specifying one or more configuration settings based on the second input data; and
  perform a dialogue method using a dialogue platform, the dialogue method comprising:
   determining dialogue information from the first input data;
   determining a dialogue act based on the determined dialogue information using a dialogue management module, wherein determining the dialogue act comprises selecting a next state from a plurality of states stored in the dialogue management module, wherein at least some of the plurality of states comprise information specifying a dialogue act and at least some of the plurality of states comprise transition information specifying a transition to another state, the transitions defining one or more dialogue pathways, wherein selecting the next state comprises selecting a state which is specified by the transition information in a current state or selecting a state which is specified by a rule in a first set of one or more rules, wherein at least one of the plurality of states comprises stored information specifying a configuration setting based on the second input data;
   updating a configuration of the dialogue platform for the next user input when the selected next state comprises stored information specifying a configuration setting.

Inaccuracies in processing of user input by dialogue systems can lead to inefficiencies. For example, a dialogue system may receive a spoken user input and perform automatic speech recognition to convert the spoken user input to text. The text is then processed by the dialogue system to formulate the system response to the user. In particular, dialogue information is extracted from the text using a language module. The language module may be configured to perform value extraction and intent detection for example. A dialogue act is determined based on the determined dialogue information using a dialogue management module. An inaccuracy in the automatic speech recognition may cause the dialogue system to output an incorrect response. An inaccuracy in extraction of the dialogue information may also cause the dialogue system to output an incorrect response.

The disclosed system provides an improvement in the technical field of dialogue systems, by solving the problem of efficient dialogue resolution. Goal-oriented dialogue systems in particular search and interact with large databases which contain information about a dialogue domain. In the disclosed dialogue system, the dialogue platform configuration is updated based on the provided configuration settings at the relevant points in the dialogue. This allows the platform to be configured differently per user input, enabling a more accurate understanding and response to the user input to be provided. This means that the user goal may be reached more quickly. For goal-oriented dialogue systems, the database may be accessed a reduced number of times for example.

In one example, the dialogue platform comprises the first interface comprising a telephony module configured to process the first input data, a speech recognition module configured to convert input speech data to text data, a language module configured to determine the dialogue information, a voice composer module configured to generate first output data relating to speech from the determined dialogue act and an orchestrator module configured to provide data to and receive data from the telephony module, the speech recognition module, the dialogue management module and the voice composer module.

In one example, the one or more processors are further configured to include a state in the plurality of states based on the second input data.

In one example, the dialogue platform comprises a language module configured to determine the dialogue information from the first input data, and wherein a first state of the plurality of states comprises stored information specifying a first configuration setting based on the second input data which is a configuration setting of the language module.

In one example, the first configuration setting specifies a type of dialogue information.

In one example, the language module is configured to determine a value corresponding to one or more slots, wherein the first state specifies a dialogue act corresponding to a request for a value for a first slot and wherein the first configuration setting specifies the slot.

In one example, the language module comprises a plurality of models, wherein the first configuration setting specifies a model from the plurality of models to be used to determine the dialogue information for the next user input.

In one example, the dialogue platform comprises a speech recognition module configured to convert input speech data to text data and wherein a first state of the plurality of states comprises stored information specifying a first configuration setting based on the second input data which is a configuration setting of the speech recognition module.

In one example, the first configuration setting specifies one or more of: a first time period corresponding to a length of time in which a user speaks before an interjection, a second time period corresponding to a length of time to wait for a user input, a list of expected words or phrases, or a speech recognition model from a set of two or more speech recognition models in the speech recognition module to be used for the next user input.

In one example, the language module is configured to determine an intent, wherein the second input data comprises information specifying one or more intents, and wherein the language module comprises an intent classifier that is trained based on the information specifying the one or more intents.

In one example, the first interface comprises a telephony module, and wherein a first state of the plurality of states comprises stored information specifying a first configuration setting based on the second input data which is a configuration setting of the telephony module.

In one example, the configuration setting of the telephony module comprises an indication of an expected channel for a user input.

In one example, a first state of the plurality of states comprises stored information specifying a first configuration setting based on the second input data which is a configuration setting of the orchestrator module.

In one example, the first configuration setting specifies whether user input received during a time period when the dialogue management module is determining a dialogue act is processed by the dialogue management module.

In one example, the one or more processors are further configured to display a visual representation of the plurality of states through the second interface.

In one example, the one or more processors are further configured to:
  receive third input data through a third interface, wherein the third interface is a command line interface; and
  store information specifying one or more configuration settings based on the third input data.

In one example, the second input data is received as an edit to the displayed representation of the plurality of states.

In one example, the speech recognition module is configured to detect a language of the user input.

According to another aspect, there is provided a dialogue method, comprising:
  receiving second input data through a second interface;
  storing information specifying one or more configuration settings based on the second input data;
  receiving, by way of a first input, first input data relating to speech or text provided by a user through a first interface;
  performing a dialogue method using a dialogue platform, the dialogue method comprising:
    determining dialogue information from the first input data;
    determining a dialogue act based on the determined dialogue information using a dialogue management module, wherein determining the dialogue act comprises selecting a next state from a plurality of states stored in the dialogue management module, wherein at least some of the plurality of states comprise information specifying a dialogue act and at least some of the plurality of states comprise transition information specifying a transition to another state, the transitions defining one or more dialogue pathways, wherein selecting the next state comprises selecting a state which is specified by the transition information in a current state or selecting a state which is specified by a rule in a first set of one or more rules, wherein at least one of the plurality of states comprises stored information specifying a configuration setting based on the second input data;
    outputting, by way of a first output, first output data relating to speech or text information specified by the determined dialogue act through the first interface; and
  updating a configuration of the dialogue platform for the next user input when the selected next state comprises stored information specifying a configuration setting.

According to another aspect, there is provided a non-transitory computer readable storage medium comprising computer readable code configured to cause a computer to perform the method.

According to another aspect, there is provided a carrier medium comprising computer readable code configured to cause a computer to perform the above methods. The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

BRIEF DESCRIPTION OF FIGURES

Systems and methods in accordance with non-limiting examples will now be described with reference to the accompanying figures in which:

FIG. 1(*b*) shows a schematic illustration of various functional modules or units of a dialogue program 12 which may be used in a dialogue system 100 according to an example;

FIG. 1(*c*) shows a schematic illustration of an example project code 16;

FIG. 1(*d*) shows a schematic illustration of an example method performed by the dialogue platform 1 together with the program code 16 during a dialogue turn;

FIG. 2(*b*) is a schematic illustration of an example ASR module 3;

FIG. 3 shows a schematic illustration of an example project dialogue manager module 5*b*;

FIG. 8(b) shows a schematic illustration of an example standard value extraction module 83a;

FIG. 12 shows an example functionality provided to the second user in the Build section of the graphical user interface (GUI) provided to the second user;

FIG. 14 shows an input for receiving sentences provided by the graphical user interface according to an example;

DETAILED DESCRIPTION

Figure 1A:
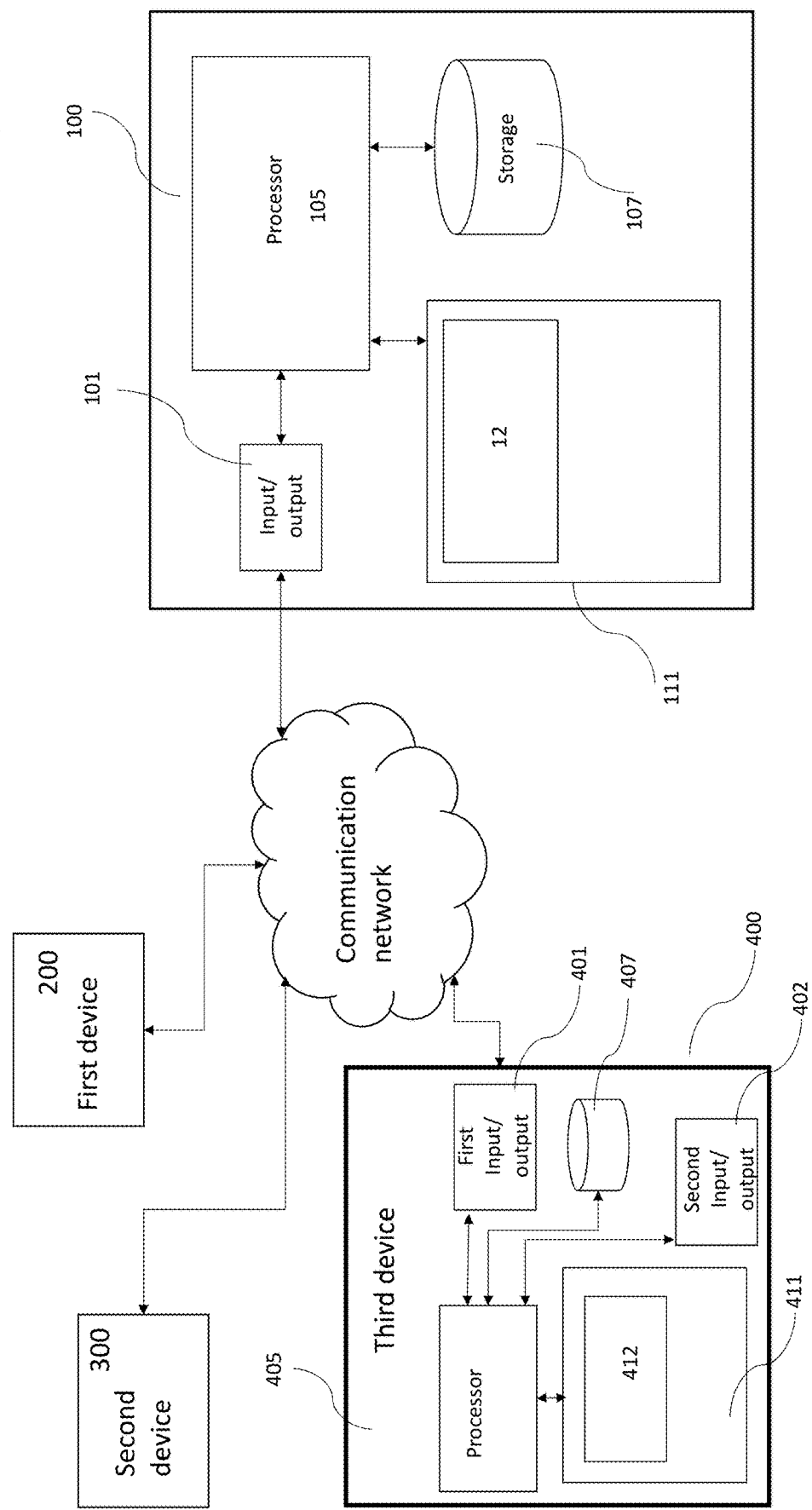
FIG. 1(*a*) is a schematic illustration of a system comprising a dialogue system 100 according to an example, a first device 200, a second device 300 and a third device 400.

FIG. 1(a) is a schematic illustration of a system comprising a dialogue system 100, a first device 200, a second device 300 and a third device 400. The dialogue system 100 is configured to communicate with the first device 200, second device 300 and third device 400 via a communication network, for example the Internet. In this example, the first device 200, second device 300 and third device 400 communicate with the dialogue system 100 through the same communication network, but in other examples, the first device 200 may communicate via a different network for example. For example, the first device 200 may use the telephone network.

The first device 200 is configured to provide output to a first user and to receive input from a first user. In this example, the first user provides spoken inputs and the first device 200 provides audio output to the first user. The first device 200 may be an end user computing device configured to receive and output audio, such as a laptop, tablet computer, desktop computer, or smart phone for example, or some other user device configured to receive and output audio, such as a telephone for example. The first device 200 comprises a microphone for receiving audio inputs from the first user and a speaker for outputting audio outputs to the first user.

Where the first device 200 is a computing device, the first user may interact with the dialogue system 100 through a web-based portal or through an application running on the first device 200 for example. For example, the first user accesses a web-based portal in a web browser running on the first device 200 or accesses an application running on the first device 200 to make a call to a particular telephone number. The first user provides spoken inputs through the web browser or application. The audio signal is then processed and the data sent from the first device 200 to the dialogue system 100 over the communication network. Data received from the dialogue system 100 at the first device 200 over the communication network is then processed and provided as an audio output to the first user through the web-browser or application. Alternatively, where the user device is a telephone, the user interacts with the dialogue system 100 by making a telephone call to a particular number. Audio data is again exchanged with the dialogue system 100 over the communication network.

Although here an example is described in which the dialogue system 100 interacts with the first user through audio, it should be noted that the dialogue system 100 can be configured to interact with the first user with one or both of text and audio signals. Working with text (and not only audio) can allow, for example, hearing impaired and mute people to also use the system. The first device 200 may therefore additionally or alternatively comprise a keyboard for receiving text inputs from the first user and a screen for displaying text outputs to the first user, or a touchscreen for receiving text inputs and displaying text outputs for example.

The third device 400 is configured to provide output to a third user and to receive input from a third user. The third device 400 is an end user computing device, such as a laptop, tablet computer, desktop computer, or smart phone for example. The third device 400 comprises a first input/output component 401, a second input/output component 402, a processor 405, working memory 411, and storage 407. The second input/output component 402 comprises hardware components such as a keyboard, screen and mouse, or a touchscreen, for receiving inputs and displaying outputs to a user. Input data is sent from the third device 400 to the dialogue system 100 over the communication network through the first input/output component 401. Data is received from the dialogue system 100 through the communication network at the third device 400 through the first input/output component 401. The processor 405 accesses the first input/output component 401 and second input/output component 402.

The processor 405 is coupled to the storage 407 and accesses the working memory 411. The processor 405 may comprise logic circuitry that responds to and processes the instructions in code stored in the working memory 411. In particular, when executed, a command line interface program 412 is represented as a software product stored in the working memory 411. The processor 405 is also configured to communicate with the non-volatile storage 407. The storage 407 may contain data that is used by the command line interface program 412 when executed by the processor 405.

The command line interface program 412 runs on the third device 400. A local project file 14 may be created by the third user using the command line interface program 412, and stored on the third device 405. The project file 14 is a local project file which is version controlled, for example by git. The third user uses the command line interface program 412 to create and make changes to the project file 14, and to input commands to run tests, and launch deployments to the platform 1, which will be described below. The third user can edit the local project file 14 on the third device 400, using the command line interface program 412. When a save command is made in the command line interface program 412 running on the third device 400, the local project file 14 stored on the third device 400 is sent to the dialogue system 100. The project file 14 is then stored in the project store 13 on the dialogue system 100, which is a remote repository, and will be described below. Once uploaded into the project store 13, the project file 14 is again version controlled, for example by git. When a deployment command is made in the command line interface program running on the third device 400, a command is sent to the dialogue system 100 to launch the deployment of the project file 14 to the platform 1. This will be described in more detail below.

The second device 300 is configured to provide output to a second user and to receive input from a second user. The second device 200 is also an end user computing device, such as a laptop, tablet computer, desktop computer, or smart phone for example. The second device 300 comprises hardware components such as a keyboard, screen and mouse, or a touchscreen, for receiving inputs and displaying outputs to a user. The second user is also able to create, edit and save a project file 14. However, the second user creates, edits and saves a project file 14 through a graphical user interface (GUI). The GUI may be provided through a web-based portal, through an application or as a program that runs on the second device for example, and is displayed on the second device 300. The second user provides inputs, for example text inputs, selection of items displayed in the GUI, dragging and dropping of items displayed in the GUI, etc. The input data is processed and sent from the second device 300 to the dialogue system 100 through the communication network. Again, when a save command is made, the project file 14 is stored in the project store 13 on the dialogue system 100. When a deployment command is made, a command is sent to the dialogue system 100 to launch the deployment of the project file 14 to the platform 1. Data received from the dialogue system 100 at the second device 300 is displayed in the graphical user interface.

The second user and third user can edit the same project file 14.

The dialogue system 100 in this example comprises one or more servers. The dialogue system 100 comprises an input/output component 101, a processor 105, working memory 111, and storage 107.

The processor 105 is coupled to the storage 107 and accesses the working memory 111. The processor 105 may comprise logic circuitry that responds to and processes the instructions in code stored in the working memory 111. In particular, when executed, a dialogue program 12 is represented as a software product stored in the working memory 111. The dialogue program 12 comprises a dialogue platform 1, which will be described in more detail in relation to FIG. 1(*b*). Execution of the dialogue program 12 by the processor 105 will cause examples as described herein to be implemented.

The processor 105 also accesses the input/output component 101. The input/output component 101 may be a single component or may be divided into a separate input component and output component. Furthermore, multiple input or output components may be provided for receiving and sending different inputs and outputs. The input/output component 101 is configured to receive data transmitted through the communication network and output data to be transmitted through the communication network.

In particular, input data from the first device 200 corresponds in this example to audio. This data is received through the input/output component 101 and processed by the dialogue program 12 through a first interface 8, which will be described below. A first user of the first device 200 may interact with the dialogue program 12 by providing an audio input in order to access a chat-based search, recommendation, or booking service provided by the dialogue platform 1 together with the project code 16, for example. Output audio data generated by the dialogue platform 1 together with the project code 16 is provided through the first interface 8 to the input/output component 101 and transmitted to the first device 200 through the communication network. For example, a project for restaurant reservation can help a user to book a reservation at the restaurant, such that when a user speaks "Can I make a booking for 4 people on Saturday" into the first device 200, the dialogue system 100 might respond with "What time would you like the booking?".

Input data from the second device 300 is also received through the input/output component 101 but is processed by the dialogue program 12 through a second interface 9, which will be described below. A second user of the second device 300 may interact with the dialogue program 12 by providing inputs through the graphical user interface, which sends data and commands to the dialogue system 100 through the communication network.

Input data from the third device 400 is also received through the input/output component 101 but is processed by the dialogue program 12 through a third interface which will be described below. A third user of the third device 400 may interact with the dialogue program 12 through a command line interface program 412 running on the third device 400, which sends data and commands to the dialogue system 100 through the communication network.

The dialogue system 100 may communicate with further devices and systems over the communication network. For example, the dialogue system 100 may communicate with a restaurant system server when attempting to finalise a restaurant booking process, to check availability for a particular date, time, and number of people for example.

The processor 105 is also configured to communicate with the non-volatile storage 107. The storage 107 may contain data that is used by the program 109 when executed by the processor 105. As illustrated, the storage 107 is local memory that is contained in the device. Alternatively however, the storage 107 may be wholly or partly located remotely, for example, using cloud based memory that can be accessed remotely via the communication network. The dialogue program 12 is stored in the storage 107. The dialogue program 12 is placed in working memory 111 when executed.

As illustrated, the system 100 comprises a single processor. However, the dialogue program 12 may be executed across multiple processing components, which may be located remotely, for example, using cloud based processing. For example, the dialogue system 100 may comprise at least one graphical processing unit (GPU) and a general central processing unit (CPU), wherein various operations described in relation to the methods below are implemented by the GPU, and other operations are implemented by the CPU. For example, matrix operations or vector operations are performed by a GPU.

Usual procedures for the loading of software into memory and the storage of data in the storage unit 107 apply. The dialogue program 12 can be embedded in original equipment, or can be provided, as a whole or in part, after manufacture. For instance, the dialogue program 12 can be introduced, as a whole, as a computer program product, which may be in the form of a download, or can be introduced via a computer program storage medium, such as an optical disk. Alternatively, modifications to existing software can be made by an update, or plug-in, to provide features of the above described example.

While it will be appreciated that the below examples are applicable to any computing system, the example computing system 100 illustrated in FIG. 1(*a*) provides means capable of putting an example, as described herein, into effect.

FIG. 1(*b*) shows a schematic illustration of various functional modules or units of a dialogue program 12 which may be used in a dialogue system 100 according to an example. The modules may be implemented as one or more computer programs. For example, all of the modules may be components of a single computer program. As another example, each of the modules may be implemented as individual computer programs communicating as to provide the described functionality. As another example, a subset of the modules may be implemented as one computer program and the others of the modules may be implemented as one or more other computer programs.

The dialogue program 12 comprises one project in this example. How the dialogue program 12 implements multiple projects will be described further below. During implementation of the project, the dialogue program process 12 comprises a running instance of the dialogue platform 1 and a running instance of the project code 16. The dialogue platform 1 together with the project code 16 is used to perform a dialogue with a first user, in the manner that will be described below. For example, the dialogue platform 1 together with the project code 16 can help a first user to book a reservation at a restaurant, such that when a user speaks "Can I make a booking for 4 people on Saturday" into the first device 200, the dialogue system 100 might respond with audio "What time would you like the booking?".

The dialogue platform 1 comprises various modules used to perform the dialogue together with the project code 16, including a speech recognition module 3, an orchestrator module 7, a telephony module 2, a dialogue manager 5, a voice composer 6 and a natural language understanding (NLU) module 4 (also referred to herein as a language module 4).

FIG. 1(*c*) shows a schematic illustration of an example project code 16. The project code 16 comprises data that is used by the platform 1 to perform the dialogue with the first user. In particular, the project code 16 may comprise telephony 2001, orchestrator 2003, and ASR 2005 configuration settings, voice recordings and/or configuration settings 2002 used by the voice composer 6, dialogue manager configuration settings 2004, a dialogue manager module 5, and NLU configuration settings 2006 (also referred to herein as language module configuration settings) and NLU model(s) 2008. The project code 16 will be described in more detail below.

Prior to implementation, configuration settings in the project file 14 can be set by the second or third user on a project level. When a deployment command is made, the project code 16 is generated from the project file 14, and the platform code 1 and project code 16 are run together to perform the dialogues with the users, according to the configuration settings.

In particular, the second or third user may enter or edit one or more of the telephony 2001, orchestrator 2003, ASR 2005, dialogue manager 2004, voice composer 2002 and NLU configuration settings 2006 in the project file 14. In this way, the second or third user may set project level configuration settings for one or more of these modules. These settings are then implemented for all user dialogues conducted using the project code 16. These settings are implemented for the entirety of each dialogue with a user in the project, other than where there are any turn level configuration settings.

The second or third user may also set or edit turn level configuration settings for one or more of the modules, by specifying turn level configuration settings in the dialogue flow information 42 in the project file 14. The dialogue flow information 42 comprises a plurality of states, wherein at least some of the plurality of states comprise information specifying a dialogue act and at least some of the plurality of states comprise transition information specifying a transition to another state, the transitions defining one or more dialogue pathways. The turn level configuration settings are specified in the states. During implementation, the dialogue manager 5 then changes the configuration settings of the modules from the "project level" setting to the "turn level" setting at the specified points in the dialogue (i.e. the state). Thus if the next state that is transitioned to in the dialogue comprises stored information specifying a configuration setting, the configuration of the relevant module(s) of the platform 1 are updated based on the stored information such that the dialogue platform configuration is tailored for the expected next user input.

As is described in more detail below, in use, the dialogue platform 1 receives, by way of first interface 8, an input signal relating to speech provided by a first user. The dialogue platform 1 determines dialogue information from the input signal and determines a dialogue act based on the determined dialogue information, in the manner that will be described below. The dialogue platform 1 outputs, by way of the first interface 8, speech information specified by the determined dialogue act to be provided to the first user.

In particular, the dialogue platform 1 serves live calls from users through the first interface 8. In this example, a call starts when the first user calls a particular phone number using the first device 200. Data from the first device 200 is then routed through the communication network to the dialogue system 100, and to the first interface 8.

The first interface 8 in this example comprises a telephony module 2. The telephony module 2 comprises a frontline service that receives Voice over Internet Protocol (VoIP) traffic and converts the received data into media streams. In this example, the telephony module 2 supports Session Initiation Protocol (SIP) to enable VoIP. In particular, the telephony module 2 receives encoded digital signals from the first device 200 and converts them to an audio file. It streams this audio to the ASR module 3. It also redirects calls internally inside the platform 1 to the orchestrator 7. As well as making and receiving voice call, the telephony module 2 is also configured to send and receive text messages, and/or performing other communication functions in some examples.

The orchestrator module 7 is a broker service that redirects media streams, voice commands, transcriptions, and instructions to other modules. The speech recognition module 3 transcribes streaming audio received from the telephony module 2 into text. The speech recognition module 3 performs automatic speech recognition (ASR), to generate a text signal from the audio input. The speech recognition module 3 provides the text output to the orchestrator module 7.

The platform 1 further comprises a dialogue manager module 5a, also referred to as an agent, and a natural language understanding (NLU) module 4. The natural language understanding (NLU) module 4 is also referred to here as a language module. The project code 16 also comprises a dialogue manager module 5b. The dialogue manager module 5b in the project code 14 comprises project-specific dialogue manager code (in particular, the dialogue flows 42, dialogue information 41 and global rules 43) plus a replica of the part of the platform code related to the dialogue manager 5a (in particular the engine 44 and the identification and verification module 45). The platform dialogue manager 5a hands over to the project dialogue manager 5b. The project dialogue manager 5b receives the ASR output from the orchestrator module 7, and provides transcribed text to the NLU module 4.

In this example, the NLU module 4 performs intent detection and value extraction. For an input user utterance, intents and/or slot values may be extracted by the NLU module 4. Each input user utterance corresponds to one dialogue "turn", where a turn is defined as being between two consecutive user inputs—the turn starts after one user input and ends just before the next user input. The information extracted from the NLU module 4 is referred to as the turn level dialogue state information, and comprises one or more slot values and/or one or more intents. How the turn level dialogue state information may be extracted by an NLU module 4 is described in more detail in relation to FIG. 8 below.

The project dialogue manager 5b receives the turn level dialogue state information from the NLU module 4 for a dialogue turn. The turn level dialogue state information comprises any slot values or intents extracted by the NLU module 4 from the most recent user input utterance. This information is stored in the dialogue information 41, and in particular in the current turn information 51 illustrated in FIG. 4. The project dialogue manager 5b determines the next system action to be taken in response to the user input.

For the dialogue turn, the project dialogue manager 5b outputs text corresponding to the determined system response. For example, where the user asks "Can I make a booking for 4 people on Saturday", the project dialogue manager 5b might output the text "What time would you like the booking?". The output text is provided to the orchestrator module 7, for example via the platform dialogue manager 5a.

The output text signal is converted into an audio speech signal, using the voice composer module 6. The voice composer module 6 may perform text to speech synthesis (TTS). In this case, a TTS model receives the text signal and synthesizes speech data based on the text signal. The speech data may represent speech audio wherein the words and/or characters of the orthographic text are pronounced in accordance with the pronunciation rules of the relevant natural language. The generated speech data may be one or more audio data items or one or more audio data streams. The TTS model may provide text-to-speech functionality using any suitable method. For example, the text-to-speech functionality may be provided using any of concatenative synthesis, formant synthesis, Hidden Markov Model-based synthesis, and/or deep learning-based synthesis. Alternatively, the voice composer module 6 may retrieve a stored human voice recording corresponding to the text from a set of stored voice recordings. The project uses a voice to support phone conversations. The output audio can be obtained either by automatically generating a voice through a TTS service, or using previously uploaded audio recordings of a human speaker, for example a voice actor reading the text templates aloud.

The voice composer composes the voice prompts from the text response output by the project dialogue manager 5b. Where the dialogue platform 1 is configured for multiple languages, the voice composer module 6 may comprise multiple voice composers, one for each language. Which voice composer is used is a configurable setting of the voice composer module 6. Furthermore, the ASR module 3 may comprise an audio profiling module 37 configured to detect the language of the user input, as will be described in more detail below. This information is then provided to the orchestrator module 7, which in turn provides this information to the voice composer module 6, allowing the module to change to a different language if required.

Figure 1B:
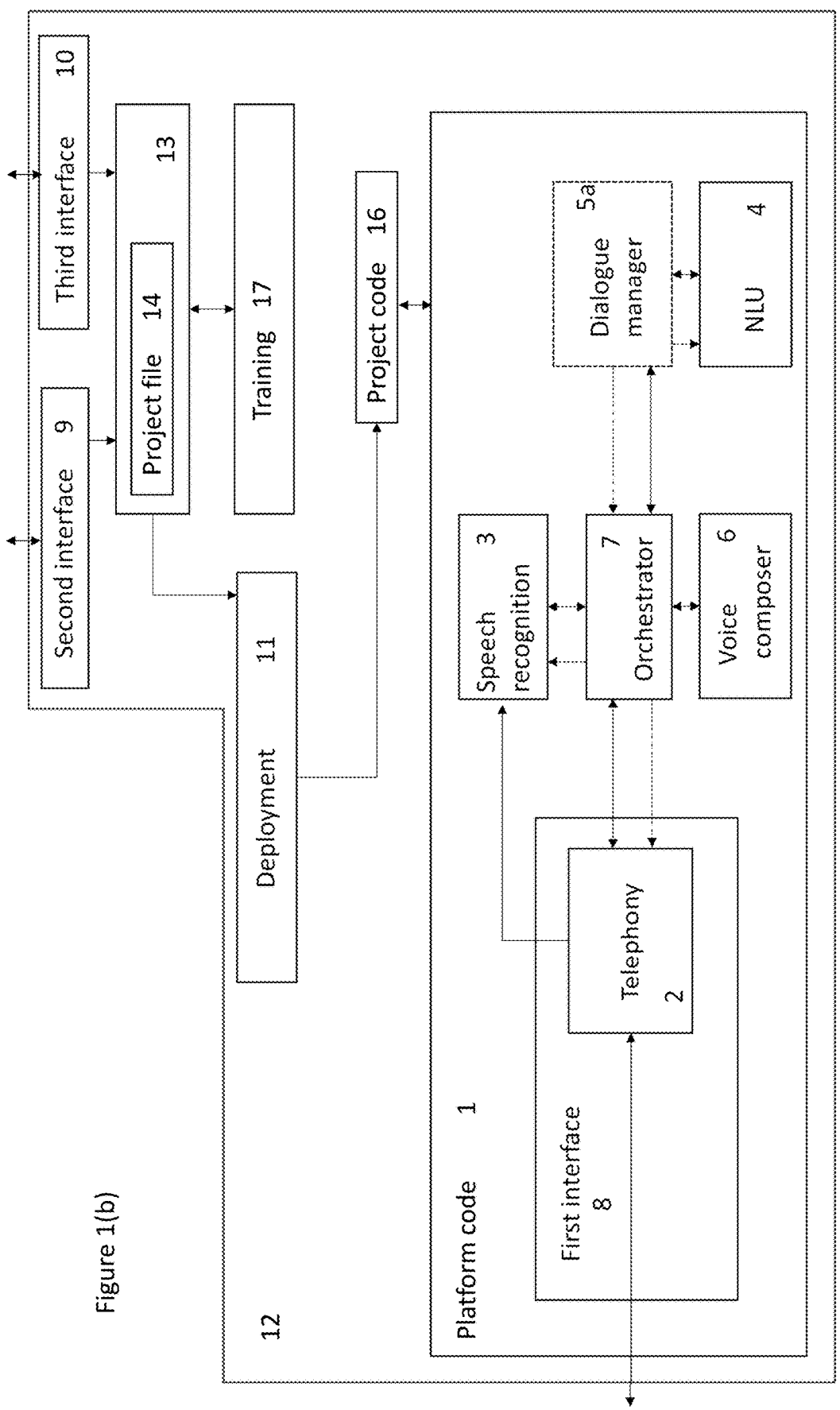
Figure 1C:
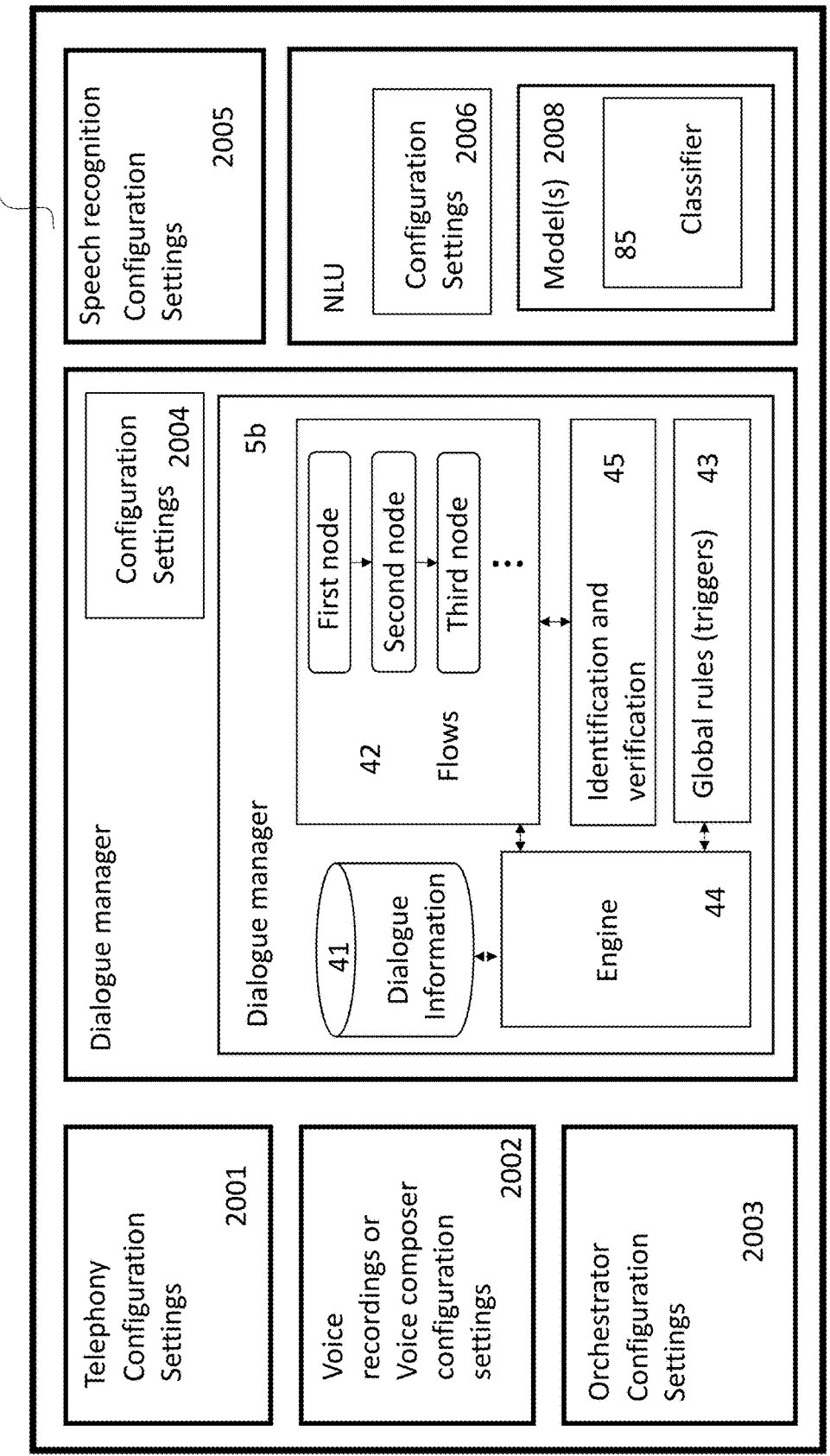
Figure 1D:
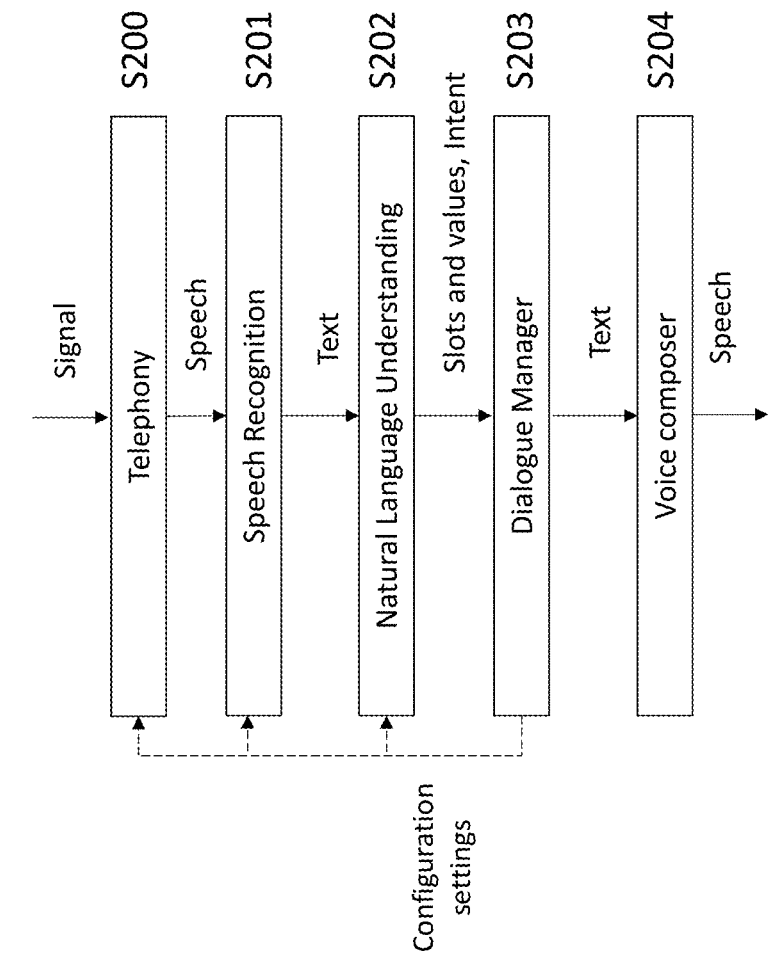

FIG. 1(d) shows a schematic illustration of a method performed by the dialogue platform 1 together with the program code 16 during a dialogue turn. In S200, a telephony step is performed by the telephony module 2 on a received signal. In S201, an automatic speech recognition (ASR) step is performed by the ASR module 3, to generate a text signal from the audio input. A natural language understanding (NLU) step S202 is then performed on the text signal by the NLU module 4. In this step, a text signal is converted into turn level dialogue information. The turn level dialogue information may comprise intents and/or values. The step S202 outputs one or more values and/or one or more intents corresponding to the user input—this is the extracted dialogue information. This gives a "turn-level" prediction, comprising one or more values and/or one or more intents extracted from the text signal corresponding to the user input for the dialogue turn. A dialogue management step is performed in S203, in which a dialogue act corresponding to text to be output is determined from the information output from S202. This output text is converted to speech using the voice composer module 6 in S204.

The various components of the dialogue program 12 will now be described in more detail.

First Interface

Figure 2A:
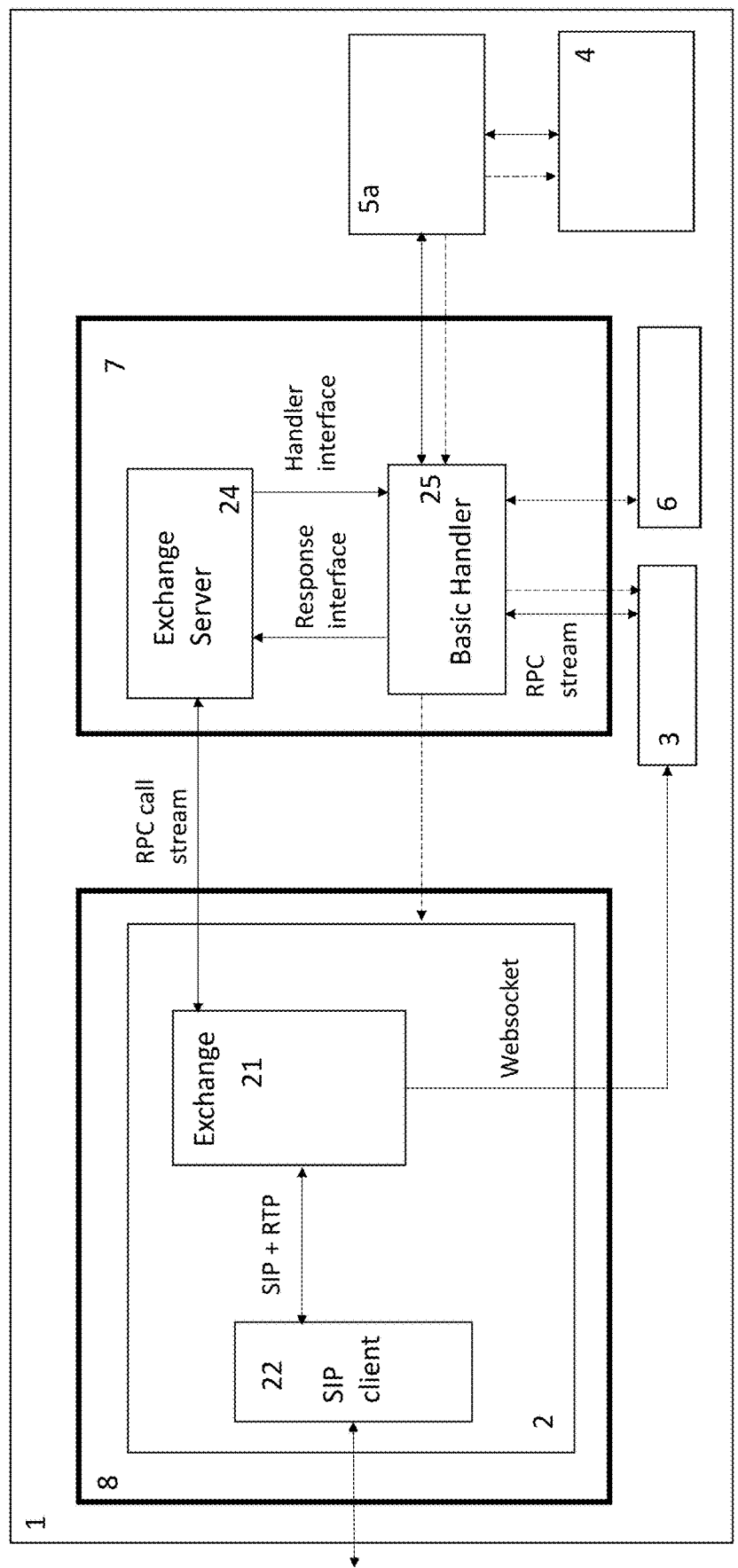
FIG. 2(*a*) is a schematic illustration of the platform 1 described in relation to FIG. 1(*b*), showing an example first interface 8 and orchestrator 7 in more detail.

FIG. 2(a) is a schematic illustration of the platform 1 described in relation to FIG. 1(b), showing an example first interface 8 and orchestrator 7 in more detail.

The first interface 8 comprises a telephony module 2. In order to direct calls to the orchestrator 7 and ASR 3, the telephony module 2 comprises an exchange module 21. The exchange module 21 in this example is the Asterisk software, which is a software implementation of a private branch exchange. Other private branch exchange software may additionally or alternatively be used, for example software by other private branch exchange providers, such as Twilio or Telnyx for example. The exchange 21 controls and coordinates the incoming calls. In particular, the incoming calls in this example are received at the SIP client 22, and provided to the exchange 21 through SIP and Real-time Transport Protocol (RTP). The exchange 21 communicates with the exchange server 24 in the orchestrator 7 through an RPC (Remote Procedure Call) call stream, and with the automatic speech recognition module 3 through a websocket. Audio corresponding to input user speech is streamed from the exchange 21 to the ASR module 3.

For each incoming call received over SIP, a Uniform Resource Identifier (URI) contains a project ID and an account ID. Calls are then associated with a project and directed internally according to a stored deployment map. The map is stored in a database that is queried by the handler service 25.

The telephony module 2 comprises a channel setting. This is a configurable setting of the telephony module 2. It may be set at project level or turn level, as described above. The channel setting controls which channel the telephony module 2 is expecting a user to respond on—this might be either DTMF (dial tone multi-frequency, where a user provides an input by pressing keys on a keypad) or speech, or both for example.

The telephony module 2 may comprise one or more further configurable settings that specify one or more of the following when the channel setting is set to DTMF:
  a number of digits expected over the DTMF channel;
  a time period after which a signal is sent to the basic handler 25 indicating that no response was received—in this example, this is set to the second pre-defined time period, which will be described below;
  a key that signals the end of a DTMF turn;
  text that will be said during DTMF collection and/or audio that will be played to the user during DTMF collection.

These are also configurable settings of the telephony module 2. They may be set at project level or turn level.

The telephony module 2 may comprise a further configurable setting that specifies whether the audio is to be provided to the ASR module 3 in SSML (Speech Synthesis Markup Language) format, when the channel is set to speech. This is a configurable setting of the telephony module 2.

As has been described, the telephony module 2 is configurable. It is also contextualisable—the configuration can be set on a turn level. It can work with heterogeneous input (e.g. DTMF and voice) within the context of a single conversation, switching turn by turn from voice input to DTMF (with various settings) and back to voice.

Orchestrator

The orchestrator 7 comprises the exchange server 24 and a basic handler service 25. The basic handler 25 communicates with the dialogue manager 5a, the voice composer 6 and the ASR module 3. It comprises logic for post-processing the response from the dialogue manager 5a.

The basic handler 25 communicates with the exchange server 24 over a response interface. The response interface comprises a set of processes that the basic handler can call to guide the control flow inside the exchange server 24. The exchange server 24 communicates with the basic handler 25 over a handler interface, which allows the exchange server 24 to transfer the control back to the basic handler 25. Once the handler call-back is complete, the control flow is transferred back to the exchange server 24 which then returns the response. The basic handler 25 can use the response interface to append information to the response. The basic handler 25 can state what instructions it wants to execute next.

The exchange server 24 in this example is an RPC server that exposes a single streaming RPC (Remote Procedure Call) method. This method receives a stream of call events and returns a stream of instructions. Instructions are the instructions that the exchange 21 should execute, for example, play a recording, collect DTMF, transfer the call and so on. The call events are usually responses to instructions, as well as special events such as CallStart or CallEnd, which contain metadata about a new call. The streaming RPC method is called in this example by an Asterisk General Interface (AGI) binary in the exchange 21. An example of the interaction between the Asterisk AGI in the exchange 21, the Asterisk server 24 and the basic handler 25 is set out below:

1. New call is received at exchange 21. Audio is streamed from exchange 21 to ASR module 3.
  2. New AGI binary starts at exchange 21 and calls RPC streaming method. This triggers RPC streaming method on exchange server 24. This triggers CallStart event and calls OnNewCall( ) method on handler 25.
  3. ASR module 3 provides output to handler 25.
  4. Handler 25 then sends a request to dialogue manager 5a comprising ASR output.
  5. Dialogue manager 5a replies with a response, based on which handler 25 decides what to do next. For example, the dialogue manager 5a responds with a message to be output to user.
  6. Handler 25 sends this message to voice composer 6, which returns an audio recording.
  7. Handler 25 then calls the Plays method on the response object, with the given recordings.
  8. Handler 25 finishes the OnNewCall( ) method, control is transferred back to exchange server 24.
  9. Exchange server 24 then constructs the Play{ } instruction response object which is then sent to the AGI binary in the exchange 21, to output the response to the first user.

The basic handler 25 comprises an interruption setting. This is a configurable setting of the orchestrator 7. The interruption setting determines whether or not the system allows "interruptions" from the user—i.e. whether the system processes user input received whilst the dialogue system 100 is preparing or outputting a response. If the interruption setting is set to not allow interruptions, then only user inputs received in certain periods are processed, whilst inputs received during other periods are ignored.

In other words, whilst the dialogue system 100 is determining and outputting a response to the user, user inputs are not processed.

As has been described previously, incoming audio is directly streamed to the ASR module 3 from the exchange 21 for real-time transcription. The ASR 3 is configured to detect the end of the user speech and provide a signal to the handler 25 to indicate the end of the user input, so that the handler 25 can then request a response from the dialogue manager 5. When the interrupt setting is turned off, the audio streams from the user side are discarded during periods when the dialogue system 100 is determining and outputting a response to the user. During such periods, listening to the user utterance is deactivated. Once the response has been provided to the user, the basic handler 25 then is set to accept user inputs. During this period, listening to the user utterance is activated. If the interruption setting is turn on, i.e. to allow interruptions, listening to the next user utterance is activated even during a period that the dialogue system 100 is determining and preparing its response, and even while the dialogue system 100 is outputting the response. This new user input will be then treated as the next user utterance and processed accordingly by the basic handler 25.

The basic handler 25 may be used with any exchange server (for example Asterisk, or Twilio). The exchange server 24 is the component that contains the telephony provider details. The basic handler 25 controls higher level operations such as Say( ), Play( ), Dial( ) and so on. The exchange server 24 is responsible for constructing the response objects, maintaining connection, and parsing responses.

ASR Module

Figure 2B:
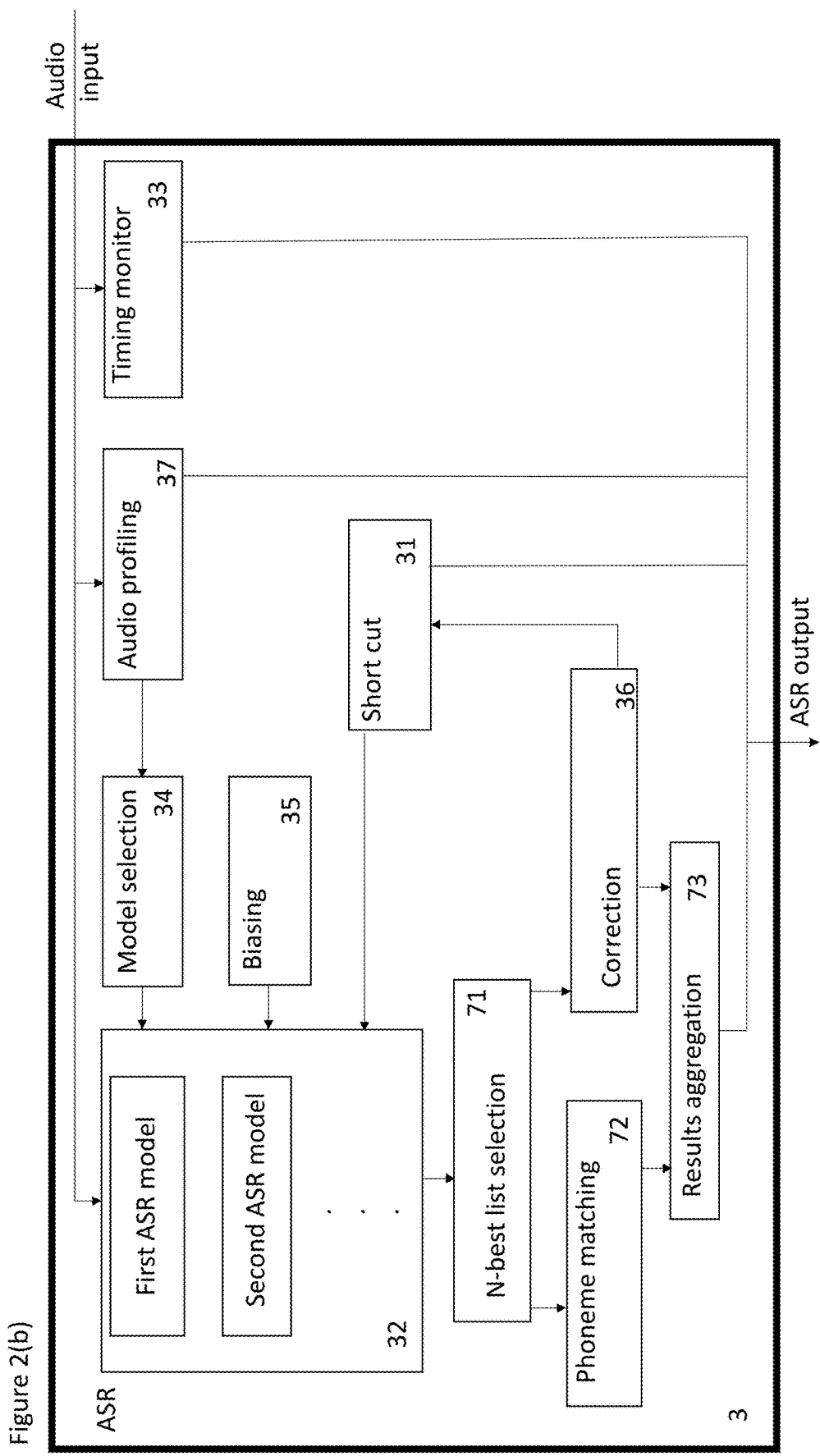

FIG. 2(*b*) is a schematic illustration of an example ASR module 3. The ASR module 3 in this example comprises a set of two or more ASR models 32. Although in this example, the platform code 1 comprises the ASR model code, it will be understood that in other examples, the platform code 1 may comprise a reference to the models, for example allowing them to be imported for execution.

The ASR module 3 further comprises a model selection module 34, which selects the model(s) from the set of two or more ASR models 32 that are used. The audio user input is received at the ASR module 3, and provided to the selected ASR model(s) from the set of ASR models 32 which has been selected by the model selection module 34.

Each automatic speech recognition model may perform speech recognition using any suitable method. For example, one or more of the ASR models may comprise a trained speech recognition algorithm based on a neural network or Hidden Markov Model. ASR models may assign posterior probabilities to words and/or characters in an utterance given the input audio signal. In one example, each ASR model may be a trained speech recognition model, based on a neural network for example.

The ASR module 3 in this example further comprises an N-best list selection module 71. An ASR model may assign posterior probabilities to words in an utterance given the input signal. The N-best list selection module 71 output then takes the form of an N-best list, which approximates the full posterior distributions over the ASR hypotheses by returning the top N most probable text hypotheses, optionally with their respective probabilities. The audio user input is provided to the selected ASR model(s), and the output from the selected ASR model(s) is provided to the N-best list selection module 71, which outputs a list of N text sequences, which are the N most probable text sequences corresponding to the audio input. Thus the ASR module 3 may output an N-best list of text transcriptions corresponding to the input audio. N is a configurable setting of the ASR module 3, as will be described below. By outputting two or more of the transcriptions, the understanding of the speech does not purely depend on the top transcription. An example of an N-best list may be:

I want a table for for;
I want a table for four;
Hmm I want a tab four four.

Which of the automatic speech recognition models from the set of models 32 is to be used is also a configurable setting of the ASR module 3. It may be set at project level or turn level. For example, a first ASR model in the set of models 32 is configured to recognise an alphanumeric character sequence with improved accuracy. For example, the first ASR model may be trained using a training dataset comprising a larger proportion of alphanumeric sequences. A second ASR model is configured to recognise a numeric sequence with improved accuracy. For example, the second ASR model may be trained using a training dataset comprising a larger proportion of numeric sequences. A third ASR model is configured to recognise words spoken with an American accent with improved accuracy. For example, the third ASR model may be trained using a training dataset comprising a larger proportion of words spoken in an American accent. A fourth ASR model is configured to recognise words spoken with an English accent with improved accuracy. For example, the fourth ASR model may be trained using a training dataset comprising a larger proportion of words spoken in an English accent. A plurality of language specific ASR models, corresponding to different languages, may also be included in the set of models 32 and selected according to the language expected to be received.

If inputs spoken with a particular accent are expected, the ASR model with the highest accuracy for the particular accent may be selected in the project level ASR configuration settings for example. Furthermore, a different ASR model may be set by the model selection 34 for a dialogue turn. For example, if a particular input type (e.g. an alphanumeric or numeric-only sequence) is expected for a particular dialogue turn, the ASR model with the highest accuracy on such input types may be set in the turn level configuration settings.

In this example, the ASR module 3 further comprises an audio profiling module 37. The audio profiling module 37 may be configured to detect the language of the user input. This information is then provided to the model selection module 34 and used to select one or more ASR models from the set of ASR models 32. This information is also provided to the orchestrator module 7. In this way, the language of the dialogue may be changed within the conversation. The audio profiling module 37 may additionally or alternatively be configured to detect the language variety, dialect or accent (e.g., UK versus US English), which is then provided to the model selection module 34 and used to select one or more ASR models from the set of ASR models 32.

In this example, the ASR module 3 further comprises a bias setting module 35. The bias module 35 is configured to boost the probabilities that certain words and/or word patterns are recognised in a particular input speech utterance. An ASR model may comprise an acoustic model. The bias module 35 may use word boosting methods, which give each of a set of one or more "words of interest" a higher score when generating text from the output of the acoustic model. The bias module 35 stores a set of one or more "words of interest", together with a weight corresponding to each word of interest. The weights are used to increase the likelihood that sequences of phones which form these "words of interest" are selected. In order to implement word boosting, a set of words of interest and a corresponding weight for each word is provided to the biasing module 35. The set of words and the weights included in the biasing module 35 are configurable settings of the ASR module 3. The bias module 35 may also be used to boost the probabilities that certain patterns are recognised. In this case, the bias module 35 stores a set of patterns of interest and corresponding weights.

Contextual biasing may be implemented, in which the set of words and/or patterns of interest, and weights, are configured per dialogue turn. For example, the ASR module 3 may be configured to increase the likelihood that dates are recognised, for dialogue turns when it is expected that the user response will include a date. Contextual biasing allows different words to be boosted depending on the current context. For example, if it is expected to receive an answer to a Yes/No question for the dialogue turn, the list of words of interest will comprise words related to "Yes" or "No" (e.g., 'Yeah", "yep", "correct", "nope", "no" . . . ). If a numerical answer is expected, the list of words of interest will comprise numbers (e.g., "three" (people) over "free" (people) as an example). As another example, the ASR module 3 may be biased so as to increase the likelihood that the details of a particular restaurant are recognised, e.g. if the restaurant name is "Willow Tree Cafe" then the probability that "Willow", "Tree", and "Café" are recognised may be increased. Thus words of interest may also comprise uncommon and infrequently named entities (e.g., names of particular hotels and restaurants that are stored in the dialogue information 41 described below).

In this example, the ASR module 3 further comprises a timing monitor component 33, that monitors timings of the user input. If a user input is not completed within a first pre-defined time period, the timing monitor module 33 outputs an indication of this to the orchestrator 7. The length of this first pre-defined time period, and whether this functionality of the timing monitor 33 is enabled, are configurable settings of the ASR module 3.

If no user input has been received within a second pre-defined time period, the timing monitor module 33 outputs an indication of this to the orchestrator 7. The second pre-defined time period specifies how long the ASR module 3 should wait for the user input before signalling there was no input. This may occur not only because the user is silent, but also due to some internal communication failures (e.g., in telephony or due to incorrect call routing, etc.). This second pre-defined time period may be set to 5 or seconds for example. The length of the second pre-defined time period determines how 'impatient' the system is. Some use cases may be more suitable for more patient systems, even if it yields longer conversations and more silent time overall for example. The time is counted from the last response from the ASR 3 to the handler 25. Whether this functionality is enabled and the length of the second pre-defined time period are configurable settings of the ASR module 3.

In this example, the ASR module 3 further comprises a short cut module 31. The short cut module 31 comprises a set of one or more short-cut keywords. The output of the set of ASR models 32 is provided to the short cut module 31. The output is provided as the text is being generated from the input audio—in other words as each word is generated, it is provided to the short-cut module 31. Each word of the output text is checked against the list of short-cut keywords. This check is performed continuously, as each word is received. If one of the short-cut keywords is detected with a probability above a pre-defined threshold, the short-cut module 31 instructs the set of ASR models 32 to stop performing automatic speech recognition. The detected short-cut keyword is then provided as the output of the ASR module 3. Thus if a keyword is detected, the ASR module 3 immediately stops transcribing. This can be seen as early stopping for ASR, where some keywords, if detected, will be propagated directly to the NLU module 4. This allows to save resource, by avoiding ASR processing, and to speed up the process of generating the dialogue system output. The set of short-cut keywords, and whether the short-cut module 31 is enabled, are configurable settings of the ASR module 3.

In this example, the ASR module 3 further comprises a correction module 36. The correction module 36 comprises a list of text string-to-text string mappings, which is applied on the N-best list of text transcriptions. The list of mappings is a configurable setting of the ASR module 3. The list may be defined at the project level or turn level. Even with biasing applied, the ASR models can still be incorrect at places, and some common mistakes may be corrected using the correction module 36. For instance, the following corrections may be included in the list of mappings for a hotel booking project:
"Billy"→"Billing",
"Ballet"→"Valet",
"Valley"→"Valet",
"Preservation"→"Reservation",
"Early chicken"→"Early check-in",
"Early chickens"→"Early check-in",
"Chicken time"→"Check-in time",
. . .

In another example, the following corrections may be included in the list of mappings for a project in the banking domain:
"Ivan"→"IBAN",
"Closest brunch"→"Closest branch",
. . .

The ASR module 3 in this example further comprises a phoneme matching module 72. The phoneme matching module 72 takes as input phonetic units and performs matching at the phonetic level. In this example, one or more of the set of ASR models 32 is configured to additionally output phonetic text. For example, the phonetic text may represent the pronunciation of the one or more audio inputs using a phonetic alphabet, e.g. the International Phonetic Alphabet (IPA) or Speech Assessment Methods Phonetic Alphabet (SAMPA). Characters of phonetic text may be referred to as phonemes. For example, one or more ASR models may perform a first step of generating a phonetic text from the audio signal, and a second step of generating an orthographic text from the phonetic text. Both the phonetic text and the orthographic text are outputted. The N-best list selection 71 may select a list of N possible orthographic texts and the N corresponding phonetic texts. The phonetic texts may then be compared to one or more stored dictionaries in the phoneme matching module 72. These dictionaries comprise mappings between phonetic text and orthographic text for a set of words. For example, the Serbian name "Mrksic" is often translated into "Milkshake" by an English ASR model. By outputting a phonetic text corresponding to the name "Mrksic", searching the stored dictionaries for this phonetic text, and retrieving a orthographic text corresponding to the phonetic text in the dictionary, such words may be more accurately transcribed.

The ASR module 3 in this example further comprises a result aggregation module 73. The results aggregation module 73 may allow the ASR module 3 to operate in an "over-generation" and "ranking" approach, in which multiple models or modules are used on the same input to produce different predictions. These are then assembled by the results aggregation module 73 afterwards to improve the accuracy. For example, they may be ranked in an order of likelihood of correspondence to the input audio.

Figure 9:
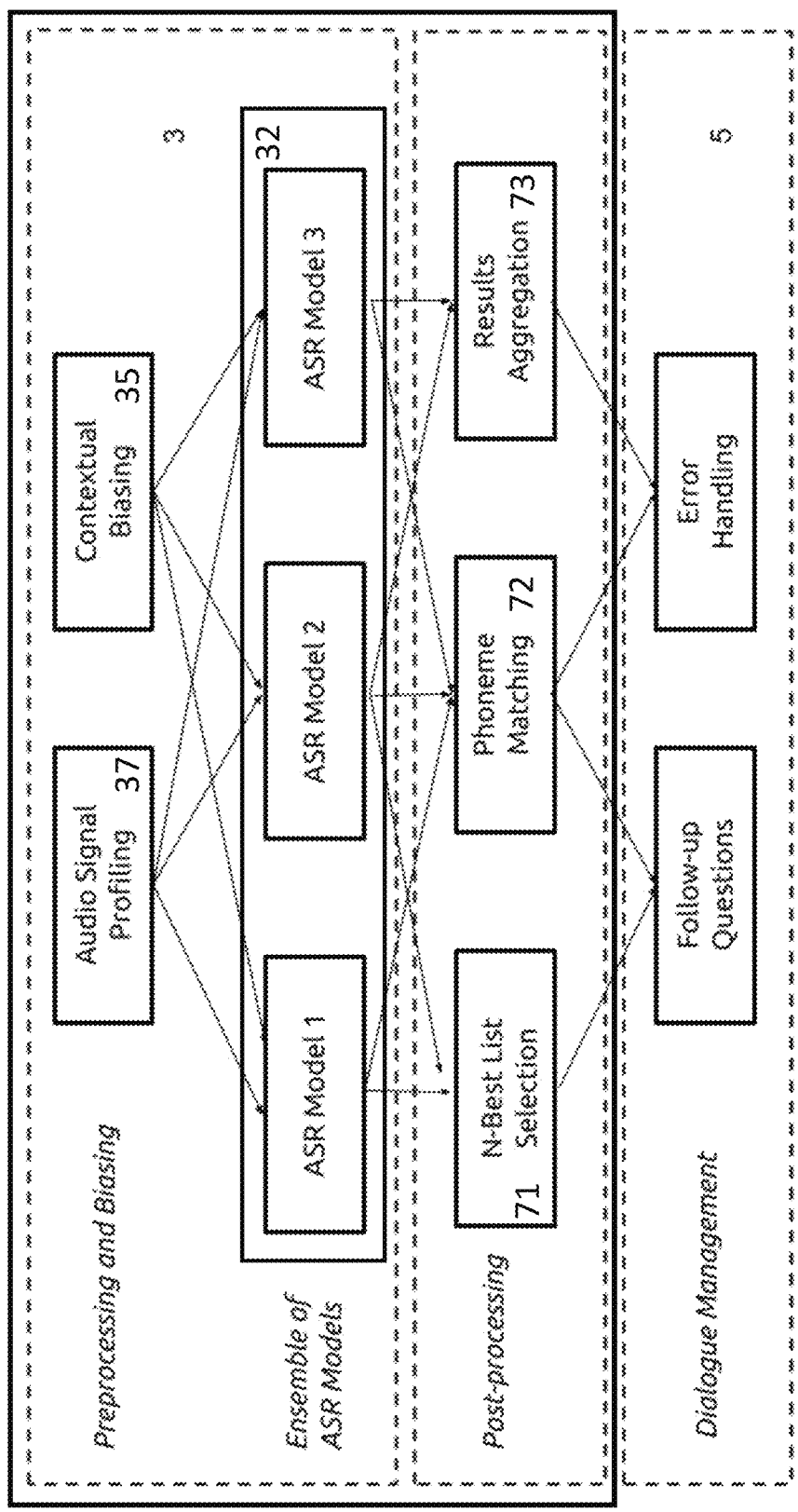
FIG. 9 shows an illustration of an example backend process, including a speech recognition module 3 and dialogue manager 5.

FIG. 9 shows an illustration of a backend process, including a speech recognition module 3 and dialogue manager 5. Based on the configuration settings and audio user profiling, the ASR module 3 selects the best mix of speech endpoints, matching and aggregating algorithms to process the speech in order to yield improved predictions.

Although a specific ASR module 3 with various components has been described, it is understood that other ASR modules 3 may be used. For example, an ASR module 3 may have one or more of the timing monitor 33, audio profiling module 37, model selection 34, biasing 35, N-best list selection 71, correction 36, phoneme matching 72 or results aggregation module 73, in any combination. A single ASR model may be used instead of a set of ASR models 32.

Dialogue Manager

FIG. 3 shows a schematic illustration of an example project dialogue manager module 5b. As has been explained previously, the platform 1 comprises a platform dialogue manager 5a and the project code 16 comprises a project dialogue manager 5b. The platform dialogue manager 5a may comprise an engine 44 and an identification and verification module 45 as described below. The project code 15 comprises a replica of the engine 44 and the identification and verification module 45, as well as the dialogue information 41, flows 42 and global rules 43. The platform dialogue manager 5a hands over to the project dialogue manager 5b.

The platform dialogue manager 5a receives input information from the orchestrator 7 and provides this to the project dialogue manager 5b. This input information is information generated from the user input, for example a sequence of one or more numbers corresponding to a user input via the DTMF channel, or an output from the ASR module 3. The output from the ASR module 3 may comprise a list of possible text transcriptions, a short-cut keyword, an indication of silence from the user or an indication that the user has spoken for too long for example, as described above.

The dialogue engine 44 processes the input. This will be described in more detail below. The text input (for example a sequence of one or more numbers corresponding to a user input via the DTMF channel, a list of possible text transcriptions, or a short-cut keyword) is provided to the NLU module 4. The NLU module 4 generates turn level dialogue information. How the NLU module 4 does this will be described in more detail below.

The components of the project dialogue manager 5b will now be described. The dialogue manager is a service that is configured to make logical decisions based on a particular use case configuration. It interacts with any third-party service (e.g., making queries to an external database), and ultimately decides on the next system action in response to a user input. Although a specific dialogue manager 5b is described here as an example, other dialogue managers may be used.

Dialogue Flows

The project dialogue manager 5b comprises a set of one or more dialogue flows 42. Each flow comprises a plurality of states. Throughout this specification, the states are also referred to as nodes. The set of one or more flows 42 corresponds to a state machine. For each state, other than an end state (or stop node), an identifier of the state and transition information is stored.

Figure 5:
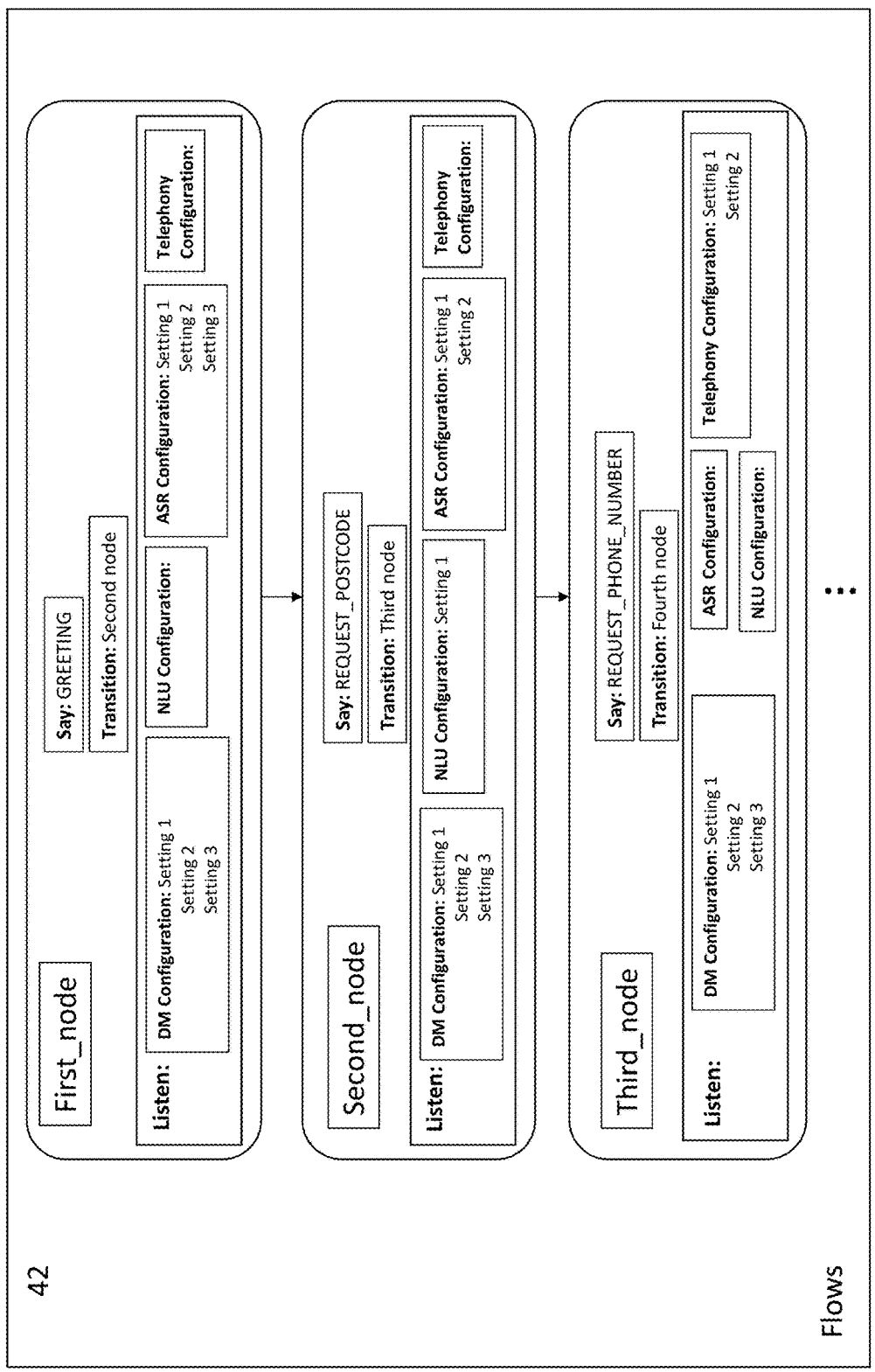
FIG. 5 shows a schematic illustration of example information stored for some example states.

FIG. 5 shows a schematic illustration of the information stored for some example states, including an identifier (First_node, Second_node, etc) and the transition information (Transition: Second node, Transition: Third node, etc). The transition information, also referred to herein as a transition function, identifies another state from the plurality of states. At least some of the states also comprise information specifying a dialogue act (Say: GREETING, etc) as will be explained in further detail below. The states, or nodes, correspond to points in a dialogue and mark where the dialogue is during conversation and how to act as a result. For example, a start node corresponds to the start of a dialogue, a stop node to the end of a dialogue, and various other nodes in between are defined corresponding to dialogue acts that the system may be expected to make during the dialogue, for example a "greet" node, an "ask help" node, and an "FAQ" node. Further nodes that correspond to functions other than dialogue acts may also be included, for example when the node represents an exchange with an API backend. A node may be defined for each expected exchange between the dialogue system and the external environment, where the external environment is the first user, an API backend, or a $3^{rd}$ party service.

A change from one state, or node, to another is referred to as a transition. Each node comprises information defining a specific transition (transition information) which identifies another node. Transitions performed based on this information are also referred to here as local transitions. In some cases, the transition information may identify two or more possible other nodes, with conditions that determine which of these should be selected. The transition information defines one or more dialogue pathways, also referred to here as flows. The flows define a direction that the conversation is expected to take. Here, a simple example is described, in which a plurality of nodes are joined in a single pathway, so that a first node defines a transition to a second node, which defines a transition to a third node, and so on, until the end node. However, it will be appreciated that more complicated dialogue pathways can be defined, having multiple branches for example. The flow can be represented by a graph. The states are nodes in the graph and the transitions between states are represented by solid arrows joining the nodes.

Different nodes and flows correspond to different behaviour of the dialogue manager 5b. For example, if the interjection flow is included, the system 100 issues an interjection to acknowledge users if they speak for too long.

Node Information

FIG. 5 shows a schematic illustration of three example nodes in an example flow. Each node comprises information identifying the node. In this example, the first node is identified as "First_node", and so on. However, in other examples, this information may correspond to a descriptive name, for example "Greeting node". The node further comprises transition information. In this simple example, the transition information for the first node just specifies the second node, and the transition information for the second node just specifies the third node.

As well as the information identifying the node and the transition information, a node may comprise further information defining one or more functions, such as a "say" function, a "listen" function, a "handover" function, an "update" function or a "call" function.

An update function updates information in the dialogue information 41.

A call function may make an API call, comprising a communication with a third party database, from which information is queried and retrieved. For example, an API call can be made to check availability from a database, for example to check whether a table for 2 people is available at a requested time and date.

A call function may make a call to the identification and verification module 45, to perform identification or verification. For example, at a point in the dialogue after at least one proposed value for each of a plurality of user data fields used by the identification and verification module 45 has been collected, a node comprising a call function to make a call to the identification and verification module 45 is transitioned to. This node may be identified as the "Identification and verification" node. The proposed values stored in the dialogue information 41 are formulated into a set of candidate hypotheses. In this example, the set of candidate hypotheses may comprise the N-best list of raw transcripts output from the ASR module 3, and a corresponding list of extracted and parsed values for the user data field (generated by the NLU module 4 in the manner that will be described below). The candidate hypotheses may be stored in an ordered list, where the order is from the most likely to the least likely. The ordered list may comprise parsed values in order of the corresponding ASR N-best list, followed by extracted values in order of the corresponding ASR N-best list, followed by the ASR N-best list output for example. A list of one or more candidate users stored in the dialogue information 41 may also be provided as candidate references. Candidate references comprise reference values for the user data fields for each candidate user. Where only verification is being performed, the reference values correspond to a single candidate user to be verified. Where identification is being performed, the reference values correspond to a plurality of candidate users. The hypotheses and reference values are provided to the identification and verification module 45. Where identification is being performed (RANK mode), a list of candidates to rank from is provided, together with the reference values. Where verification is being performed (VALIDATE mode), a single candidate is provided to validate for, together with the reference values. The type of processing to be performed by the identification and verification module, for example EXACT, RANK (identification) or VALIDATE (verification) mode is also indicated to the identification and verification module 45 based on the node information. The identification and verification node receives an indication of the outcome of the identification and/or verification from the identification and verification module 45. The identification and verification node may comprise a say function, which indicates the output of the identification or verification to the user for example, and/or a transition function that is conditioned on the output of the identification or verification.

A listen function defines what the system expects to hear back from the user, and will be described in more detail below. Some nodes have the listen object set to false so that the node does not perform a listen function—these are referred to as passive nodes.

A handover function may direct the call to a human agent.

A say function defines what the system should say when the dialogue is at the node. A "say" function comprises information specifying a dialogue act, and therefore a node comprising a "say" function is a node comprising information specifying a dialogue act. In particular, a "say" function comprises an utterance, in other words the say function returns an utterance object. An utterance is a function corresponding to a stored predefined text template of what should be output by the system at a given node in this example. The predefined text template may also be stored in the node information, or may be stored in the dialogue information 41 with the corresponding utterance.

The set of pre-defined utterances are used to generate the system dialogue acts. A dialogue act comprises an utterance and an argument of the utterance. The argument may be empty, for example where the utterance is "GREETING". The utterance "GREETING" corresponds to the stored text template "Hello, how can I help you?". The utterance for the interjection node is "INTERJECTION", which may correspond to a stored text template "Please speak in shorter and more concise sentences", or may correspond to a stored text template "Hmm" or "Aha?", to provide feedback to the user that the system is still listening. Another example dialogue act is "REQUEST_POSTCODE", where the utterance is "REQUEST_POSTCODE" and the argument is empty. This utterance corresponds to the pre-defined text template "What is your postcode?". The argument may be a slot value for example. An example dialogue act is "CONFIRM_PARTY_SIZE(=4)", where the utterance "CONFIRM_PARTY_SIZE slot (=value)" is combined with the argument, which is the current value for the party_size slot (=4), to generate the dialogue act. A system response is constructed by combining all dialogue acts accumulated during a dialogue turn. The system response, or prompt, is the final text to be output by the dialogue manager 5.

During a dialogue turn, a dialogue act is constructed from an utterance specified in the node transitioned to in the turn, together with any argument required by the utterance (which may be taken from the current dialogue information). A system prompt, which is the output text corresponding to the dialogue act, is then generated, by retrieving text corresponding to the utterances from a set of pre-defined text templates. Thus the node comprises a say function identifying the utterance. The system response is constructed by concatenating all utterances and arguments accumulated during the turn—in other words the dialogue acts—and converting to a system prompt, which is the output text.

Where the project code 16 is configured for multiple languages, multiple text templates may be stored for each utterance, one for each language. Alternatively, a translation module may be provided in the dialogue manager 5b, to translate the text template to another language. Which language is used is a configurable setting of the dialogue manager 5b. Furthermore, as described previously, the ASR module 3 may comprise an audio profiling module 37 configured to detect the language of the user input. This information is then provided to the orchestrator module 7, which in turn provides this information to the dialogue manager 5b, allowing the dialogue manager 5b to change to a different language if required.

The node information may further comprise a configurable setting that delays providing the node output to the user for a turn. This may be used for nodes where a long API query is expected for example—the information retrieved is then stored in the dialogue information 41 and provided to the user in a subsequent dialogue turn.

Global Rules

The project dialogue manager 5b further comprises a set of one or more global rules 43, which are used by the dialogue manager 5b during implementation. These are also referred to as triggers. A global rule has the form "if X, then Y", where the condition (if X) is assessed based on the dialogue information 41 for example, and the action (then Y) may be a transition to a state in the flows 42 or an update to the stored dialogue information 41 for example. A global rule can be triggered at any point in the conversation, in other words from any state, as long as the condition in the global rule is met. Optionally, there may be one or more "skip nodes" where global rules should not be triggered if the dialogue is at this point. Assessing a global rule comprises determining, based on the condition defined in the global rule, whether the global rule should be triggered or not; and if it is determined that the global rule should trigger, perform an action defined by the global rule. The global rules are stored with information identifying a pre-defined order of execution, in other words an order in which the global rules 43 are assessed—this is also referred to as priority and will be described in more detail below. For example, each global rule may have an associated priority value, which can be a positive or negative number. The priority value defines the order in which the rules are assessed. For example, global rules comprising an action which updates a variable in the dialogue information 41 are assessed first according to this order.

Identification and Verification

The identification and verification module 45 performs identification and/or verification. An example of an identification and verification module 45 is provided in GB2606081, "System and method for identification and verification", the entire contents of which are incorporated by reference herein. The identification and verification module 45 is an optional component of the dialogue manager.

An example identification and verification method performed by the identification and verification module 45 will be described.

A user database, which may be provided in the dialogue information 41 for example, stores reference values corresponding to a plurality of user data fields for each of a plurality of registered users. The plurality of user data fields comprises user data fields for identifying and/or verifying the user. Examples of such user data fields include but are not limited to: first name, last name, middle name(s), full name, postal codes (e.g. a postcode, ZIP code, Postal Routing Number, or Postal Index Number), address, one or more telephone number(s), date-of-birth, identification (ID) number, passphrase and/or password. The reference values comprise the information that populates the user data fields. For example, for a first registered user, the user data field "first name" is populated with the reference value "John", and the user data field "second name" is populated with the reference value "Smith". For a second registered user, the user data field "first name" is populated with the reference value "Joan", and so on.

The natural language understanding (NLU) module 4 includes a value extraction module 83, which will be described below. During the dialogue, the natural language understanding module 4 receives text from the ASR module 110 and may extract proposed values for one or more user data fields based on the received text signal(s). A parsing process may also be performed on the extracted values by the parsing module, which will be described in more detail below. Thus for each user data field, an ASR output, a set of extracted values, and/or a set of parsed extracted values may have been generated during the dialogue.

At an "Identification and verification" node, this information previously received during the dialogue with the user is used to populate hypotheses. The set of hypotheses includes one or more proposed values. The one or more proposed values include one or more extracted values that were previously extracted by the NLU module 4. The one or more proposed values may additionally include one or more parsed values. The set of hypotheses may additionally include one or more raw ASR outputs.

Details of registered users are also retrieved from the user database at the "Identification and verification" node, and are used to populate references. For an identification task, as the proposed values are received from the NLU module 4, the dialogue manager 5b also queries the user database regarding registered users. Any returned possibilities are stored as a list of candidate users. For a verification task, the dialogue manager 5b may be provided separately with information identifying the registered user for which the verification is being performed. The registered user information is stored as the single candidate user. The list of one or more candidate users are used to generate candidate references. Candidate references comprise the reference values for the user data fields for each candidate user.

For each provided candidate user and for each user data field, the identification and verification module when called performs a comparison with all provided hypotheses. The identification and verification module assigns each user data field a score corresponding to a float value in [0,1] for each candidate user, that indicates its similarity to the best matching hypotheses. A score of 1 indicates exact similarity; a score of 0 indicates strict dissimilarity; scores with values in between indicate levels of approximate similarity. A final score for each candidate user is calculated by evaluating a logical expression for all user data fields according to a fuzzy logic algebra.

A user data field score may be calculated using the one or more hypotheses for the data field. Where, for the user data field, there is one proposed value and one reference value for the candidate user then the user data field score may be calculated by performing a fuzzy comparison between the proposed value and the reference value for the candidate user. The fuzzy comparison may be performed by applying a fuzzy comparison operator. Examples of fuzzy comparison operators include fuzzy text similarity operators, fuzzy text containment operators, and fuzzy date comparison operators. Where, for a user data field, there are multiple hypotheses and/or multiple reference values for the candidate user, a fuzzy comparison between each of the relevant value combinations is performed. One or more fuzzy logic operations are performed on the plurality of user data field scores for the candidate user.

In a verification task, the resulting candidate user score indicates the confidence level that the information provided is adequate to verify the user as the registered user. To provide a binary output of whether the user is verified or not, a further step of checking whether the candidate user score is above or below a threshold may be performed. In response to determining that the score for the candidate user meets the verification threshold, it is verified that the user is the candidate user.

In an identification task, a candidate user of the plurality of candidate users having a maximum score is determined. An early stopping implementation may be performed, in which if a score for a candidate user is determined as 1, no further candidate user scores are determined, and the candidate user is identified as the user. The candidate users are ranked according to their computed fuzzy scores. The ranking in the list and the score indicates the confidence that the system has identified the correct user. The top-ranking candidate user is considered as the best match for the identity of the system's user. If the list is empty, the identification and verification module concludes that the user could not be identified.

Dialogue Information

The project dialogue manager 5b further comprises stored dialogue information 41.

Figure 4:
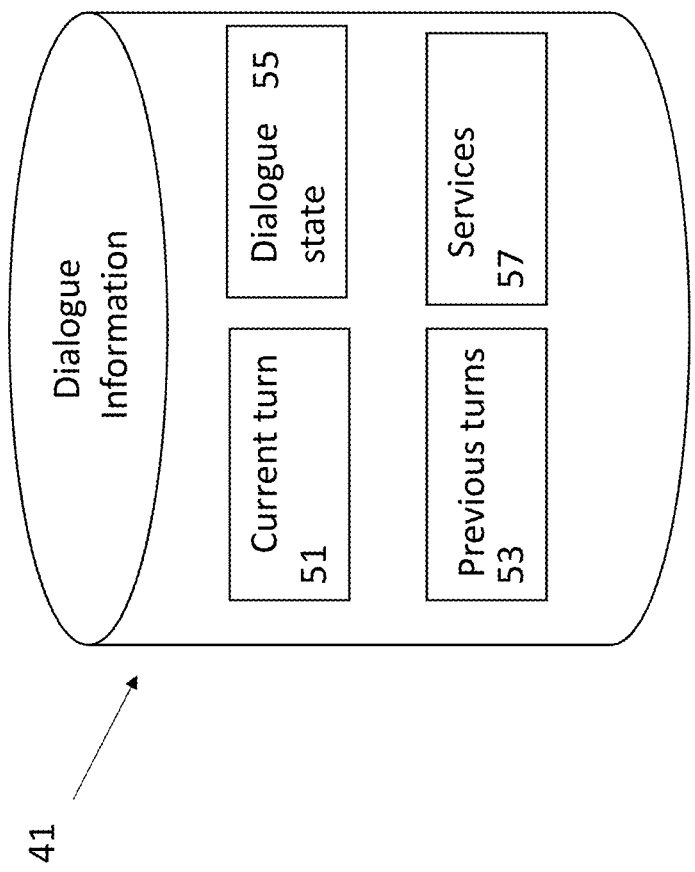
FIG. 4 shows an example of the stored dialogue information 41.

FIG. 4 shows an example of the stored dialogue information 41. The dialogue information 41 comprises current turn information 51, previous turn information 53, dialogue state information 55, and services information 57. The dialogue information 41 is accessible globally throughout the policy module 40. In other words, the content of the dialogue information 41 is visible at all the nodes.

The current turn information 51 comprises a "Turn" object. The "Turn" object comprises information generated in the current dialogue turn, for example the ASR output such as the user input text, the system output text, a sequence of nodes and transitions that happened in that turn, and a list of utterances that has been accumulated through the transitions. A "turn" denotes a set of transitions and gathered system responses between two consecutive user inputs. The dialogue policy module 5b also receives turn level dialogue state information from the NLU module 4, for a dialogue turn. The turn level dialogue state information comprises any slot values or intents extracted by the NLU 4 module from the most recent user input utterance. This information is also stored in the current turn information 51.

The previous turn information 53 is also referred to as the dialogue history. This comprises a list of "turn" objects that form a complete history of the conversation.

The dialogue state information 55 comprises a key-value dictionary that stores data used for executing the policy. As mentioned above, turn level dialogue state information is stored in the current turn information 51, and comprises any slot values or intents extracted by the NLU module from the most recent user input utterance. The slots correspond to information or items the system would ask for during the course of the entire conversation. A pre-defined set of slots is also stored in the dialogue state information 55—these are the "keys". There may be one or more possible values associated with each slot. The dialogue state information 55 is then updated based on the turn level dialogue state information in the current turn information 51. The dialogue state information 55 comprises a set of information the system would ask for during the course of the entire conversation (slots), along with the maintained set of values associated with each item.

The dialogue state information 55 can be updated by performance of an action of a global rule for example. For example, a set of the global rules comprise action functions which update variables in the dialogue state information 55. This set of global rules may be assessed prior to the other global rules. The conditions for such global rules may depend on the turn level dialogue state information returned by the NLU module 4 (stored in the current turn information 51) and the current dialogue state information 55 for example. For example, a global rule may comprise a condition "IF "time" slot value in the current turn information 51 is different to "time" slot value in the current dialogue state information 55, RETURN "true"". The action of this rule may then comprise an update to the "time" slot value in the current dialogue state information 55. The dialogue state information 55 can also be updated by performance of an update function in a node for example.

For a dialogue turn, a transcription of the user input may be received from the ASR 3. The NLU module 4 returns predictions for slot-value pairs and intent and the result is then stored in the current turn information 51. Items in the dialogue state information 55 are then updated by the global rules 43 or the node functions.

The services information 57 comprises a list of services used by the policy module 40. Services are clients of API services of third parties, for example. API calls and services relate to 3rd-party (knowledge) databases or services, and are used to obtain information required to perform the task. For example, an API call may be made to confirm whether there is availability at the time requested by the client. The received availability information may be stored in the turns object in the current turn information 51.

Optionally, as the dialogue progresses, the current node is also tracked by updating a dedicated variable in the dialogue information 41.

The dialogue information 41 may also store information used by the identification and verification module 45. For example, the dialogue information 41 stores reference values corresponding to a plurality of user data fields for each of a plurality of registered users. The plurality of user data fields comprises user data fields for identifying and/or verifying the user. Examples of such user data fields include but are not limited to: first name, last name, middle name(s), full name, postal codes (e.g. a postcode, ZIP code, Postal Routing Number, or Postal Index Number), address, one or more telephone number(s), date-of-birth, identification (ID) number, passphrase and/or password. The reference values comprise the information that populates the user data fields. For example, for a first registered user, the user data field "first name" is populated with the reference value "John", and the user data field "second name" is populated with the reference value "Smith". For a second registered user, the user data field "first name" is populated with the reference value "Joan", and so on.

Engine

The project dialogue manager 5*b* further comprises an engine 44. The engine 44 comprises a set of computer instructions embodying a method which performs transitions between the nodes based on the transition information defined in the nodes themselves and the global rules 43.

Figure 6:
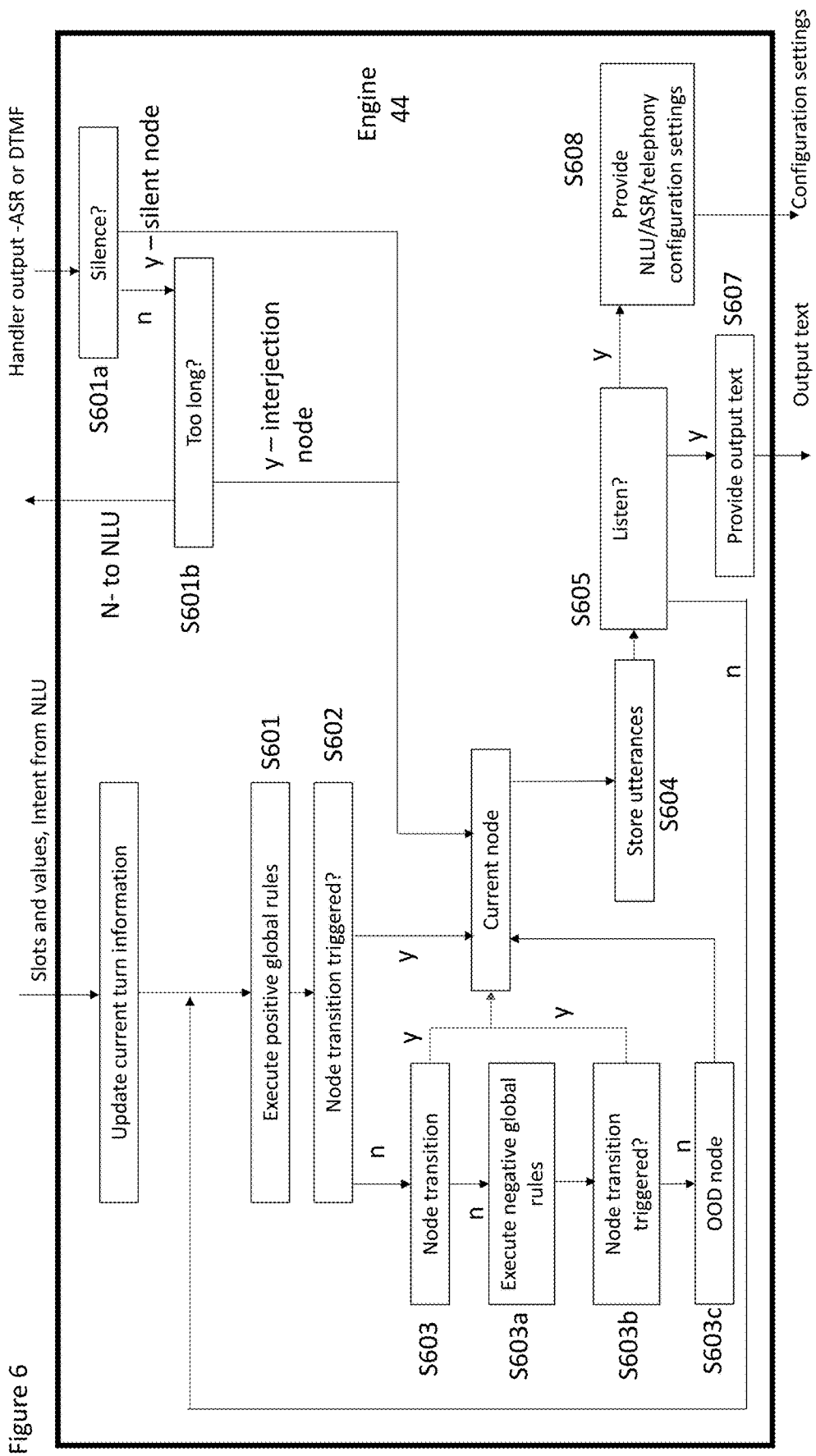
FIG. 6 illustrates steps executed during a single dialogue turn by an engine 44 according to an example.

FIG. 6 illustrates steps executed during a single dialogue turn by the engine 44 according to an example. The engine 44 implements a method which performs transitions between the nodes in the state machine 42 based on the transition information defined in the nodes themselves and the global rules 43. A dialogue between the system and a user comprises a plurality of turns. A turn is defined as being between two consecutive user inputs, where the turn starts after a user input and ends before the next user input. The method performed by the engine 44 for one turn is shown in FIG. 6.

First, the engine determines if the user has provided any input, in other words does the output from the ASR module 3 indicate no user input was received within the first pre-defined time period, in S601*a*. If so, the engine 44 transitions to a silent node. The silent node specifies a system output utterance such as "I didn't hear that, sorry?" or similar.

If not, in S601*b*, the engine 44 determines if the output from the ASR module 3 indicates that the user input was not completed within the second pre-defined time period. If so, the engine 44 transitions to the interjection node. In this manner, the interjection node can trigger before the user stops talking if the actual talking period exceeds the second predefined threshold. This implements an asynchronous streaming and responding process that uses a timing monitor 33 for interjection. The system will stream a piece of acknowledgement audio whenever the user response time exceeds the limit.

If not, the ASR output is provided to the NLU module 4, which returns the dialogue state information (extracted values and/or detected intents). A turn object is stored in the current turn information 51 as described above.

In S601, the engine assesses the global rules having a positive priority value, in the order of priority (i.e. starting with the global rules having the largest positive priority value). There is thus a pre-defined order in which the global rules having a positive priority value are assessed. For example, global rules comprising an action which updates the dialogue information 41 are assessed before global rules comprising an action which defines a transition to a node. If a condition is met for a global rule for which the action is a transition to a node in S602, the engine 44 executes a transition to the resulting node. This is recorded as an event in the current turn information 51. If no such global rules trigger in S602, the transition function of the node corresponding to the dialogue location is executed in S603. This is again recorded as an event in the current turn information 51.

If the transition function does not return a node, then the set of global rules having a negative priority value are assessed in order of the priority value (i.e. starting with those having the least negative priority value), in S603a. An example of a global rule having a negative priority value is a rule that transitions to a node that comprises a say function comprising a "CLARIFY AGENT" utterance, which specifies to provide a response clarifying to the user that they are speaking with a virtual agent, if user utterances such as "How are you?" or "Are you a real person?" or "Are you a virtual assistant?" are received. The global rules having a negative priority value may function as fall-back rules. For example, another global rule having a negative priority value is a rule that transitions to an out of domain node, if no other transition has occurred. The out of domain node comprises a say function comprising a "REQUEST REPEAT" utterance, which specifies to ask the user to repeat their input. This rule functions as a final fallback mechanism, if no other transition has occurred. This node may further comprise a handover function, which re-directs the call to a human agent if the node is returned to more than a certain number of times in a row—for example, 2 times. In this way, the user is first asked to repeat their query twice, if the third attempt again results in a transition to the out of domain node, the action then comprises handing off to the human agent.

If a condition is met for a global rule for which the action is a transition to a node in S603b, the engine 44 executes a transition to the resulting node.

If the current node (reached either through e.g. a global or local transition) is passive, the node functions are performed, any utterance is accumulated in the current turn information 51 in S604. At 605, it is determined if the node comprises a listen function. If there is no listen function (a passive node), the system returns to S601. The steps are repeated until the current node comprises a listen function (an active node). At this point, the system prepares a response by concatenating the saved dialogue acts, outputs the response, and awaits a new user input. Responses are constructed by putting together multiple utterances specified by the nodes that the system has traversed during a turn. Thus if the node is active, the system response is constructed and output in S607, and the system waits for the new user input. Responses are constructed by putting together the one or more utterances accumulated from the nodes transitioned through during the turn, for example by concatenating them, together with any arguments. Any delayed utterances from previous turns are also included. Turns end at a node with a listen function, which is also referred to as an "active node". These are the points in the conversation where it is expected that the user gives a new input.

Where the node information indicates that a delay should be provided before providing the node output to the user, the utterance is stored in the dialogue information 51 and provided in the subsequent turn.

The dialogue manager 5b also outputs configuration settings defined in the listen function at the end of the turn in S608—this will be described in more detail below. The output configuration settings are then used to update the configuration of one or more of the ASR module 3, the NLU module 4, the dialogue manager 5b, the voice composer 6, the orchestrator 7 or the telephony module 2.

Once a listen function has been executed, the dialogue turn ends. In the next dialogue turn, the method returns to the start node of the main conversational flow, or in an alternative implementation, the method returns to the node identified as the current node. The dialogue engine 44 then proceeds to assess the global rules, and if no global transition is made, with the transitions defined by the main flow.

Optionally, before executing a function of a node, a precondition is assessed to check whether there is a need to execute that function. The precondition may check information stored in the dialogue information 41 for example. This may enable the engine 44 to skip through certain nodes.

A StopNode is the end node of the flows 42. Once a StopNode is reached, the conversation ends and no further system responses will be produced. A natural way of transitioning to StopNode is after a FinalNode, when the users query has been dealt with, but it can also happen in the middle of conversation e.g. when there is no user input. A StopNode does not comprise any of the "says", "listen( )" or "transition( )" functions.

Natural Language Understanding Module

Figure 8A:
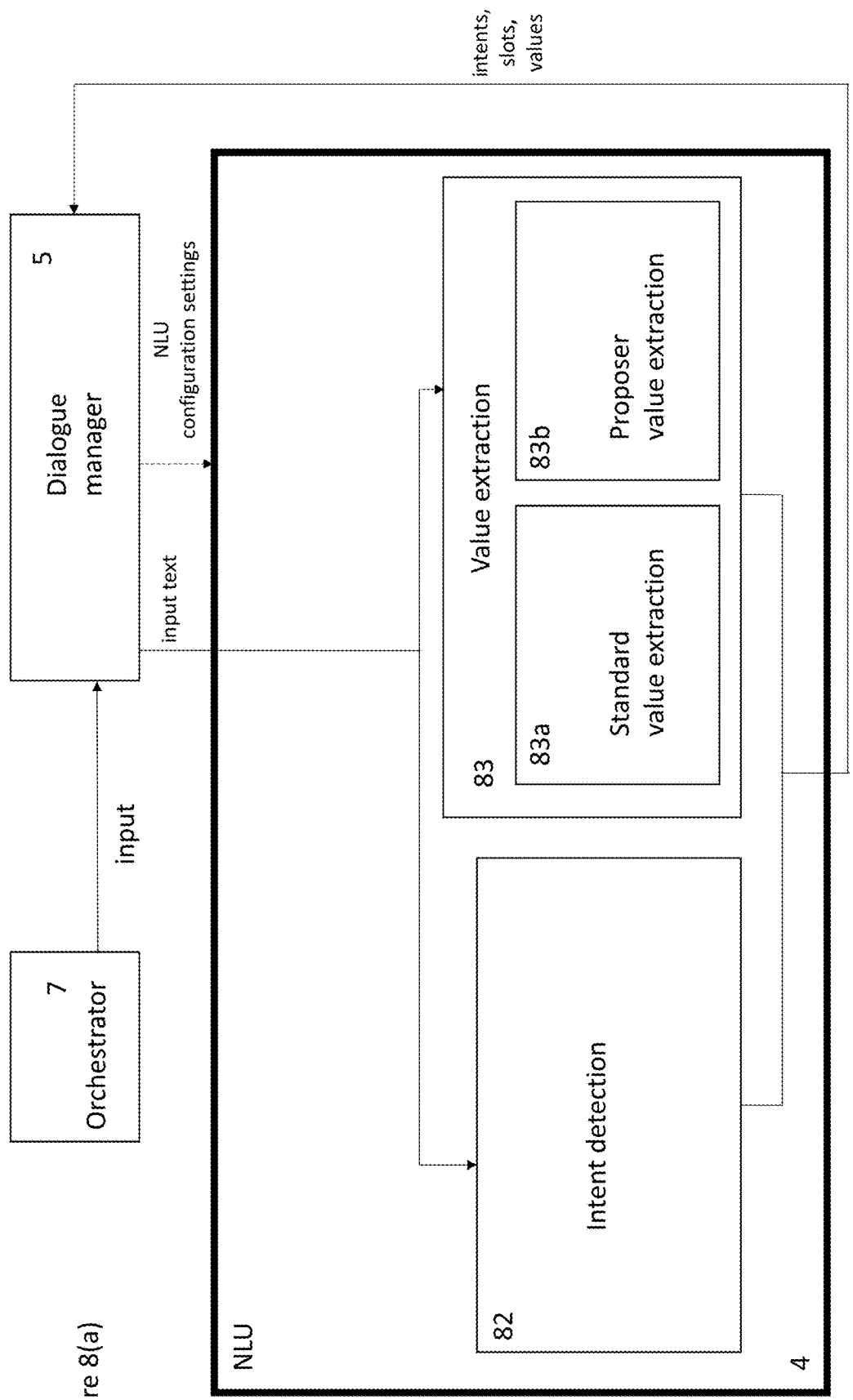
FIG. 8(a) shows a schematic illustration of an NLU module 4 according to an example.

FIG. 8(a) shows a schematic illustration of an NLU module 4 according to an example. The NLU module 4 in this example comprises an intent detection module 82 and a value extraction module 83. The intention detection module 82 and the value extraction module 83 each receive a text signal generated from the user input, for example by the ASR module 3—this is referred to as the input text in the following section. The intention detection module 82 outputs any intents corresponding to the input text and the value extraction module 83 outputs any slots and values corresponding to the input text. This output information is then provided to the dialogue manager 5b. The output values and intents are examples of dialogue information determined from an input signal by the language module 4. The NLU 4 enables and supports model training and runtime user text inference.

The value extraction module 83 comprises a standard value extraction module 83a and a proposer value extraction module 83b. Whether the standard value extraction only or the standard value extraction together with the proposer value extraction is used is a configurable setting of the NLU module 4. The input text is directed to only the standard value extraction module 83a, or both the standard value extraction module 83a and the proposer value extraction module 83b based on this setting, which may be a turn level configuration setting.

Where the dialogue platform 1 is configured for multiple languages, the NLU module 4 may comprise multiple NLU modules, one for each language. Alternatively a translation module may be provided, to translate the input text in a first language to a second language before it is provided to the NLU module 4. Which language is used is a configurable setting of the NLU module 4. Furthermore, the ASR module 3 may comprise an audio profiling module 37 configured to detect the language of the user input. This information is then provided to the orchestrator module 7, which in turn provides this information to the dialogue manager 5, which provides the information in turn to the NLU module 4 allowing the module to change to a different language if required.

An example standard value extraction module 83a will now be described.

Each dialogue domain is defined by a domain ontology. The domain ontology comprises information which can be used to model the user goal expressed up to a given point of the conversation. This point of the conversation is referred to as a "dialogue state". The domain ontology comprises one or more slots. Each dialogue slot corresponds to a subject that a speech signal may relate to, such as the party size for a restaurant booking for example. The dialogue slot may take on one or more "values". The term "value" is used here to refer to any information that fills the slot, and is not limited to numbers—for example the value may be the restaurant name. For example, where the text signal corresponding to the user input is "I would like a table for 4 people please", the standard value extraction module 83a extracts a "party size" slot with the value "4". If the next user input is "Oh actually, make that 5 people", the standard value extraction module 83a should extract the "party size" slot with the value "5". Similarly, where the user input is "Cool, book me at 5 pm", the standard value extraction module 83a should extract the slot "booking time" with the value "5 pm", and so on. For each dialogue turn, the standard value extraction module 83a extracts a set of one or more pre-defined values from the user input. The result is stored in a Turn object. These values are provided in the turn level dialogue state information—also referred to here as dialogue information.

A dialogue state may comprise a set of one or more slots with their corresponding slot values. For example, a dialogue state can be specified by the fact that both food type and price range are known at that point in the dialogue, so both a food type slot and a price range slot have a corresponding value (e.g "Thai" or "Chinese, and "cheap" or "expensive"). The set of slots is chosen based on the domain.

A dialogue system for restaurant search and reservation should help the users to find and book a restaurant according to their personal taste and wishes. For example the system should book a place with cheap Thai food in central Cambridge, or recommend a cheap Chinese place in North Cambridge if the user makes inquiries about such places. Slot labelling or slot filling is a component used in a task-oriented dialog system. Its goal is to fill the correct values associated with a set of one or more predefined slots. For example, a dialogue system for restaurant bookings is expected to fill slots such as date, time, and the number of guests with the values extracted from a user utterance (e.g., next Thursday, 7 pm, 4 people).

The standard value extraction module 83a may use rule-based methods such as template matching or grammar-based methods for example to extract the slot values. Alternatively, data-driven methods can be used, in which statistical models learn from annotated data. Techniques including Inductive Logic Programming, Generative Probabilistic Models, Weighted Finite State Transducers, Support Vector Machines and many others may be used for example. The standard value extraction module 83 may also be treated as a sequence labelling problem, where each word in an utterance is labelled. Labelling models such as Conditional Random Fields or Recurrent Neural Networks can be used. An example value extraction method which may be used is described in U.S. Ser. No. 11/132,988B1, "Dialogue system, a dialogue method, and a method of training", the entire contents of which are incorporated by reference herein. An example method of extracting the slot values from the user utterance which is performed by the standard value extraction module 83a is described below, but as explained, other methods of NLU may be used in the standard value extraction module 83a. The example method is based on span labelling. A labelling model based on Conditional Random Fields is used.

Figure 8B:
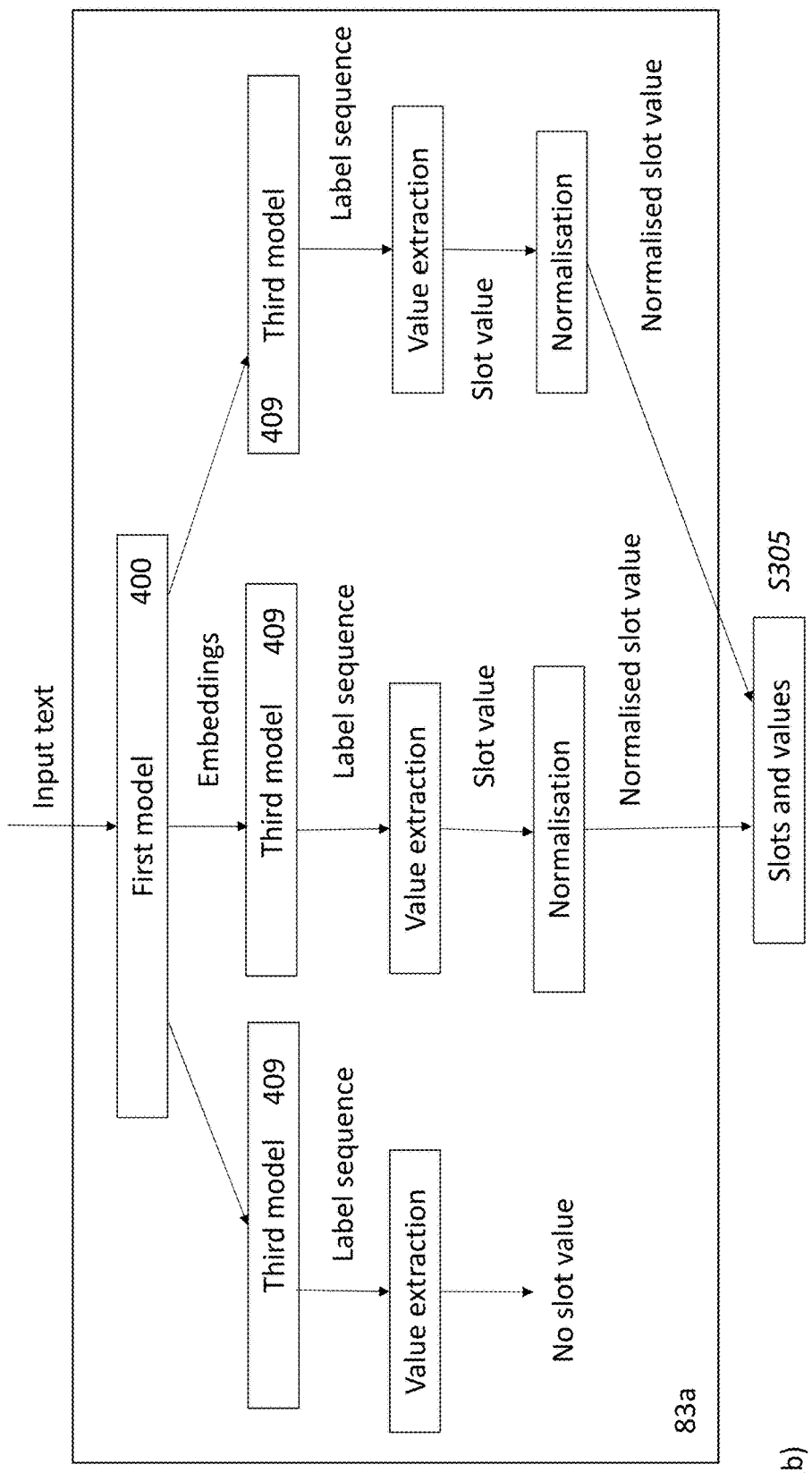

FIG. 8(b) shows a schematic illustration of the example standard value extraction module 83a.

Figure 8C:
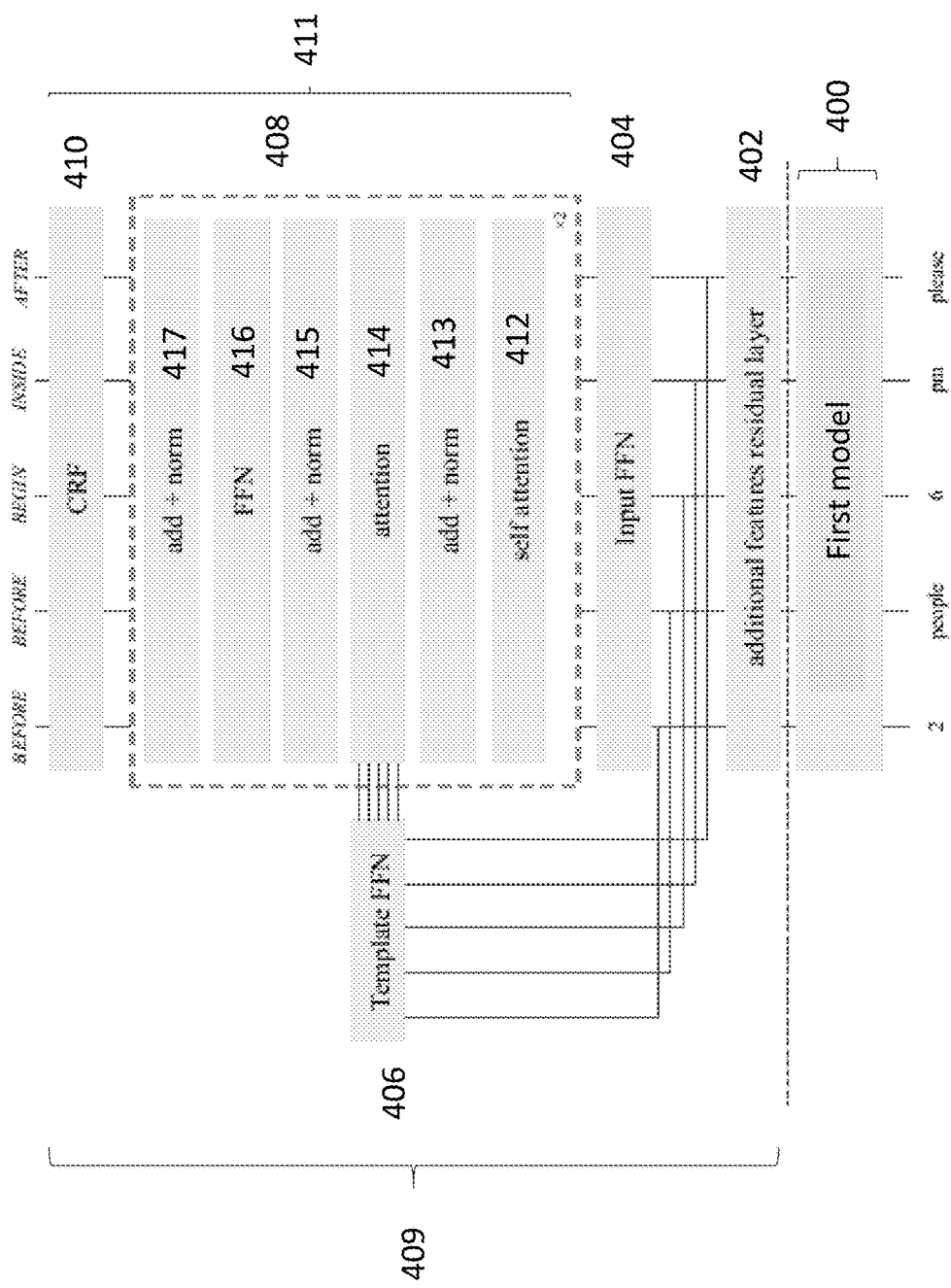
FIG. 8(c) is a schematic illustration of a first model 400 and a third model 409, used in the standard value extraction module according to an example.

FIG. 8(c) is a schematic illustration of a first model 400 and a third model 409, used in the standard value extraction module 83a according to an example.

Figure 8D:
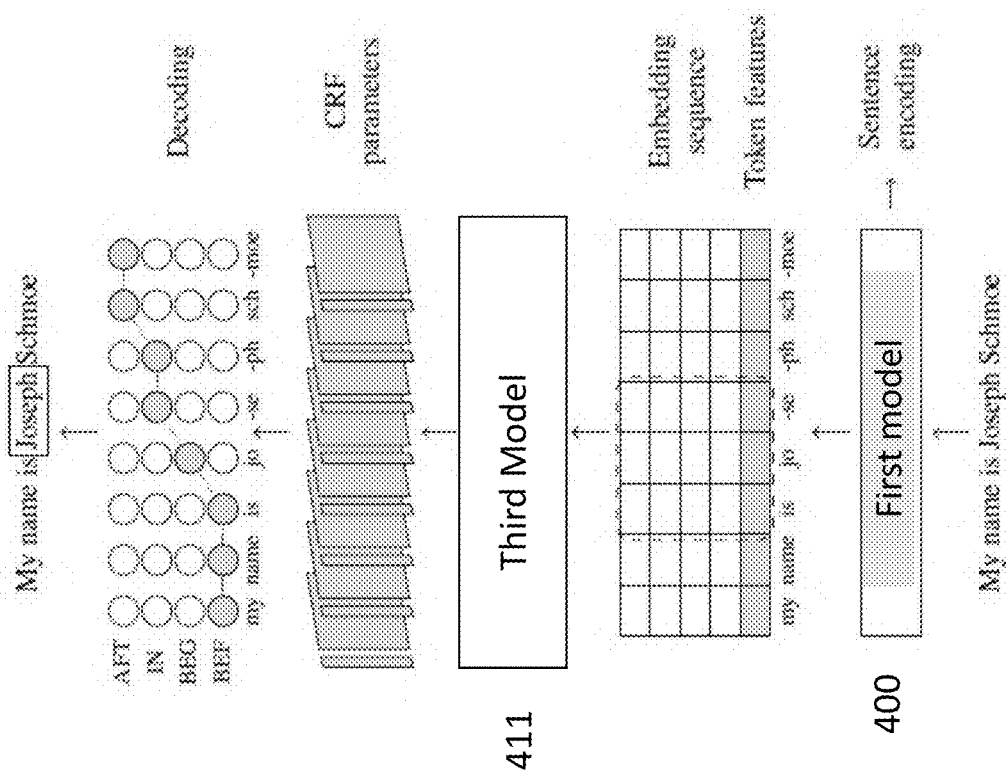
FIG. 8(d) shows the inputs and outputs at various stages as an input text is processing by the first module 400 and third model 411 shown in FIG. 8(c)

FIG. 8(d) shows the inputs and outputs at various stages as an input text is processing by the first module 400 and third model 411.

A text signal is taken as input to the standard value extraction module 83a. The text corresponds to a turn in a dialogue. The input signal may be "2 people 6 pm please" for example. The text signal is taken as input to the first model 400. The first model 400 encodes the text sequence. The first model 400 represents the text input as a sequence of vector representations, also referred to here as embeddings. Each embedding corresponds to a token. In this example, the token may be a sub-word. A fixed number of embeddings T is generated for each input, where the first model 400 performs truncation or padding/masking in this regard.

For some domains, additional context features such as a binary "slot is requested" feature can be incorporated. An optional residual layer 402 in the third model 409 that computes a term to add to the output encoding, given the encoding itself and the additional features, is included in such cases. The node information stores the requested slot. This is a configurable setting of the NLU module 4. The dialogue manager 5b outputs the information to the NLU module for the turn indicating the name of the slot being requested from a list of slots. This is then used to set the binary "slot is requested feature".

In this example, the standard value extractor model 83a comprises multiple third models 409, where each third model 409 corresponds to a different slot. The third models 409 will be described in more detail below. For clarity, in FIGS. 8(c) and (d), only a single third model 409 is shown. However, it is to be understood that the output of the first model 400 shown in these figures may be inputted to multiple third models 409 in the same manner shown, and as illustrated in FIG. 8(b). For each turn, the standard value extractor model 83a can output more than one (slot, value) pair. In the example shown in FIG. 8(b), two of the third models 409 return values for the input. A third model 409 is run for each slot, checking if a value for this slot has been mentioned in the current utterance. For example, the input utterance "2 people for 6 pm please" comprises a value for the slot "party size" (two) and a value for the slot "time" (6 pm).

In the third model 409, the embeddings are taken as input to an input feed forward network 404 and also as input to a template feed forward network 406. In particular, a set of D dimensional subword representations are input to the template FFN 406 and the same set of D dimensional input sentence subword representations are input to the input FFN 404, where D may be 512 for example. The FFNs 404 and 406 have hidden layers [512, 128] in this example, bringing the dimensionality down to 128. This scales down the number of parameters in the later layers. These layers use fast GELU (Gaussian Error Linear Unit) activation, and the models further comprise layer normalisation. The updated input representations ($x_i$) are output from the FFN 404 with dimension 128, and the updated template representations ($z_i$) are output from the FFN 406 with dimension 128.

A repeating block 408 follows. A self-attention layer 412 operates on the ($x_i$). This is single-headed. This produces new representations ($x'_i$). A layer normalisation 413 is then performed such that $x_i \rightarrow$ layernorm ($x_i + x'_i$). An attention 414 over ($z_i$) operates on the ($x_i$), again using 16 dimensional projection. This produces new representations ($x'_i$). A layer normalisation 415 is then performed such that $x_i \rightarrow$ layernorm ($x_i + x'_i$). Finally, new representations $x'_i \rightarrow W_2$fast_gelu ($W_1 \cdot x_i$) are generated by FFN layer 416, where W1 and W2 are weights matrices. A layer normalisation 417 is then performed such that $x_i \rightarrow$ layernorm ($x_i + x'_i$).

CRF transition parameters and unary scores are then computed using dense linear layers on each $x_i$. In particular, the vectors output for the second repeated block 408, i.e. a sequence of T vectors, is taken as input to the CRF layer 410, which is a linear layer which computes Conditional Random Field (CRF) parameters for tagging the value span using the four tags: BEFORE, BEGIN, INSIDE, and AFTER. Spans are represented using a sequence of tags, indicating which members of the subword token sequence are in the span. The distribution of the tag sequence is modelled with a CRF, whose parameters are predicted by the second model 411 that runs over the contextualized subword embeddings output from the input FFN 404. Each span comprises a continuous sequence of units, with the spans ordered BEFORE, BEGIN, INSIDE, AFTER. For a given utterance and slot, one or more spans may not be present. For example, if the slot value is at the start of the utterance, then none of the tokens should be tagged BEFORE.

As shown in FIG. 8(*d*), the output of the second model 411 comprises a sequence of tags corresponding to each token in the input text signal. As described above, the standard value extractor model 83*a* comprises multiple third models 409, each corresponding to a different slot. Each second model 411 therefore outputs a sequence of tags. The parts of the input text signal corresponding to the tags BEGIN and INSIDE are then extracted for each slot. In other words, the parts of the input text signal corresponding to the tokens tagged as corresponding to the slot value are extracted. In the example described here, the BEGIN and INSIDE tokens correspond to the slot value. For slots where the output of the second model 411 contains no tokens labelled BEGIN or INSIDE, no value is extracted for the slot for the turn.

The extracted part of the input phrase for each slot is then normalized to a slot value. This can be performed using a rule-based system. For example, for cases such as times, dates, and party sizes, a hierarchical rule-based parsing engines, for example Duckling, may allow for parsing times and dates such as "the day after next Tuesday". Further, phrases such as "Me and my wife and 2 kids" can be parsed using singular noun and number counts in the span.

Once a slot value is extracted, this is paired with the slot corresponding to the third model 409, resulting in a slot value pair. Thus for each third model 409 which returns a value, the value is paired with the slot corresponding to the model, and the set of slot value pairs output. The probability may also be output as the probability of the slot value.

The weights and biases of the first input FFN 404, second template FFN 406, self-attention layer 412, attention layer 414, further FFN layer 416 and final linear layer 410 are the trainable parameters of the third model 409. The values of these parameters, together with the trainable parameters of the first model 400, are learned during a training process, which will now be described below. Instead of relying on more general pre-training objectives such as language modelling or response selection, a pre-training objective based on a sentence-pair value extraction task is used in this example. This task is well aligned with the intended usage on sequence-labelling tasks. Unlike during inference, during a pre-training method, pairs of different sentences from a training data set are taken as input. In an example, the pairs of sentences are selected from free text entries into social networking engines, restaurant review sites et cetera. Each pair comprises an input sentence and a template sentence. Each pair of sentences have a keyphrase in common. One sentence is treated as a template sentence and the other as its corresponding input sentence. For the template sentence, the key phrase is masked out and replaced with a token reserved for the keyphrase, referred to here as the BLANK token. An example input sentence is "Table for 4 pm please" and template sentence is "meet you at [BLANK]", where the phrase "4 pm" has been replaced by [BLANK] token in the template sentence.

An input sequence of embeddings is generated by the first model 400 from the input sentence, and a template sequence of embeddings is separately generated by the first model 400 for the template sentence. During the pre-training stage, a residual layer 402 is not included.

The input set of embeddings corresponding to the input sentence is taken as input to the first input FFN 404. However, unlike during inference, when the input embeddings are also taken as input to the second template FFN 406, during the pre-training process, the template embeddings are taken as input to the template FFN 406. The token [BLANK] corresponds to an embedding. The first FFN 404 outputs a first sequence of first representations, each representing a token of the input data and the second template FFN 406 outputs a second sequence of second representations, each representing a token of the template data, including the BLANK token. The first sequence of embeddings output from the first input FFN 404 is taken as input to the second model 411, in the same manner as described above. The second model 411 determines a tag sequence. The attention layer 414 uses the second sequence of second representations output from the template FFN 406.

The second set of vector representations output from the second template FFN 406 in the training stage is generated from the template sentence, rather than the input sentence. Attention over the projected template sentence representations is therefore provided at attention layer 414. This provides features for every token in the input sentence that take into account the context of both the input sentence and the template sentence. As during inference, the output is the most probable sequence of tags from the set BEFORE, BEGIN, INSIDE, and AFTER corresponding to the subword tokens. These are predicted by the second model 411, comprising the sequence-level decoder layers.

The input sentence is automatically labelled with the "true" tag values. The part of the input sentence prior to the identified key phrase is labelled "BEFORE", the part of the input sentence corresponding to the key phrase is labelled "BEGIN" and "INSIDE", and the part of the input sentence after the key phrase is labelled "AFTER". These labels are applied automatically, based solely on the key phrase. The units of the input sentence are each labelled with a true transition score matrix and unary potential vector, i.e. with a value of 1 corresponding to the true tag for the unit and a value of 0 corresponding to the other tags. In this way, "raw" unlabelled natural language data is automatically converted into training examples for the pre-training based on the sentence-pair value extraction task. The trainable parameters of the first model 400 and the third model 409 are then updated based on the labels. In this way, the second model 411 is trained to identify the first part of the input data as corresponding to the first tag (i.e. the BEGIN and INSIDE tags in this example).

A further training method may be performed after the above process, in order to fine-tune. In this method, multiple copies of the pre-trained third model 409 are fine-tuned, each copy corresponding to a different slot. The third models 409 share the first model 400, the parameters of which are not updated in this step. To apply the value extractor model 83*a* to slot-labelling for a specific slot, the user utterance is treated both as the input sentence and the template sentence, where at the fine-tuning stage and during inference, the user input does not contain any BLANK token. This effectively makes the attention layers 414 in the second model 411 act like additional self-attention layers. During the fine-tuning stage, each training example is a dialogue turn annotated with the slots requested by the system and character-based span indexing for all occurring values. The second model 411 is trained to identify the part of the input data labelled as the slot value (i.e. with BEGIN and INSIDE in this example) for each slot as corresponding to the slot value tags. The training examples may be specific to the intended slot in the fine-tuning training stage, and manually annotated. The trainable parameters of the third model 409 are updated. In this process, the pre-trained model is fine-tuned to fit domain-specific slot labelling data. By using a pre-training and fine-tuning process, the model can be applied to a wide spectrum of slot-labelling tasks.

The trained standard value extraction module 83*a* is included in the platform code 1. It will be understood that in other examples, the platform code 1 may comprise a reference to the value extraction model 83*a*, for example allowing it to be imported for execution.

The proposer value extraction module 83*b* will now be described. The proposer value extraction module 83*b* comprises one or more specific value extraction models. Each of these specific value extraction models are configured to capture values for specific slots with constrained value structures, for example postcodes in the UK or in the US, or package tracking numbers. The standard value extraction module 83*a* is run for every dialogue turn. Where the configuration setting indicates, one of the specific value extraction models is run in addition to the standard value extraction module 83*a*. The specific value extraction models may be based on regular expressions. For example, when a slot value corresponding to a phone number is expected, a specific value extraction model based on a regular expression corresponding to a phone number structure can be used for the dialogue turn. An example of a specific value extraction model is described in U.S. Ser. No. 11/537,661B2, "Systems and methods for conversing with a user", the entire contents of which are incorporated by reference herein.

An example of a specific value extraction model that may be used in the proposer value extraction module 83*b* will now be described. In the specific value extraction model, a pre-defined regular expression (regex), the first regular expression, is used to identify a character sequence from the input text corresponding to a slot value. The first regular expression is pre-defined based on the expected format of the value. For example, if the specific value extraction module is intended to be used to capture a value which is a 4 letter security code, the regular expression corresponds to the expected format or structure of the code, i.e. 4 letters. A pre-defined first regular expression which captures valid codes is used in this step. The first regular expression specifies a character sequence format corresponding to a slot value.

A regular expression is a sequence of regular characters and/or metacharacters that specify a search pattern. For example, in the regex [a][a-z], [a] is a regular character which matches only 'a', whereas [a-z] is a metacharacter corresponding to the character set 'a, b, c, . . . , x, y, z', at least one of which must be a match. Therefore, this regex matches, for example, 'ab', or 'ag', or 'am', but not 'bg' or 'a7'. Such patterns are used for search operations on text strings. The regular expression may be understood as a sequence of characters and/or metacharacters that specify a pattern to match. The first regex specifies a character sequence pattern or structure.

By using a regex, pattern matching may be used to search for a character sequence that corresponds to an expected pattern rather than constructing multiple, literal search queries. For example, when a 4 letter code is being sought, a suitable regex would be "[A-Za-z] [A-Za-z] [A-Za-z] [A-Za-z]". Here, "[A-Za-z]" means any uppercase characters from "A" to "Z" or any lower case characters from "a" to "z". Another example is for obtaining a UK postcode where the 3rd and 5th characters are normally a number. In this case, the regex may be: "[A-Za-z] [A-Za-z] [0-9][A-Za-z0-9] [0-9] [A-Za-z] [A-Za-z]".

The specific value extraction model may also access a list of spelling attempts from previous turns, to avoid repeatedly suggesting values that have already been suggested to the user and not confirmed.

The proposer value extraction module 83*b* is also included in the platform code 1. It will be understood that in other examples, the platform code 1 may comprise a reference to the proposer value extraction module 83*b*, for example allowing it to be imported for execution.

The value extraction module 83 may further comprise a parsing module. The parsing module parses values extracted by the standard value extraction module 83*a* or the proposer value extraction module 83*b*. The parsing module may be implemented using one or more finite state transducers (FSTs), a date parsing library, and/or one or more machine-learning models, e.g. one or more neural networks for example. Parsing may be applied to some of the extracted values but not to others. For example, it may be applied for certain slots. The parsing module outputs data in a format of a specific data type, for example a date. For example, the parsing module may transform values for user data fields corresponding to dates from a transcription of a speech input of a date into a date data format, e.g. a numerical date data format. By transforming dates into a date data format, comparison of extracted dates with reference dates used for identification or verification may be facilitated for example. The parsing module may also perform parsing for spellings for example.

Referring back to FIG. 1(*c*), in S202, for each user input (each dialogue turn), a set of one or more values, each corresponding to a slot, is outputted and stored in the current turn information 51 in the dialogue information 41. This information is then used in S203, for example to determine whether the condition of one more global rules is fulfilled as has been described previously. For example, the global rules of the dialogue policy may contain an action to update the values of the slots in the dialogue state information 55 if a condition has been met, as described previously. The slots are also referred to here as entities. The values represent information that is relevant to the user's purpose. In the input "I'd like to make a booking for 2 people at 5 pm", both the time ("5 pm") and the party size ("2 people") are slot values, also referred to here as entities.

As well as outputting slots and values, the NLU step S202 may also output intent information. Intents are the interpretation by the NLU module 4 of what users are saying. The NLU module 4 classifies inputs from users according to a list of possible intents, which reflect what the users want. For example, features representing the input text signal from S201 are extracted and inputted into one or more intent classifiers. Examples of intents include:
1) restarting the conversation;
2) what is the address;
3) what are the opening hours;
4) ask manager.

An example intent detection module 82 is described in "Efficient Intent Detection with Dual Sentence Encoders", Casanueva et al, arXiv:2003.04807, the entire contents of which is incorporated by reference herein.

Figure 8E:
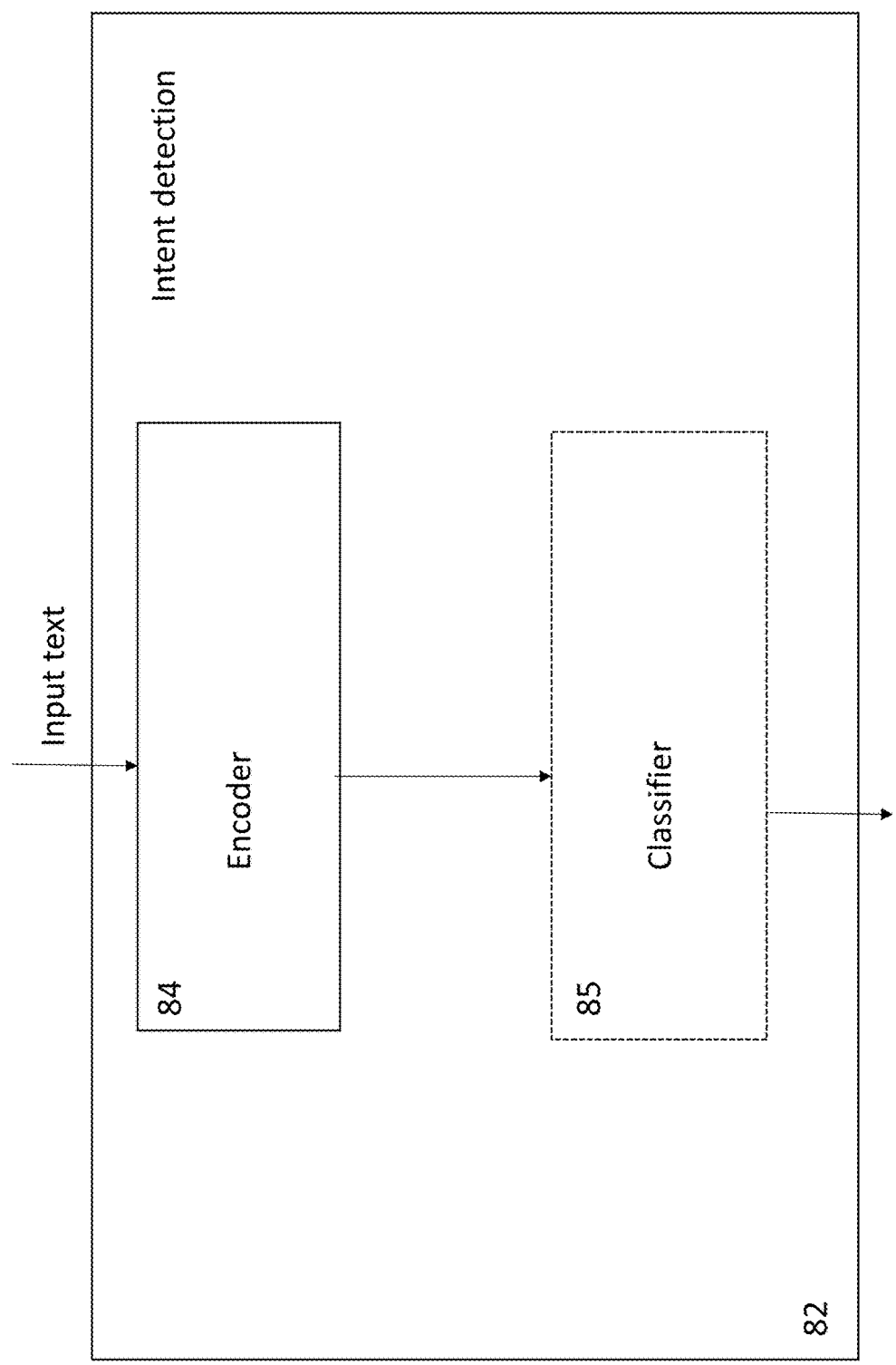
FIG. 8(e) is a schematic illustration of an example intent detection module 82.

FIG. 8(e) is a schematic illustration of an example intent detection module 82. The intent detection module comprises an encoder 84 and a classifier 85.

The encoder 84 is included in the platform code 1. It will be understood that in other examples, the platform code 1 may comprise a reference to the encoder 84, for example allowing it to be imported for execution. In this example, the classifier 85 is project specific. Therefore the classifier 85 is included in the project code 16. The platform code 1 comprises a functionality to provide the encoder output to the classifier 85 in the relevant project code 16, and receive the intent information output from the classifier 85 in the project code 16.

An input text is taken as input to the encoder 84. The encoder 84 generates a vector representing the input text. In one example. The encoder 84 is a pre-trained sentence encoder. A sentence encoder such as BERT may be used for example. A sentence encoder as described in "ConveRT: Efficient and Accurate Conversational Representations from Transformers, Henderson et al, arXiv:1911.03688v2, 29 Apr. 2020, the entire contents of which is incorporated by reference herein may be used for example. A sentence encoder as described in U.S. Ser. No. 11/210,306B2, "Dialogue system, a method of obtaining a response from a dialogue system, and a method of training a dialogue system", the entire contents of which is incorporated by reference herein, may be used for example.

Figure 8F:
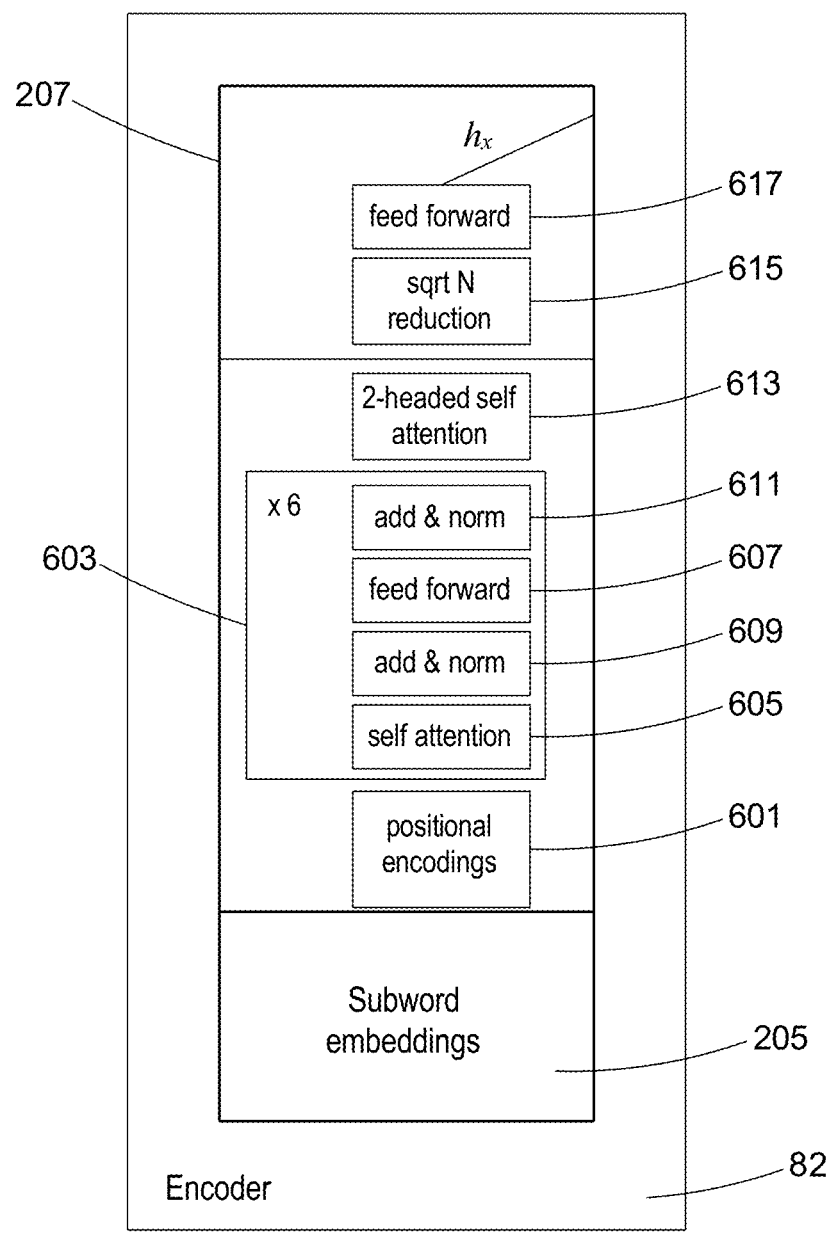
FIG. 8(f) shows a schematic illustration of an example encoder 84.

FIG. 8(f) shows a schematic illustration of an example encoder 84. The encoder 84 is generated by training a dual-encoder model on a response selection task. The training process will be described in more detail below.

In use, the encoder 84 receives the input text. The input text is represented by a sequence of vectors, also referred to as embeddings, by a subword embedding model 205, also referred to here as a first part 205. Each embedding corresponds to a token. In this example, the token may be a sub-word. The same vocabulary of tokens used by the standard value extraction module 83a may be used.

The sequence of embeddings is inputted to a second part 207 of the encoder 84. The second part 207 is trained to encode the sequence of embeddings into an output vector referred to as a context vector and shown as $h_X$ in the figure.

The second part 207 comprises a "positional encodings" layer 601. In an example, the length of the sequence of embeddings fed into the second part 207 is truncated to a fixed number of units, for example to 60 units. In case the output is shorter than the fixed number, the sequence is padded accordingly so that all the sequences are of the same length. In the positional encodings layer 601, the subword embeddings sequence is augmented with positional encodings. The positional encodings are in the form of vectors, with one positional encoding vector corresponding to each location in the input sequence. The positional encoding vector is summed with the corresponding embedding in the sequence. Various methods of generating the positional encoding vectors may be used, for example the positional encodings may be learned as parameters of the second model, or fixed. The sequence of vectors output from the positional encodings layer 601 is then fed into a first block of a set of M repeating blocks 603. In the example shown in FIG. 8(f), M=6. For simplicity, a single block 603 is shown in the figure, with the repetition indicated by "x6". The output sequence of each block 603 is fed as an input to the next block 603. The output of the final block 603 is a sequence of vectors, in this case the sequence having the same length as the sequence output from the first model 205.

Each block 603 comprises a self-attention layer 605, a layer-normalization step 609, a feedforward neural network 607 and a further layer-normalization step 611. In this example, the self-attention layer 605 uses single head attention.

The output of the final block 603 is taken as input to a two headed self-attention layer 613. The two self attention heads each compute weights for a weighted sum, which is scaled by the square root of the sequence length in the square-root-of-N reduction layer 615. The use of two headed attention improves the model's ability to focus on different positions compared to single headed attention, whilst still being relatively quick and efficient to train, and using less parameters to obtain similar results than an 8-headed attention for example. The output matrix is then reduced with square-root-of-N reduction 615 to convert the sequence to a single fixed-dimensional vector.

The reduced output is taken as input to the final feed forward layer 617, which outputs the context vector $h_x$, having length D. The reduced representation is passed through a series of H fully connected n-dimensional feed-forward hidden layers with GELU as the non-linear activation. The final layer feed forward layer 617 is linear and maps the text into the final representation $h_x$ for the input text.

The second part 207 has been trained using a training data set comprising corresponding queries and responses. In an example, the queries and responses are selected from free text entries into social networking engines, restaurant review sites et cetera. In an example, a fully anonymized Reddit data set is used, comprising around 3.7B of comments in its conversational threads.

Figure 8G:
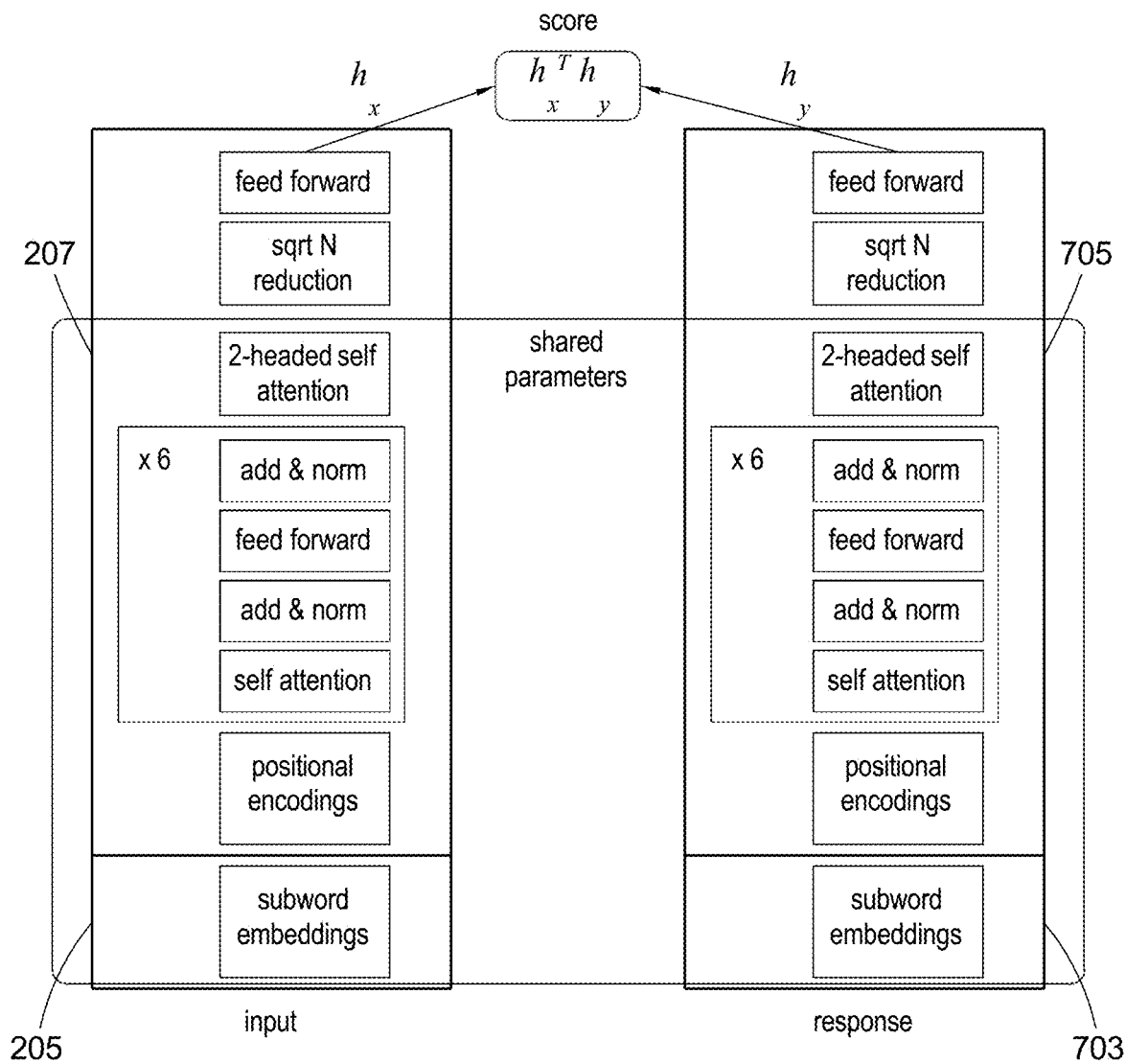
FIG. 8(g) shows an example dual encoder used during training.

FIG. 8(g) shows the dual encoder used during training. A description of the training process will now be given. The subword embeddings model 205 is trained together with the second part 207. The subword embeddings model 205 and second part 207 are jointly trained as part of a dual encoder model. The embeddings are optimised during the training process. The parameters of the second part 207, including the weights of the neural networks and self-attention layers, are also optimised during training.

The dual encoder further comprises a third part 703. The third part 703 uses the same stored vocabulary and embeddings as the first part 205. The third part 703 and the first part 205 thus share the embeddings, i.e. trainable parameters. The dual encoder further comprises a fourth part 705. The fourth part 705 is similar to the second part 207. The parameters of the fourth part 705, including the weights of the neural networks and self-attention layers, are also optimised during training. Some of these parameters may be shared with the second part 207.

During training, input data and response pairs are received. The input is processed by the first part 205 to produce the sequence of embeddings for the input, and the response is processed by the third part 703 to produce the sequence of embeddings for the response. An embedded representation for the response is the input to the fourth part 705 and an embedded representation for the comment is the input for the second part 207. The output of the second part 207 is a context vector $h_X$, the output of the fourth part 705 is a response vector $h_Y$.

The two networks are jointly trained by considering the similarity between $h_X$ and $h_Y$. $S(Y, X)$ is the score of a candidate reply Y given an input data X. This score may be computed as a scaled cosine similarity of the context vector that represents the input, and the response vector that represents the response:

$$S(Y, X) = C \frac{h_Y \cdot h_X}{|h_Y||h_X|} = C \hat{h}_Y \cdot \hat{h}_X$$

where C is a learned constant, and $\hat{h}$ is h normalized to a unit vector.

The below loss function is used:

$$\sum_{i=1}^{N} S(Y_i, X_i) - \sum_{i=1}^{N} \log \sum_{j=1}^{N} \exp(S(Y_j, X_i))$$

Where ($Y_i$, $X_i$) are pairs of responses and input data that go together in training, and N is the batch size. The loss function is used to train the parameters of the dual encoder model, meaning that the gradient of this loss with respect to each parameter of the dual encoder, including C, is determined using back-propagation, and then each parameter is updated using an optimiser function. This loss function maximises the score of pairs that go together in training, while minimising the score of random pairings.

During inference, the encoder 84 comprises the trained first part 205 and second part 207. The encoder 84 outputs a vector representation $h_x$ for the input text. This is taken as input to the classifier model 85. In this example, the classifier model 85 is a multi-layer perceptron model 85. The classifier model 85 outputs a probability that the input vector representation $h_x$ corresponds to each of a set of two or more intents. In other words, the classifier is a multi-class classifier.

In this example, the Multi-Layer Perceptron (MLP) 85 comprises one hidden layer with ReLU non-linear activations, followed by an output layer with a softmax activation function for multi-class classification. The dimension of the output layer corresponds to the number of classes—i.e. the number of possible intents. The value of each element in the output vector corresponds to the probability that the input text corresponds to the particular intent.

The MLP model 85 is trained separately to the encoder 84. In this example, a project specific MLP model 85 is trained for each project, using training data provided by the second or third user. This will be described in more detail below. In other examples, a general MLP model 85 may be trained using an intent detection dataset. Example such datasets include Web Apps, Ask Ubuntu, or the Chatbot Corpus (described in "Evaluating natural language understanding services for conversational question answering systems", Braun et al, 2017, In Proceedings of SIGDIAL, pages 174-185).

The MLP model 85 is trained using the pre-trained encoder 84 to process the input text. The MLP model 85 comprises a number of trainable parameters, including the layer weights and biases. The parameters are initialised as random values. The MLP model 85 is trained using stochastic gradient descent (SGD). A process of updating the parameter values by computing the gradient of a loss function and updating the parameter values using the computed gradient and an optimiser function is performed. A cross entropy loss may be used. An optimiser function with a learning rate of 0.7 and linear decay may be used. For example, an AdamW optimiser function may be used. In one example, a dropout of 0.75 may be used during training, and the MLP 85 trained for 500 iterations to reach convergence. During training, the gradient of the loss with respect to each of the trainable parameters of the MLP 85 is determined through back-propagation. The gradient is then used to determine the updated parameters, using the optimiser function.

The intent detection model 82 may work in a multi-label scenario, where multiple intents are classified. The intent detection model 82 comprises a fixed sentence encoder 84 and a trained multi-label classifier 85. In this example, the intent detection module 82 comprises a project-specific classifier 85 trained on top of a shared, fixed sentence encoder.

Referring back to FIG. 1(c), for each dialogue turn, turn level dialogue state information comprising one or more slot values and/or one or more detected intents is output from S202. This information is stored in the current turn information 51 in the dialogue information 41, and used by the dialogue policy module in S203 to determine a dialogue act. The dialogue state information 55 is updated by the global rule actions and the node functions of the dialogue policy module 5. This may mean a reduced execution time for storing data to and retrieving data from the stored dialogue information 41.

Although an example NLU module 4 has been described, other types of NLU models may be used. In particular, although intent detection and value extraction has been described, the platform 1 also allows for customization and integration of other NLU solutions. NLU models of various different architectures may additionally or alternatively be included, using the same data exchange formats and APIs to interact with the dialogue manager 5, such that the NLU module 4 may be changed to integrate different NLU models without changing other parts of the platform. For example, new intent detectors and value extractors may be integrated into the NLU module 4 in addition to or replacing the intent detector and value extractor models described above.

Project File and Project Code

As has been described previously, a project file 14 is generated and/or edited by a second and/or third user. Once a save command is made, the project file 14 is stored in the project store 13 on the dialogue system 100. When a deployment command is made, the project code 16 is generated from the project file 14, and the project code 16 is run together with the platform code 1 to form a project.

Figure 10A:
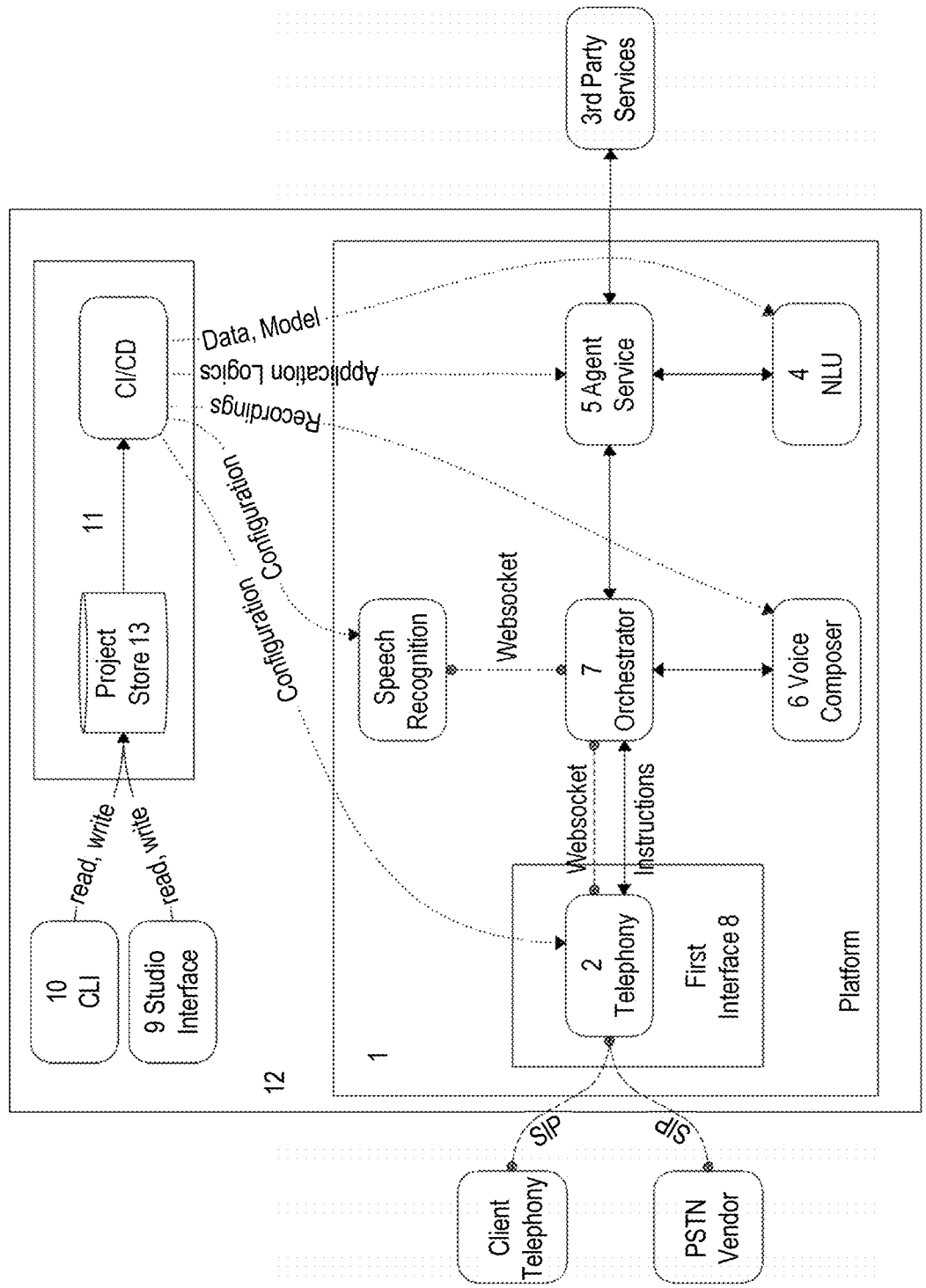
FIG. 10(a) shows an example dialogue program 12, including a number of modules that allow a second user, for example a designer, and a third user, for example a developer, to create and configure a project for a particular use case.
Figure 10B:
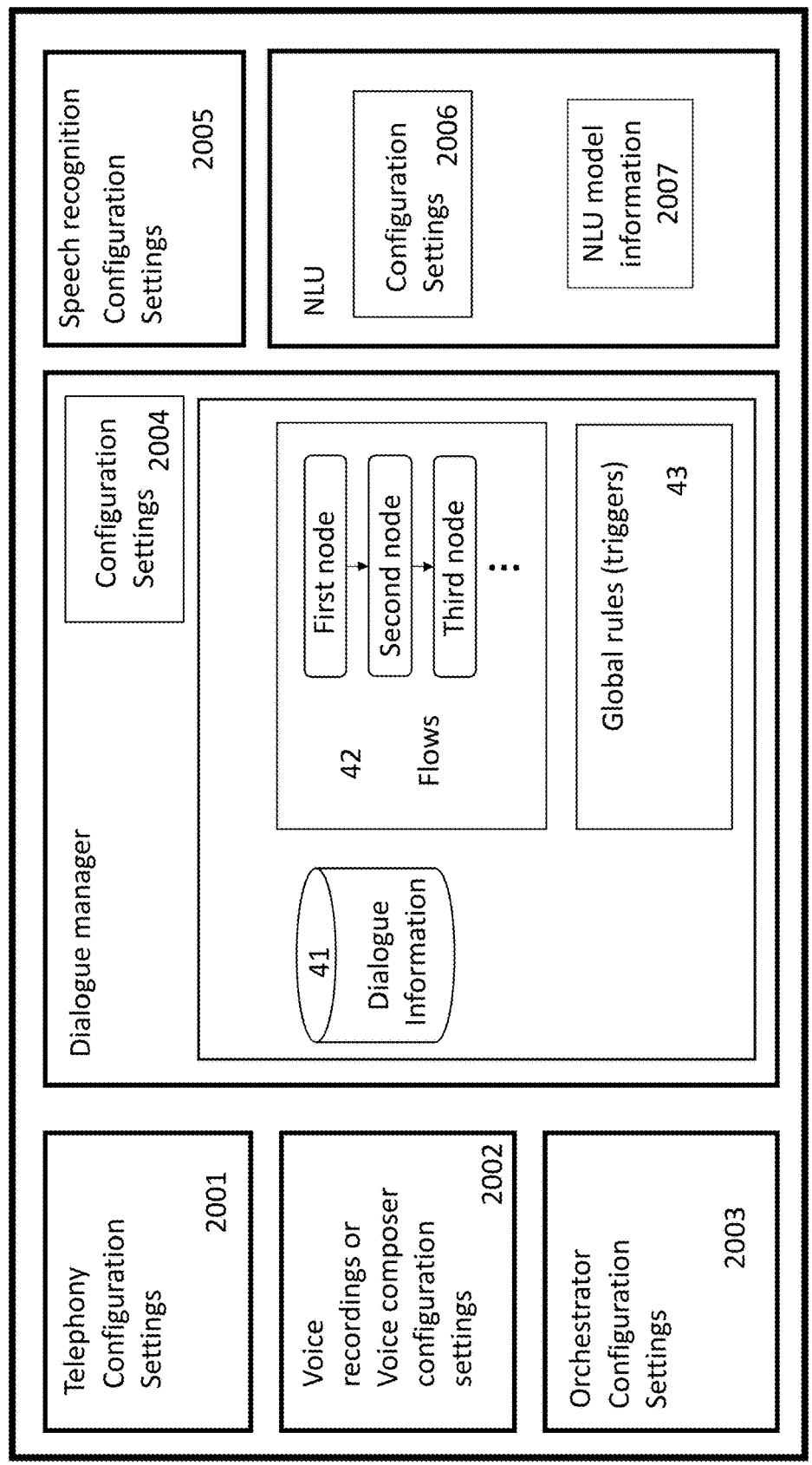
FIG. 10(b) shows an example of a project file 14 provided by a second or third user.

FIG. 10(b) shows an example of a project file 14 provided by a second or third user. The project file 14 may comprise one or more of: telephony 2001, orchestrator 2003 and ASR 2005 configuration settings, voice recordings or configuration settings 2002 to be used by the voice composer 6, dialogue manager configuration settings 2004, components of a dialogue manager 5b (in this example, the dialogue information 41, the flows 42 and the global rules 43), and NLU configuration settings 2006 and model information 2007.

The telephony 2001, orchestrator 2003, ASR 2005, dialogue manager 2004 and NLU configuration settings 2006 are project level configuration settings. These configuration settings are provided or edited by the second user or the third user in the project file 14. As well as these project level configuration settings, as shown in FIG. 5, the node information stored in the dialogue flows 42 may comprise turn level configuration settings. These configuration settings are also provided or edited by the second user or the third user in the project file 14, in the dialogue flow information 42.

The dialogue manager configuration settings 2004 stored in the project file 14 may specify which language is used by the dialogue manager 5 (for example English) to generate the system utterance in the correct language for multilingual projects. The dialogue manager 5 then uses the set of pre-defined text templates corresponding to the selected language when generating the system output.

The ASR configuration settings 2005, and/or the ASR configuration settings stored in the node information, may comprise one or more of the following configuration settings:

- language: which language specific ASR module is to be used from the set of models 32 (for example English);
- interjection: whether to monitor for inputs that are too long, and how long should users speak before an interjection—this information specifies the length of the first pre-defined time period to be used by the timing monitor 33, which in turn determines how frequent the system acknowledgement should be;
- asr_timeout: the maximum time to wait for the speech to text API—this information specifies the length of the second pre-defined time period to be used by the timing monitor 33;
- N_best: how many N best candidates are to be provided as output from the ASR 3 by the N-best list selection 71;
- focus_patterns: a list of prebuilt output patterns the agent should pay attention to, choices are: YES_NO, PAX, NAME_SPELLING, ALPHANUM, NAME, DATE, PRECISE_DATE, TIME, NUMERIC, . . . etc—this is provided to the bias module 35 so that the ASR module transcribes expected patterns with greater accuracy;
- keyword_focuses: a list of keywords or key phrases to focus on—this is provided to the bias module 35 so that the ASR module transcribes expected terms with greater accuracy;
- shortcircuit_keywords: a list of short-cut keywords to be used by the short cut module 31;
- custom_endpoints: a specific ASR model to be used from the ensemble of ASR models 32 (if more than one ASR model for the selected language is included);
- corrections: custom ASR corrections to be used by the correction module 36.

The NLU configuration settings 2006 and/or the NLU configuration settings stored in the node information, may comprise one or more of:

- parsing mode: whether the parsing module is used;
- the requested slot corresponding to the node;
- a list of expected spelling patterns, for example regular expressions, to be matched for the next user input—this is a list for the proposer module 83b and also selects whether the proposer module 83b should be used.

The telephony configuration settings 2001 and/or the telephony configuration settings stored in the node information may comprise one or more of:

- channel: which channel the system is expecting a user to respond on—this might be either DTMF (where a user provides an input by pressing keys on a keypad) or speech, or both for example;
- number_of_digits: number of digits expected over DTMF channel;
- timeout: dtmf timeout time—a time period after which a signal is sent to the basic handler 25 indicating that no response was received;
- finish_on_key: the key that signals the end of DTMF turn;
- message_text: message that will be said during DTMF collection;
- message_is_ssml: whether this message is SSML;
- audio_url: audio that will be played during DTMF collection;
- repeat: how many times to repeat the message.

The orchestrator configuration settings stored in the project file 14 may specify whether the system allows the user to interrupt—the dialogue manager 5, based on the understood media content, decides whether to allow barging in—this is implemented by setting the interruption setting flag described previously.

As mentioned, as well as the above described configuration settings, the project file 14 may further comprise a stored set of voice recordings to be used by the voice composer 6. Where a TTS module is to be used, the project file 14 may further comprise configuration settings for the TTS module.

The project file 14 further comprises a set of dialogue flows 42. The dialogue flows 42 have been described previously.

The project file 14 further comprises a set of global rules 43. The set of global rules 43 has been described previously.

The project file 14 further comprises the dialogue information 41. The dialogue information 41 has been described previously. When creating or editing the project file 14, a second or third user can input names and phone numbers of departments to route to, and/or a list of customers to identify and recognize, into the dialogue information 41 in the project file 14 for example.

The project file 14 further comprises NLU model information. The NLU model information is information provided by the second and/or third user to allow a classifier 85 to be trained in this example. For example, the second and/or third user enters a set of one or more intents in the NLU model information 2007 in the project file 14. The second and/or third user may select the intents from a list of possible intents or manually create a new intent. Where the second and/or third user creates a new intent, the user inputs a name of the new intent as well as examples of sentences that users might be expected to say in relation to the intent. For example, for a new intent relating to "Opening hours", example sentences such as "What times can I come in", "How late are you open", "When are you open" and "When are your opening hours" may be entered by the second and/or third user. The second or third user thus provides a set of project specific sentences corresponding to different intents in the NLU model information 2007. These sentences are created and annotated by the second or third user per project and stored in the NLU model information in the project file 14.

Once this information has been provided, a save command is made, and the project file 14 is stored in the project store 13 on the dialogue system 100.

A further command to train the classifier 85 is then received. The training module 17 in the dialogue program 12 then calls the encoder 84 to encode the set of project specific sentences provided in the NLU model information 2007 in the project file 14. These sentences are encoded using the pre-trained encoder 84 which has been described previously. The encoder 84 may be made available as a service on the cloud for example. The encoder 84 generates sentence embeddings from the project-specific sentences. The training module 17 then uses these sentence embeddings to train a project-specific classifier 85, as has been described previously. The project-specific classifier is then available as a service for the specific project. The project-specific classifier code 85, or a reference to the project-specific classifier code 85, is then included in the project store 13. As has been described previously, the encoder code 84 (or a reference to the encoder code 84 which allows it to be called as a service) is included in the platform code 1.

When a deployment command is made, the project code 16 is generated from the project file 14, and the platform code 1 and project code 16 are run together. The project code 16 comprises the project-specific classifier code 85, or a reference to the project-specific classifier code 85 allowing it to be called as a service. As has been described previously, the encoder 84 and the project-specific classifier 85 are then used during implementation to obtain the intents from the post-ASR data provided by the NLU module 4. When a second or third user updates the set of annotated sentences in the project file 14, this update is visible in the project store 13, and the project-specific classifier 85 is then retrained by the training module 14.

The second or third user can also configure hyper-parameters for training the NLU models in the model information 2007. A backup of the default hyper-parameters for training the NLU models is also kept in the project file 14, in case the second or third user wants to restore their original state.

As mentioned, when a deployment command is made, the project code 16 is generated from the project file 14. The project code 16 comprises the telephony, orchestrator and ASR configuration settings, voice recordings or configuration settings used by the voice composer 6, dialogue manager configuration settings, dialogue manager 5b, and NLU configuration settings and NLU models (or references to the models allowing them to be called). In particular, the project code 16 comprises the classifier 85 in this example. Optionally, the project code 16 may further comprise one or more specific value extraction models to be included in the proposer value extraction module 83b for example.

Turn Level Configuration Settings

The node information stored in the dialogue flows 42 may comprise turn level configuration settings, as has been described above. These configuration settings are also provided or edited by the second user or the third user in the project file 14, in the dialogue flow information 42. As shown in FIG. 6, for each dialogue turn, the dialogue manager 5b outputs any per-turn configuration settings for one or more of the speech recognition module 3, the orchestrator module 7, the telephony module 2, the voice composer module 6 and the natural language understanding module 4 to the platform code 1. Any such configuration settings are thus provided to the relevant modules in S608, which then update their configuration based on the provided settings. This allows the various modules to be configured differently per turn, enabling a more accurate understanding and response to the user input to be provided.

As has been described previously, the configuration settings are provided in the project file 14 for the full project—the project level configuration settings. Per-turn local customisations to the configuration settings may then be made within the project, by setting the configuration settings in the listen function information stored in the active nodes in the dialogue flows 42 in the project file 14. This allows the dialogue program 12 to exhibit per-turn behaviours that are not the same as the specified global behaviour. For example, the NLU configuration settings stored in the node information instruct the NLU module 4 how to behave for the next turn. Thus, the NLU component may detect intent, or retrieve slots and values with greater accuracy.

For example, for a particular dialogue turn, the system response output by the dialogue manager 5 in S607 is a "binary" question, to which there are two alternative expected answers, for example yes/no. An example of such a question is "Have you ever been to Canada?". The expected response is a "Yes" or a "No". The dialogue manager 5 provides a configuration setting in S608 to the speech recognition module 3 corresponding to a list of prebuilt output patterns that the speech recognition module 3 should pay attention to, in this case "yes" and "no". For example, the dialogue manager 5 may provide a configuration setting that sets the list of words of interest for the biasing module 35 to comprise words related to "Yes" or "No" (e.g., 'Yeah", "yep", "correct", "nope", "no"...), with a high weight. This means the ASR model is more likely to recognise these words. This improves the performance of the system, since the ASR is then more likely to generate the correct text based on the user input.

Configuration settings are specified in the listen function information stored in the active nodes. For the current turn, the dialogue manager 5b outputs the configuration settings stored in the current node. The listen function in each active node specifies the listen behaviour of the system, by storing configuration settings. The configurations settings may comprise one or more of: dialogue manager configuration settings, voice recordings or voice composer configuration settings, orchestrator configuration settings, NLU configuration settings, ASR configuration settings and telephony configuration settings. The dialogue manager 5b outputs instructions to different parts of the platform 1 at the end of the dialogue turn, based on the configuration settings. These instructions are directed to the telephony module 2, orchestrator 7, speech recognition module 3, voice composer 6 and/or NLU module 4. Configuration settings may also control aspects of the dialogue manager itself.

Various platform modules can therefore be configured for voice interactions at a per turn (therefore at a per node) level. The settings provided at the end of the dialogue turn are relevant for the next turn. By outputting the configuration settings taken from the node information in the project code 16 at the end of a dialogue turn, the dialogue manager 5b is able to provide contextual instructions to the ASR, orchestrator, voice composer, NLU and telephony modules so that there is a higher chance to understand and parse the next user input correctly. For example, if the system asks a "binary" yes/no question such as "Have you ever been to Canada?", then it will expect to hear a "Yes" or a "No". If the system asks "What is your postcode?", it expects a standardized next-utterance input from the user: a 5-digit input the US or in Croatia, while in the UK a string of 6-7 alphanumeric characters with a certain format is expected. If the system is recognising a particular accent or language (e.g., Scottish English), the speech result can also be tuned to cater to that particular demographic or language.

Creating and Editing a Project File

FIG. 10(a) shows the dialogue program 12, including a number of modules that allow a second user, for example a designer, and a third user, for example a developer, to create and configure a project for a particular use case.

The dialogue program 12 comprises a project store 13, which allows distributed version control. Git is an example of a program that can be used for distributed version control. A project file 14 is stored in the project store 13. A project file 14 comprises heterogeneous data ranging from telephony and ASR configurations, voice recordings, dialogue manager flows, information and global rules, and NLU training data, configuration settings and models, as described previously. Project level configuration settings are provided in the project file 14.

The deployment module 11 comprises a CI/CD module, which performs continuous integration (CI) and continuous deployment (CD) of the platform code 1 with the project code 16. This module safeguards the developer changes received through the third interface 10 or designer changes received through the second interface 9 through a testing and automatic deployment framework. The test service 18 includes behaviour tests, language understanding tests, and voice prompt tests. It also provides a one-click rollback to a particular git hash, which allows quick rollback and hot fixes.

The second interface 9 provides a web application that exposes projects through a frontend. This allows business analysts, designers, and other non-developers to be able to change the project file 14 without technical training. Through the second interface 9, a second user can create and edit a project for an intended use case by editing a project file 14. The second user can add nodes to the dialogue flows 42 in the project file 14. The second user can add global rules to the global rules 43 in the project file 14. The second user can manually create the dialogue flows 42 and global rules 43, or use semi-automatic tools that can assist the second user in this process. Pre-built components (e.g., flows and sub-flows) can be used. The second user can also edit or enter configuration settings. The second user can provide NLU model information 2007. The second user can provide voice recordings 2002. The graphical user interface provided to the second user through the second interface 9 allows for creating a dialogue project in a no-code fashion, which is particularly suitable for less technical users. The graphical user interface provides three functionalities to the user, corresponding to three sections: Build, Analyze and Configure. These will be described further below.

The third interface 10 provides a command line interface, that allows developers to edit a local project file 14 using native software engineering tools such as git commands, IDE, debuggers etc. Through the third interface 10, a third user can create and edit a project for an intended use case by editing a project file 14. The third user can add nodes to the dialogue flows 42 in the project file 14. The third user can add global rules to the global rules 43 in the project file 14. Pre-built components (e.g., flows and sub-flows) can be used. The third user can also edit or enter configuration settings. The third user can provide NLU model information 2007. The third user can provide voice recordings 2002. When a save command is made in the command line interface program 412 running on the third device 400, the local project file 14 stored on the third device 400 is sent to the dialogue system 100. The project file 14 is stored in the project store 13 on the dialogue system 100. Through the third interface 10, a third user can create and edit a project 18 for an intended use case.

The command line interface program may allow the third user to use of native scripting languages such as Python to configure and embed custom logics into their voice assistants. Furthermore, the deployment pipeline is managed by the dialogue program 12.

By providing two interfaces, both software engineers and conversational designers (e.g. people without extensive technical experience) may create, maintain, and improve voice assistants. Developers and designers may cooperate on the same project using the two interfaces.

Once uploaded into the project store 13, the project file 14 is version controlled, for example by git. When a new deployment command is made, the deployment module 11 pulls the latest version of the project file 14 from the project store 13, packages it up as project code 16, launches a new container and deploys the project code 16 in the container.

Figure 11:
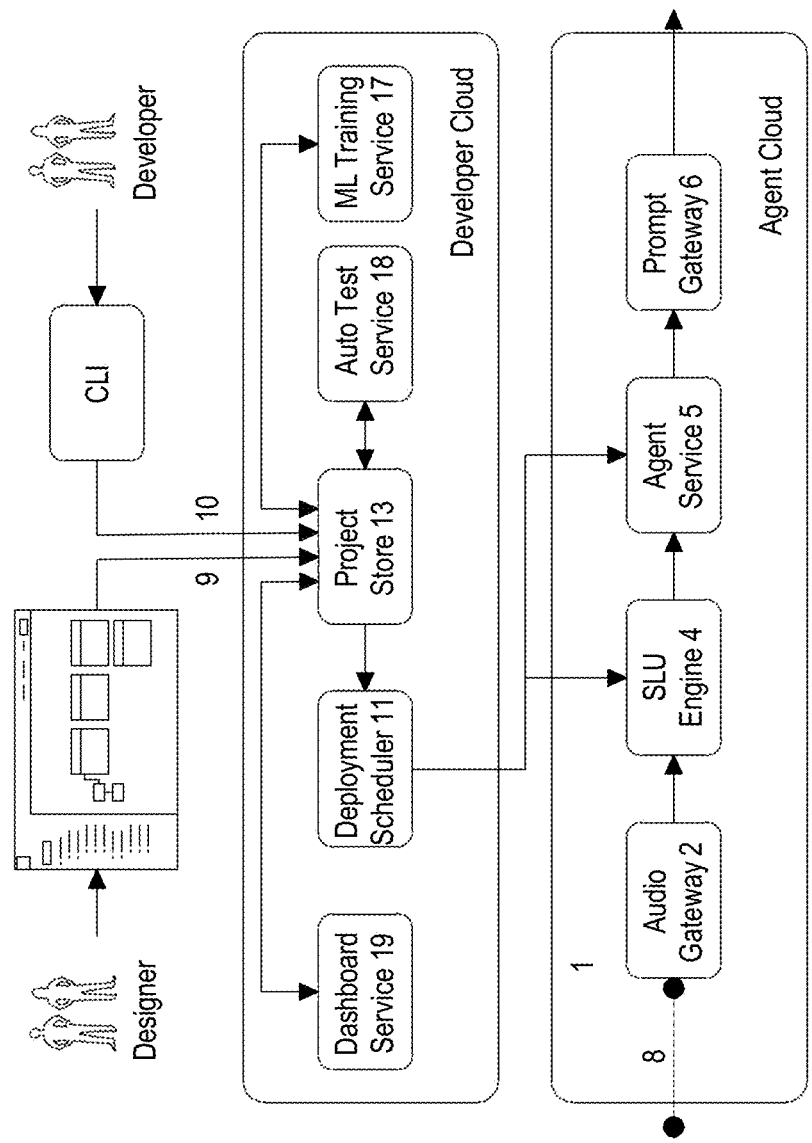
FIG. 11 shows a schematic illustration of an example of how a second user and third user can edit the same project file 14 as part of the same project.

FIG. 11 shows a schematic illustration of how a second user and third user can edit the same project file 14 as part of the same project. A developer cloud comprises the project store 13, deployment scheduler 11, test service 18, training service 17 and a dashboard service 19. The agent cloud comprises the platform 1.

FIG. 12 shows the functionality provided to the second user in the Build section of the GUI provided to the second user. As has been described previously, the dialogue manager 5b behaviour is directed by a collection of flows 42. Each flow is a dedicated user journey. It can be short—such as answering one customers question—or long and complex—such as identifying and verifying a customer, or scheduling a new flight. In the Build section of the graphical user interface, the functionality for creating a new flow to include in the dialogue flows 42 is provided.

Figure 13:
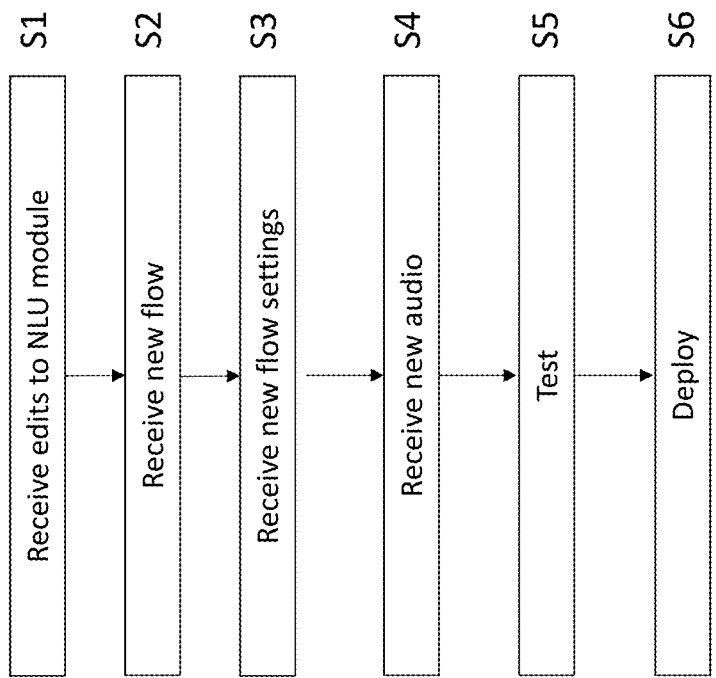
FIG. 13 shows a schematic illustration of a method of creating a new flow in the dialogue flows 42 through the second interface 9 according to an example.

FIG. 13 shows a schematic illustration of a method of creating a new flow in the dialogue flows 42 through the second interface 9. In this method, a second user adds a new flow to project file 14. The new flow provides an answer to a question users might ask during a dialogue. The new flow in this example relates to an FAQ—a question that users would typically ask when interacting with the dialogue system, and that typically requires a simple, single turn answer. An example FAQ is "What are your opening hours?". FAQs do not require any transactions to be performed. Complex flows such as making a transfer, booking a reservation or changing one's address might require additional nodes to be added in the flow.

In step S1, an edit to the NLU module information 2007 in the project file 14 is received through the second user interface 9. The second user selects "Intents" in the GUI shown in FIG. 12. The second user inputs a name of the new intent, and selects "create intent". In this example, the new intent is named "Opening hours". The second user then types in examples of sentences that users might be expected to say when asking this new FAQ, for example sentences such as "What times can I come in", "How late are you open", "When are you open" and "When are your opening hours".

Figure 14:
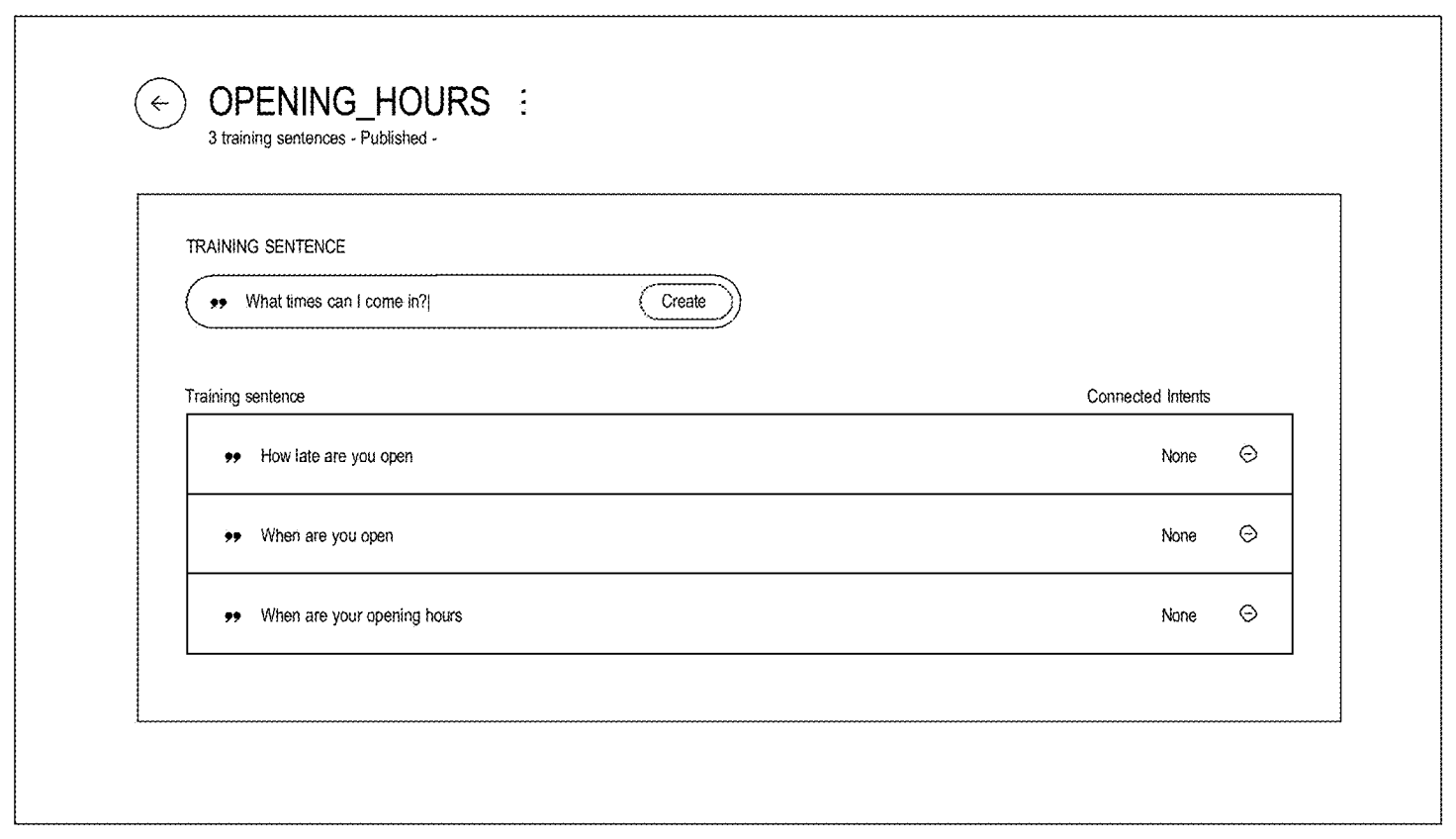

FIG. 14 shows an input for receiving these sentences provided by the graphical user interface. Once all of the intents and example sentences have been received, the training module 17 then trains the intent classifier 85, as has been described previously.

Figure 15:
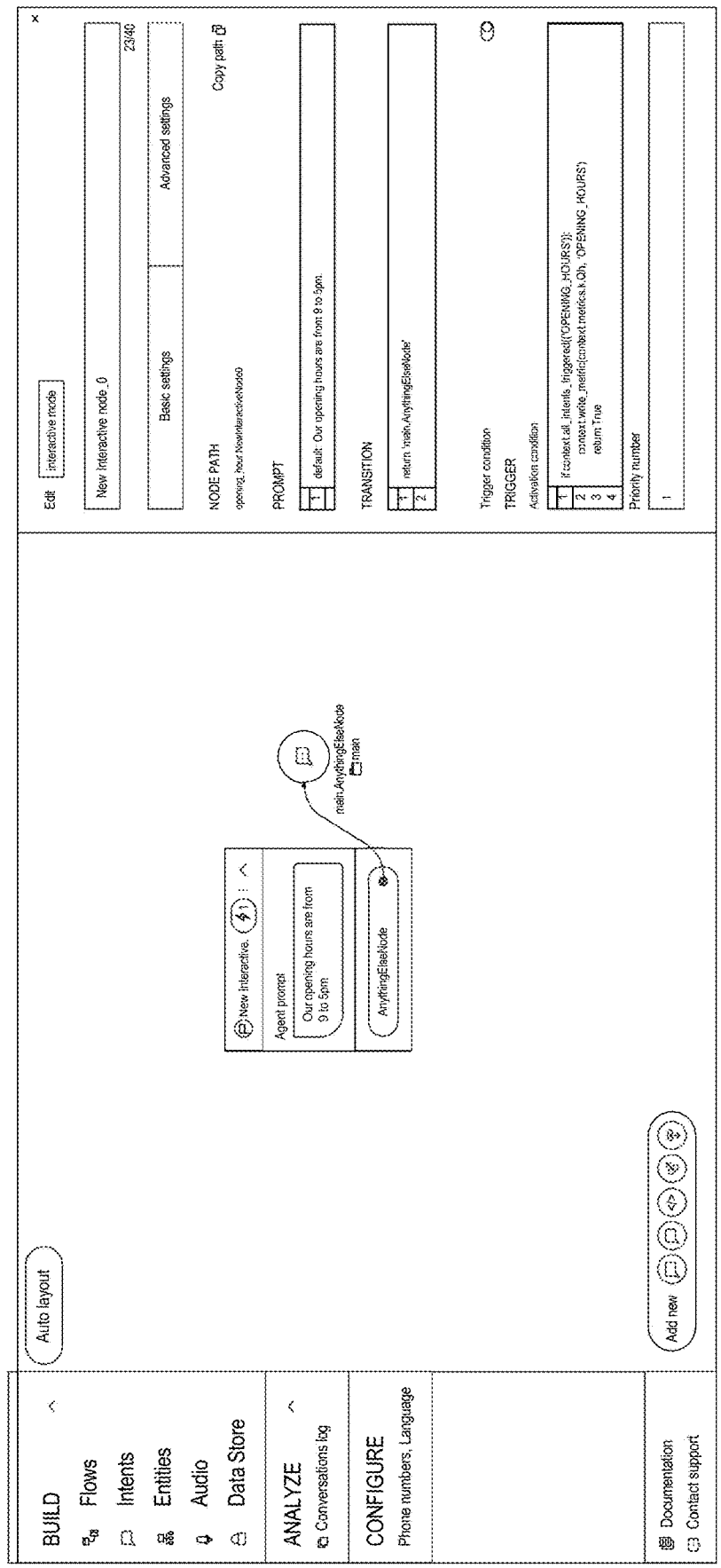
FIG. 15 shows an example of how the second user can enter and edit the node information.

FIG. 15 shows how the second user can enter and edit the node information. Once an intent has been added, in S2 of the method of FIG. 13, the flow to provide an answer to the intent is added to the dialogue flows 42 in the project file 14. The second user selects "Flows" in the GUI shown in FIG. 12. The user selects "create flow", then inputs a name for the flow. The second user can then set the main elements of the node in S3. This is shown in FIG. 15.

In this step, the user may set a global rule that has an action (then Y) corresponding to a transition to the node. The global rule contains a trigger condition (if X) that defines when the transition to the node occurs. For this example, a global rule could be:

if 'OPENING_HOURS' in context.intents:
   context.write_metric(context.metrics.k.QA, 'OPENING_
     HOURS')
   return True
return False This global rule states that if the intents that were detected by the NLU module 4 and stored in the current turn information 51 include "Opening Hours", then trigger the node (return True). Otherwise, do not trigger that node. The code context.write_metric(context.metrics.k.QA, 'OPENING_HOURS') requests to log a metric that this FAQ was asked by the user in the dialogue information 41, which can be used for analytics. It is also possible to set the priority number for the global rule in this step. In this example, a priority number of 1 is set.

The utterance that the dialogue system will output in response to the user input is entered in the "Prompt" box, which is the response the agent will speak back to the user. In this case, the utterance "Our opening hours are from 9 to 5 pm" is entered. This is stored in the node information, in the dialogue flows 42 in the project file.

The transition function, which defines the next node in the flow that the dialogue will transition to, is then set, corresponding to the behaviour the client wishes the system to perform next. In this example, it is desired to ask the user if there is anything else they would like to know. The transition function is therefore set to a node called 'main.AnythingElseNode'. The following transition function is implemented in the node information:
return 'main.AnythingElseNode'

The nodes and transition information are set according to the intended use cases, based on the information expected from the user and the information it is expected the user might request, for example.

The node information for the opening hours node comprises extra fields that can be customised: i.e., the second or third user can specify the actual opening hours associated with the node that are then combined into the configurable system response (i.e., the actual response is conditioned on the inserted values).

Figure 16A:
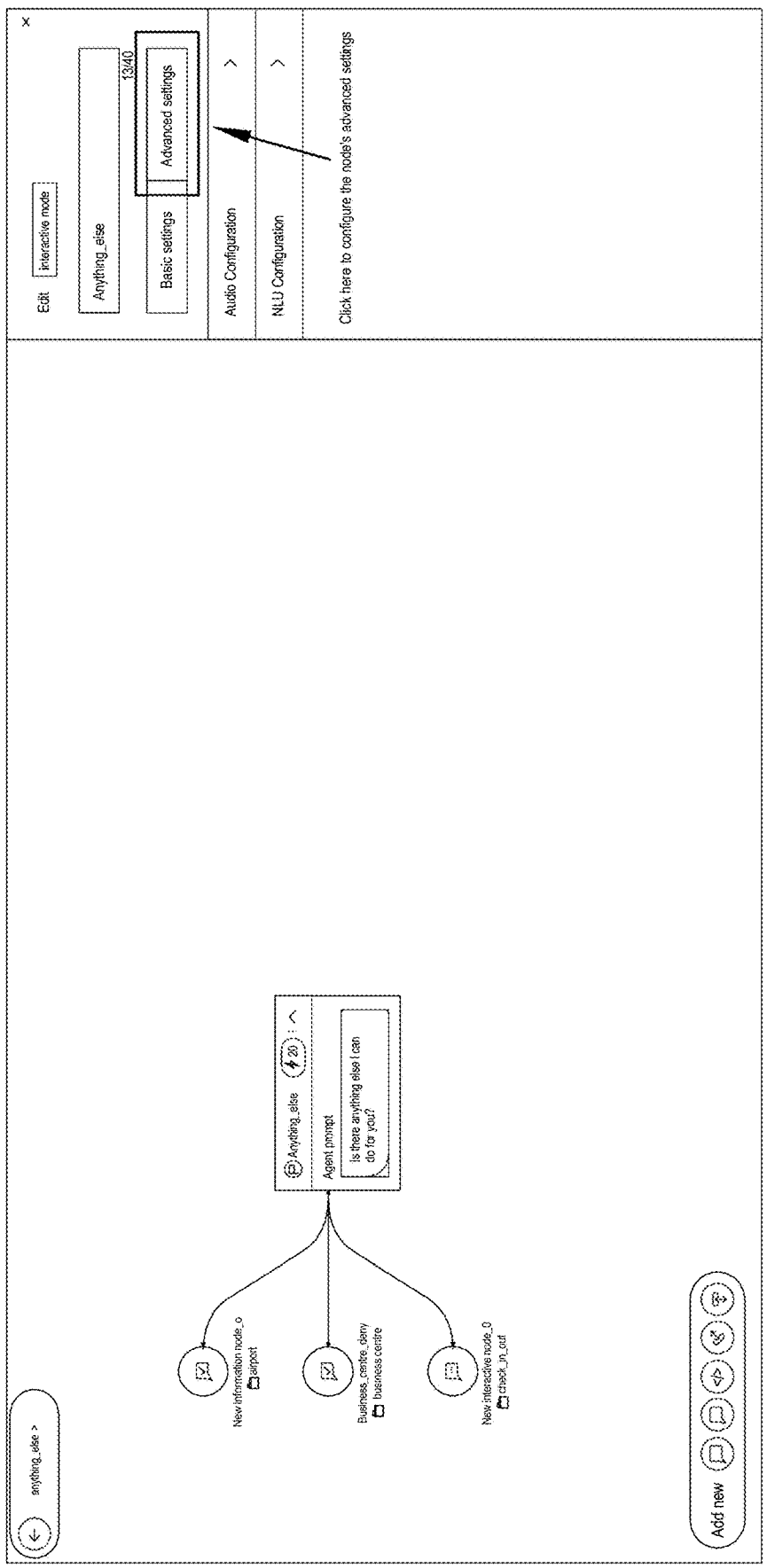
FIG. 16(a) shows a schematic illustration of an example advanced settings view for the "anything else" node.
Figure 16B:
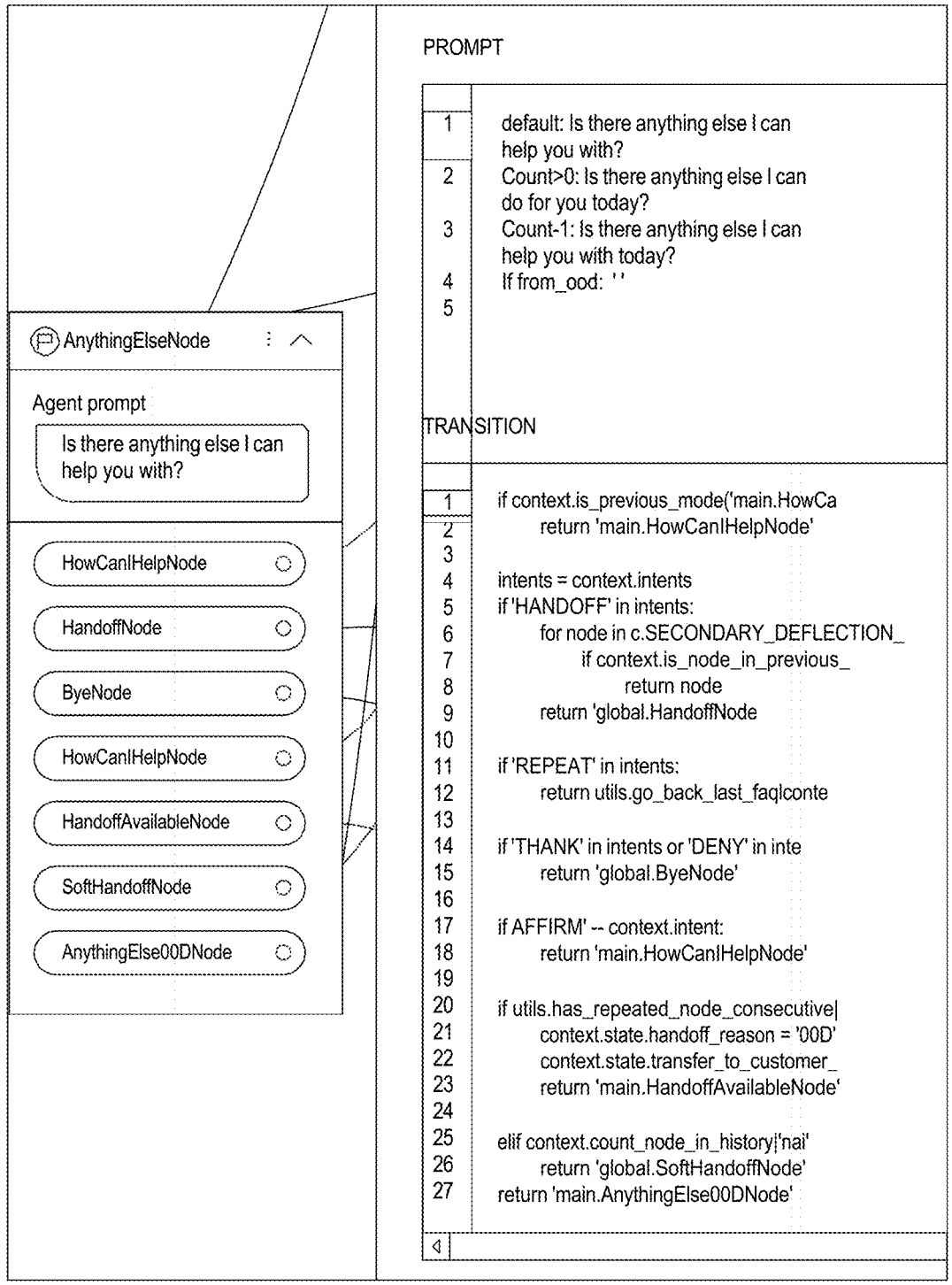
FIG. 16(b) shows another example of node information, in this case for the "Anything Else" node.

FIG. 16(b) shows another example of node information, in this case for the "Anything Else" node. It comprises the standard messages that it can display to the user:
default: Is there anything else I can help you with?
count>0: Is there anything else I can do for you today?
count>1: Is there anything else I can help you with today?

It also specifies standard transitions to other generic nodes:
  IF user input is 'yes' (i.e., the NLU module outputs AFFIRM intent), THEN transition to HowCanIHelp node (a node which asks the user how the system can help)
  IF user input is 'no' (the NLU module outputs DENY intent), THEN transition to the final node (Bye node) to end the conversation.

The configuration settings for the node may also be specified in this step. Configuration settings can be set at the node level. This means the developers or designers have a deep level of control over how the dialogue system should behave when listening and responding in different contexts in a dialogue. The node's "advanced settings" view allows the client to specify the configuration settings. Two options for editing the configuration settings are provided in this example—audio configuration and NLU configuration. Other configuration settings can be edited however.

FIG. 16(a) shows a schematic illustration of the advanced settings view for the "anything else" node.

By selecting the audio configuration, the second user is able to set the ASR configuration settings for the node. In this way, the performance of the ASR can be enhanced, by instructing it to 'expect' specific types of input at this node. The ASR Service gives the platform code 1 access to all the ASR models in the set of ASR models 32. The second user can then specify the per-node configuration, selecting one ASR model or another: e.g., if one ASR model works better with alphanumeric input, the configuration settings are set such that the platform 1 calls that ASR model service for that particular turn. For example, if the node comprises an utterance corresponding to the dialogue system asking "Would you like me to send you a SMS?", it can be reasonably expected for the user to respond with "Yes" or "No". By instructing the ASR to expect such an answer, it may process the answer more easily, and thus increase the chance that the response collected will be a Yes or a No. It will still be able to process another type of response however.

The ASR can also be biased for custom terms. For example, if the node asks "is your device blinking red or blue?", the user can be expected to respond with "red" or "blue". In that case, the ASR can be biased for those two terms, by typing each of them in the "Custom" field. As described previously, at each node the ASR can be configured to expect one or more of the following type of input for example:
  Yes/No
  Alphanumeric input (e.g., "D E C 1 3 4")
  Numeric input (e.g., "1234")
  Relative date (e.g., "tomorrow", "yesterday")
  Precise date (e.g., "the 4th of March 1984")
  Time (e.g., "5 pm")
  Name spelling (e.g., "S M I T H")
  Party size (eg., "for 4 people")
  Single number (e.g., "5")

The node's ASR configuration settings can be edited when creating the node, or after the platform has been deployed. For example, by conducting call reviews, a client may notice potential repeated issues with specific words, which can then be resolved by biasing the ASR to recognise those words at the relevant nodes. The project file 14 may be updated, and the updated project file deployed.

The NLU configuration settings can be edited by selecting NLU configuration. By editing these settings, the NLU can be configured to expect specific values, which in turn may increase its performance. For example, the NLU configuration settings may specify the requested slot (which is a used to set the binary "slot is requested" input to the value extraction model) or a list of one or more regular expressions, as has been described previously.

Figure 17:
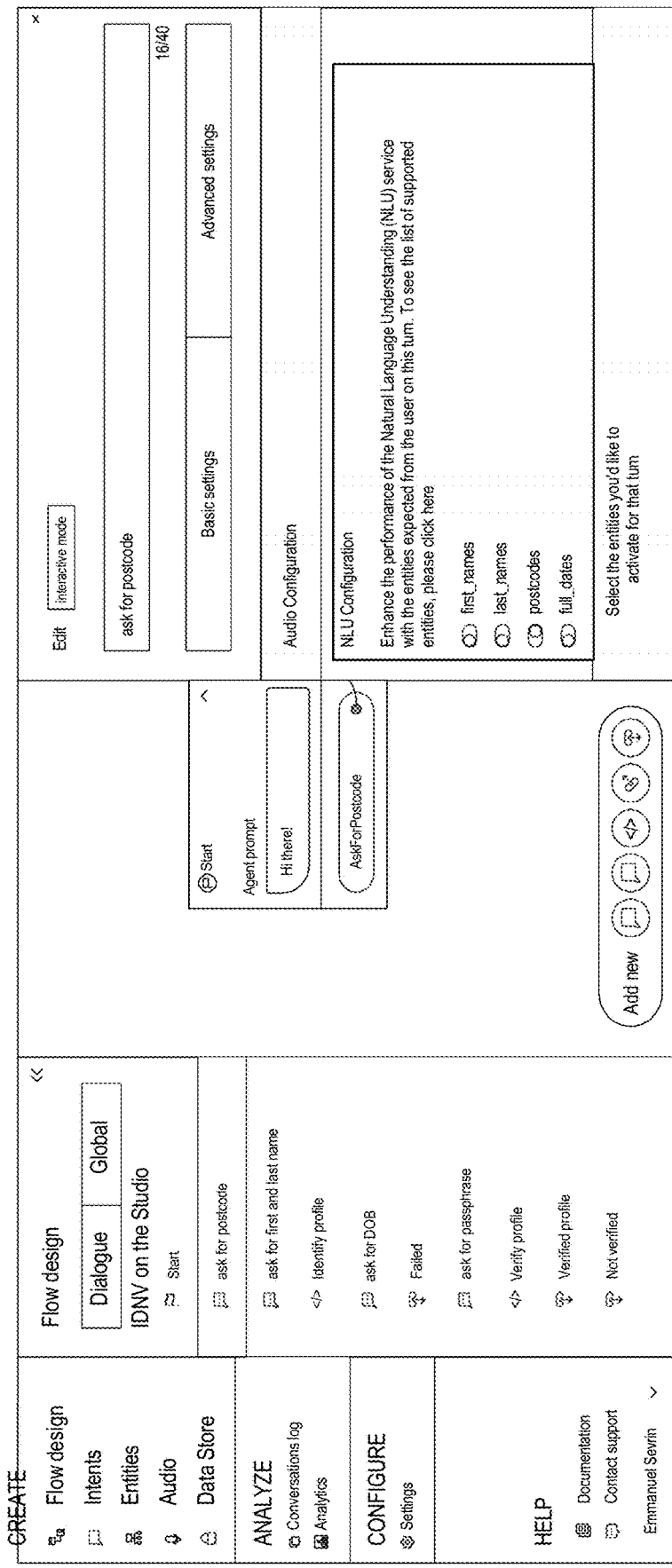
FIG. 17 shows an example interface provided to the second user to allow the second user to set the NLU configuration settings.

FIG. 17 shows an example interface provided to the second user to allow the second user to set the NLU configuration settings. By editing the NLU configuration settings, the client may instruct the NLU module 4 to expect a particular entity (slot) for a turn. For example, when asking the customer "what is your postcode", the NLU configuration settings can instruct the NLU to expect the postcode in the response.

In S4, recorded audio corresponding to the system utterance(s) for the new node created in S3 is uploaded. Alternatively, a TTS module may be used to generate the audio during the dialogue.

In S5, once the user clicks on test, the updated platform is tested in a sandbox using the test service 18. In this step, the second user may call the phone number associated with the project, and ask for the opening hours, to determine if the dialogue system provides the correct response.

In S6, the user then clicks on "Deploy" to deploy to the platform 1.

The "Analyze" functionality contains tools that enable developers to monitor the dialogue system behaviour after deployment and further fine-tune and optimise its performance. The anaylze function provides two core functionalities: reviewing conversations and conversation analytics.

In order to allow the second or third user to review conversations, conversation logs are stored in the project file 14. This allows the second and third user to view a list of all the conversations that first users have had with the dialogue system 100 using the project. In an example, it is also possible to filter the calls according to variant, outcome, and/or date, and annotate conversation issues.

In order to allow analytics, analysis of the dialogue system performance across different factors such as gender or age is also provided. This may be provided while maintaining anonymity of the callers.

The "Configure" functionality comprises a repository of resources available to set-up the dialogue manager 5b integration. In particular, the second or third user may access, add or change the phone numbers used by their projects. The second user may do this through phone number tabs provided in the GUI.

Three different environments are supported under the "Configure" functionality:

Sandbox: the first environment to test any change or feature the second or third user is currently working on. Since the creators might encounter bugs and issues when testing the first time, sandbox may be used for internal testing.

Pre-release: An intermediate environment where one can deploy an agent that is almost ready to be released as a live agent. Pre-release can be used to share a phone number with stakeholders, for example, or to test staging or live APIs.

Live: The environment used by the agent, deployed and receiving queries from first users. Once an agent in pre-release has been sufficiently tested, it is deployed live.

Multiple Projects

Figure 10C:
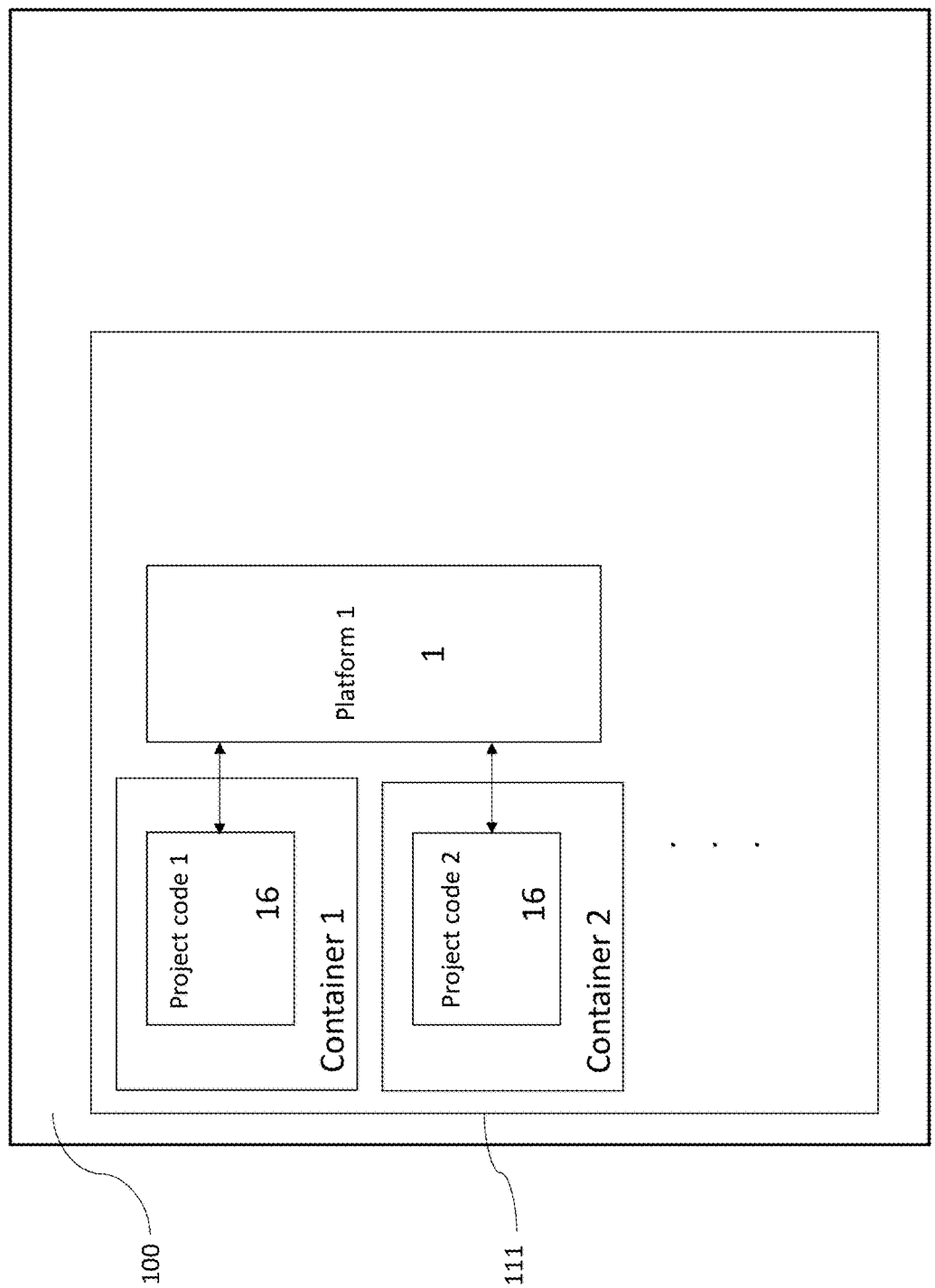
FIG. 10(c) shows a schematic illustration of a dialogue system 100, on which multiple projects are running.

FIG. 10(c) shows a schematic illustration of a dialogue system 100, on which multiple projects are running. As has been described previously, the code related to the dialogue manager 5b is running in a project-specific container. The project specific container comprises the project code 16. The project code 16 comprises a replica of the part of the platform code 1 related to the dialogue manager (e.g. the engine 44 and the identification and verification module 45). The other components such as telephony 2, NLU 4 and ASR 3 are provided in one shared platform code 1 running across all projects.

A single version of the platform code 1 is used for each project. However, each project may have a different project code 16. For example, project 1 comprises Project Code 1 v1 and Platform Code v1. Project 2 comprises of Project Code 2 v3 and Platform Code v1. Project 3 comprises of Project Code 3 v2 and Platform Code v1. A project may be implemented when the project code 16 and platform code 1 are coupled together.

Changes to the project file 14 are made on the project store 13. When a deploy command is received, the updated project file 14 is used to generate an updated project code 16. Changes to one project file 14 are independent of the other project files 14, and therefore each project can have its own development lifecycle and different users to manage them. However, each project uses the same platform code 1. If the platform code version needs to be updated, a platform engineer will push the changes to a staging environment, where tests are run against all projects that are using the platform code 1 to ensure backward compatibility, before launching the new version of the platform code 1 to all projects. An API gateway may be used for managing projects, which allows users to view projects, edit nodes and utterances, edit datasets and train new classifiers and value extractors, test changes in both a chat widget and via phone numbers, and manage deployments.

The platform 1 is a core, configurable, multi-tenant infrastructure that serves live calls from users through the first interface 8. Each project has associated dedicated phone number(s) with which they operate—the calls start when the user calls a particular phone number. All the project files 14 sit in the project store 13. A disambiguation based on the phone number called allows a call to be associated with the correct project. In some examples, one binary may execute in the handler 25 per project. Alternatively, a single handler is used for all of the projects. The same platform functionality is shared across multiple projects.

The platform code 1 provides an all-in-one voice assistant platform. It comprises various modules to allow for creating, maintaining, and improving voice assistants, including a dialogue management framework, a natural language understanding framework, and a conversational identification and verification framework. The platform also comprises endpoints for Session Initiation Protocol (SIP) and media streaming integration, automatic phone number procurement, and configurable speech endpoint.

The dialogue program 12 also provides native git version control, call review and dashboard.

Example Dialogue

Figure 7:
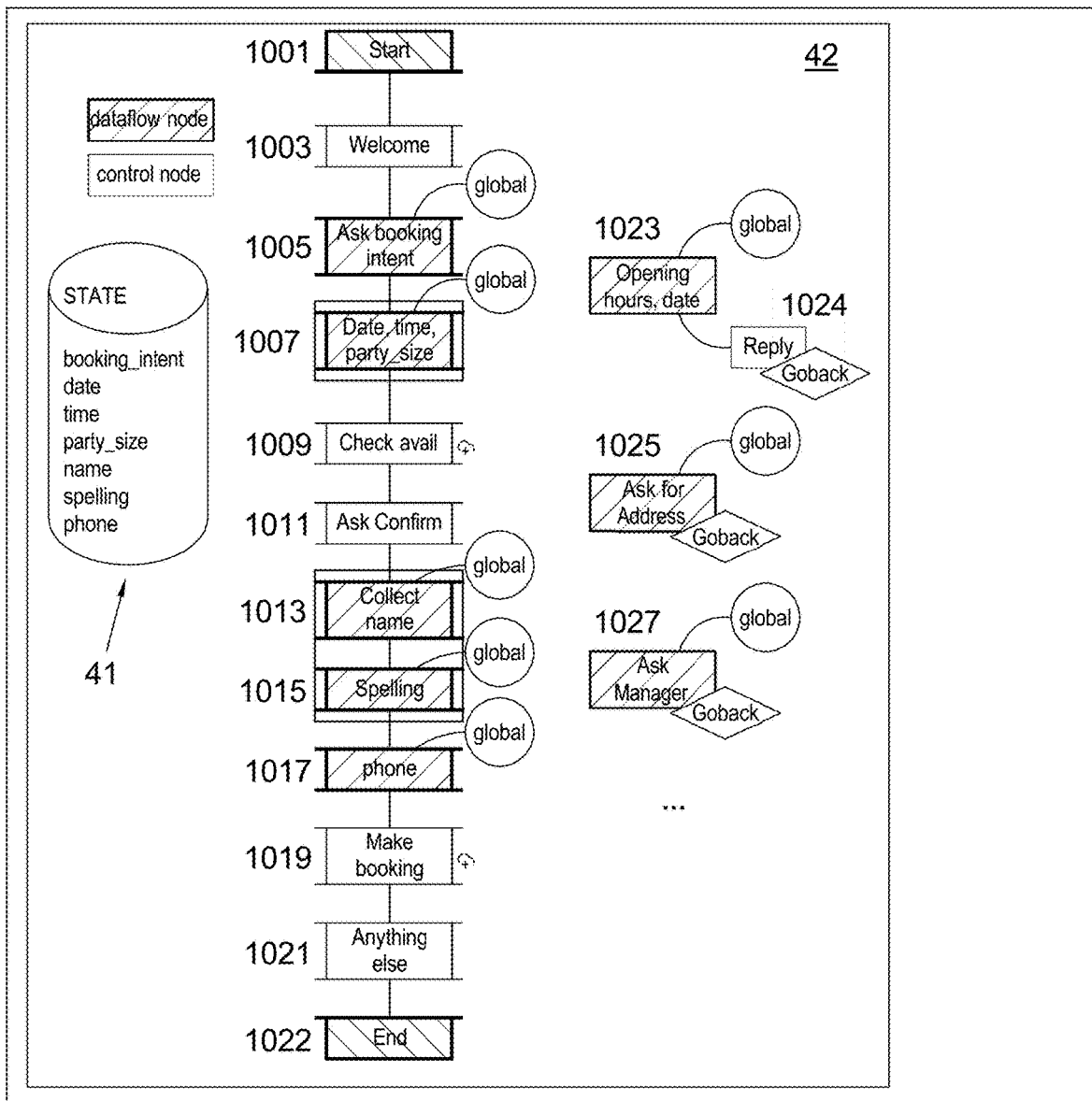
FIG. 7 shows a schematic illustration of various components of an example project dialogue manager 5*b*, used for a booking task in the restaurant domain.

FIG. 7 shows a schematic illustration of various components of an example project dialogue manager 5b, used for a booking task in the restaurant domain. The dialogue manager 5b comprises stored information relating to the dialogue 41, as has been described previously. The dialogue state information 55 comprises a plurality of slots. The dialogue state information 55 in this example comprises the following slots: date, time, party_size, name, spelling, and phone. The dialogue state information 55 further comprises information about the intent.

The dialogue manager 5b further comprises flows 42 comprising a plurality of nodes. In this example, the flows 42 comprise the following nodes.

Start node 1001: comprises a transition function "start node→welcome node";

Welcome node 1003: comprises a say function and a transition function "welcome node→ask booking intent node";

Ask booking intent node 1005: comprises a say function, a listen function and a transition function "ask booking intent node→date, time, party_size node";

Date, time, party_size node 1007: comprises a say function, a listen function and a transition function "date, time, party_size node→check availability";

Check availability node 1009: comprises a call function and a transition function "check availability→ask confirm";

Ask confirm node 1011: comprises a say function, a listen function and a transition function "ask confirm→collect name";

Collect name node 1013: comprises a say function, a listen function and a transition function "collect name→spelling";

Spelling node 1015: comprises a say function, a listen function and a transition function "spelling→phone";

Phone node 1017: comprises a say function, a listen function and a transition function "phone→make booking";

Make booking node 1019: comprises a call function and a transition function "make booking→anything else";

Anything else node 1021: comprises a say function, a listen function and a transition function "anything else→end";

End node 1022: comprises no functions.

Each of the above nodes comprises a transition to a next node, where the transitions flow from the start node 1001 to the end node 1022. This is indicated in FIG. 7 by the solid lines between the nodes, which show the paths of the local transitions.

The flows 42 comprise a plurality of additional nodes, which are not accessed through local transitions, in other words they are not accessed through the transition function of another node:

Opening hours, date node 1023: comprises a transition function "opening hours, date→reply";

Ask for address node 1025: comprises a say function and a transition function "ask for address→Start";

Ask manager node 1027: comprises a call function and a transition function "ask manager→Start";

The reply node 1024 comprises a say function and a listen function, and a transition function "reply→Start".

In the figure, the cloud symbols next to some nodes ("Check Avail" and "Make Booking") represent API calls. API calls may be understood as communication with a third party (knowledge) database, from which information is queried and retrieved. The call function for these nodes is the API call.

The bounded boxes (e.g., the one around Date, Time, Party_size, or the one around Collect name+Spelling) are library modules that can be imported from a prebuilt set of subflows. This subflow set can also support other functionalities such as complete identification and verification, etc.

The following nodes are accessed through a local transition: Welcome node 1003, Check availability node 1009, Ask confirm node 1011, Make booking node 1019, Anything else node 1021, and Reply node 1024. The following nodes can be accessed through either a local transition or a global transition: Ask booking intent node 1005, Date, time, party_size node 1007, Collect name node 1013, Spelling node 1015, Phone node 1017, Opening hours date node 1023, Ask for address node 1025, and Ask manager node 1027.

Part of an example dialogue with a user will now be described.

The dialogue starts at the "start node" 1001, which is a skip node for all global rules. The transition function of the start node 1001 is therefore executed. The transition function of the start node 1001 is "start node→welcome node". From the start node 1001, the dialogue policy therefore transitions to a "welcome node" 1003, which may also be referred to as a "Greet node". This is a local transition.

It is checked whether the current node is a stop node. Since the "welcome node" 1003 is not a stop node, the dialogue continues. The say function of the "welcome node" 1003 corresponds to a system output of:

System: "Hi welcome to <restaurant name>".

The "welcome node" 1003 does not have a listen function, so this output is stored for now.

The list of global rules is assessed, to determine if any of the conditions are met. At this stage in the dialogue, none of the conditions are met. The transition function of the "welcome node" 1003 is therefore executed. The transition function of the "welcome node" 1003 is "welcome node→ask booking intent". This is a local transition.

From the "welcome node" 1003, the dialogue policy transitions to the "ask booking intent node" 1005. Since this node is not a stop node, the dialogue continues. The say function of the "ask booking intent node" 1005 is executed. The say function results in a system output of:

System: "I can make a booking or answer questions. How can I help?"

This is output together with the previously stored system output "Hi welcome to <restaurant name>". The "listen" function of the "ask booking intent node" is then performed. The user replies with:

User: "I want to book a table this Thursday for 2 people".

A transition is then made to the Start node 1001 and the next dialogue turn starts.

The list of global rules is assessed, to determine if any of the conditions are met. At this point in the dialogue, the conditions for the following global rules are met:

1. If "date" slot value is changed, then go to "date, time, party_size" node 1007;
2. If "party_size" slot value is changed, then go to "date, time, party_size" node 1007;

A global transition is therefore made to the "Date, time, party_size" node 1007. Since this node is not a stop node, the dialogue continues. A pre-condition for the "Date, time, party_size" node 1007 comprises:

If "date" slot is filled, then do not say "request date";
If "party_size" slot is filled, then do not say "request party size";
If "time" slot is filled, then do not say "request time".

In this case, the "date" and "party_size" slots are filled, therefore these values are not requested again. The "time" slot is not filled, and therefore the say function is executed at the "Date, time, party_size" node 1007. Since all of the pre-conditions are not fulfilled, therefore the say function is executed, and the system outputs:

System: "What time are you looking for?"

The "listen" function of the "Date, time, party_size" node 1007 is then performed. The user replies with:

User: "When do you open?"

A transition is then made to the Start node 1001 and the next dialogue turn starts.

The list of global rules is assessed, to determine if any of the conditions are met. At this point in the dialogue, the condition for the following global rule is met:

3. If "intent" is detected as "what are opening hours", then go to "opening hours, date" node 1023;

A global transition is therefore made to the "opening hours, date" node 1023. Since this node is not a stop node, the dialogue continues. The functions of the "opening hours, date" node 1023 are performed. There is no listen function for the "opening hours, date" node 1023. The transition function of the "opening hours, date" node 1023 is "opening hours, date node→reply node". This is a local transition.

Since the "reply node" 1024 is not a stop node, the dialogue continues. There is no pre-condition to be checked. The say and listen functions of the "reply node" 1024 are executed, and the system replies with:

System: "We are open from 9 am to 9 pm on Thursday".

As has been described above, the dialogue program 12 can be re-configured for a different language. In order to extend to a new language, the ASR module 3 and voice composer module 6 for the current language may be replaced with an ASR module and voice composer module configured for the new language. The NLU module 7 may be replaced with an NLU module configured for the new language, or a translation module may be provided, to translate the output of the new ASR module to the previous language before it is provided to the NLU module 7.

While certain examples have been described, these examples have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A dialogue system, comprising:
   a first input configured to obtain first input data relating to speech or text provided by a user through a first interface;
   a first output configured to provide first output data relating to speech or text information specified by a determined dialogue act through the first interface, the first input data and the first output data forming at least part of a dialogue between the dialogue system and the user;
   one or more processors, configured to:
      receive second input data through a second interface;
      store information specifying one or more configuration settings based on the second input data, the information comprising a set of one or more turn level configuration settings and a set of one or more project level configuration settings, wherein each turn level configuration setting of the set of one or more turn level configuration settings corresponds to a state from a plurality of states stored in a dialogue management module, wherein at least some of the plurality of states comprise information specifying a dialogue act and at least some of the plurality of states comprise transition information specifying a transition to another state, the transitions defining one or more dialogue pathways and the states defining points in the dialogue pathway, wherein a state corresponding to a turn level configuration setting stores information specifying the turn level configuration setting, and wherein each project level configuration setting of the set of one or more project level configuration settings is configured to be implemented for the entirety of a dialogue with the user other than at a point in the dialogue having a relevant turn level configuration setting; and
      perform a dialogue method using a dialogue platform, the dialogue method comprising:
         determining dialogue information from the first input data;
         determining a dialogue act based on the determined dialogue information using the dialogue management module, wherein determining the dialogue act comprises selecting a next state from the plurality of states stored in the dialogue management module, wherein selecting the next state comprises selecting a state which is specified by the transition information in a current state or selecting a state which is specified by a rule in a first set of one or more rules;
         determining whether the next state includes information specifying at least one turn level configuration setting;
         in response to the next state not including information specifying at least one turn level configuration setting, maintaining a configuration of the dialogue platform based at least in part on the set of one or more project level configuration settings,
         in response to the next state including information specifying at least one turn level configuration setting, updating the configuration of the dialogue platform for the next user input based at least in part on the specified at least one turn level configuration setting, thereby tailoring the configuration of the dialogue platform for the next user input.

2. The system of claim 1, wherein the dialogue platform comprises the first interface comprising a telephony module configured to process the first input data, a speech recognition module configured to convert input speech data to text data, a language module configured to determine the dialogue information, a voice composer module configured to generate first output data relating to speech from the determined dialogue act and an orchestrator module configured to provide data to and receive data from the telephony module, the speech recognition module, the dialogue management module and the voice composer module.

3. The dialogue system according to claim 2, wherein the language module is configured to determine an intent, wherein the second input data comprises information specifying one or more intents, and wherein the language module comprises an intent classifier that is trained based on the information specifying the one or more intents.

4. The dialogue system according to claim 2, wherein a first state of the plurality of states comprises stored information specifying a first turn level configuration setting based on the second input data which is a configuration setting of the orchestrator module.

5. The dialogue system according to claim 4, wherein the first turn level configuration setting specifies whether user input received during a time period when the dialogue management module is determining a dialogue act is processed by the dialogue management module.

6. The dialogue system according to claim 2, wherein the speech recognition module is configured to detect a language of the user input.

7. The dialogue system according to claim 1, wherein the one or more processors are further configured to include a state in the plurality of states based on the second input data.

8. The dialogue system according to claim 1, wherein the dialogue platform comprises a language module configured to determine the dialogue information from the first input data, and wherein a first state of the plurality of states comprises stored information specifying a first turn level configuration setting based on the second input data which is a configuration setting of the language module.

9. The dialogue system according to claim 8, wherein the first turn level configuration setting specifies a type of dialogue information.

10. The dialogue system according to claim 8, wherein the language module is configured to determine a value corresponding to one or more slots, wherein the first state specifies a dialogue act corresponding to a request for a value for a first slot and wherein the first turn level configuration setting specifies the slot.

11. The dialogue system according to claim 8, wherein the language module comprises a plurality of models, wherein the first turn level configuration setting specifies a model from the plurality of models to be used to determine the dialogue information for the next user input.

12. The dialogue system according to claim 1, wherein the dialogue platform comprises a speech recognition module configured to convert input speech data to text data and wherein a first state of the plurality of states comprises stored information specifying a first turn level configuration setting based on the second input data which is a configuration setting of the speech recognition module.

13. The dialogue system according to claim 12, wherein the first turn level configuration setting specifies one or more of: a first time period corresponding to a length of time in which a user speaks before an interjection, a second time period corresponding to a length of time to wait for a user input, a list of expected words or phrases, or a speech recognition model from a set of two or more speech recognition models in the speech recognition module to be used for the next user input.

14. The dialogue system according to claim 1, wherein the first interface comprises a telephony module, and wherein a first state of the plurality of states comprises stored information specifying a first turn level configuration setting based on the second input data which is a configuration setting of the telephony module.

15. The dialogue system according to claim 14, wherein the first turn level configuration setting of the telephony module comprises an indication of an expected channel for a user input.

16. The dialogue system according to claim 1, wherein the one or more processors are further configured to display a visual representation of the plurality of states through the second interface.

17. The dialogue system according to claim 16, wherein the second input data is received as an edit to the displayed representation of the plurality of states.

18. The dialogue system according to claim 1, wherein the one or more processors are further configured to:
receive third input data through a third interface, wherein the third interface is a command line interface; and
store information specifying one or more configuration settings based on the third input data.

19. A dialogue method, comprising:
receiving second input data through a second interface;
storing information specifying one or more configuration settings based on the second input data, the information comprising a set of one or more turn level configuration settings and a set of one or more project level configuration settings, wherein each turn level configuration setting of the set of one or more turn level configuration settings corresponds to a state from a plurality of states stored in a dialogue management module, wherein at least some of the plurality of states comprise information specifying a dialogue act and at least some of the plurality of states comprise transition information specifying a transition to another state, the transitions defining one or more dialogue pathways and the states defining points in the dialogue pathway, wherein a state corresponding to a turn level configuration setting stores information specifying the turn level configuration setting, and wherein each project level configuration setting of the set of one or more project level configuration settings is configured to be implemented for the entirety of a dialogue with the user other than at a point in the dialogue having a relevant turn level configuration setting;
receiving, by way of a first input, first input data relating to speech or text provided by a user through a first interface;
performing a dialogue method using a dialogue platform, the dialogue method comprising:
determining dialogue information from the first input data;
determining a dialogue act based on the determined dialogue information using the dialogue management module, wherein determining the dialogue act comprises selecting a next state from the plurality of states stored in the dialogue management module, wherein selecting the next state comprises selecting a state which is specified by the transition information in a current state or selecting a state which is specified by a rule in a first set of one or more rules;
outputting, by way of a first output, first output data relating to speech or text information specified by the determined dialogue act through the first interface, the first input data and the first output data forming at least part of a dialogue with the user;
determining whether the next state includes information specifying at least one turn level configuration setting;
in response to the next state not including information specifying at least one turn level configuration setting, maintaining a configuration of the dialogue platform based at least in part on the set of one or more project level configuration settings, and
in response to the next state including information specifying at least one turn level configuration setting, updating the configuration of the dialogue platform for the next user input based at least in part on the specified at least one turn level configuration setting, thereby tailoring the configuration of the dialogue platform for the next user input.

20. A non-transitory computer readable storage medium comprising computer readable code configured to cause a computer to perform a dialogue method comprising the following operations:
receiving second input data through a second interface;
storing information specifying one or more configuration settings based on the second input data, the information comprising a set of one or more turn level configuration settings and a set of one or more project level configuration settings, wherein each turn level configuration setting of the set of one or more turn level configuration settings corresponds to a state from a plurality of states stored in a dialogue management module, wherein at least some of the plurality of states comprise information specifying a dialogue act and at least some of the plurality of states comprise transition information specifying a transition to another state, the transitions defining one or more dialogue pathways and the states defining points in the dialogue pathway, wherein a state corresponding to a turn level configuration setting stores information specifying the turn level configuration setting, and wherein each project level configuration setting of the set of one or more project level configuration settings is configured to be implemented for the entirety of a dialogue with the user other than at a point in the dialogue having a relevant turn level configuration setting;
receiving, by way of a first input, first input data relating to speech or text provided by a user through a first interface;
performing a dialogue method using a dialogue platform, the dialogue method comprising:
determining dialogue information from the first input data;
determining a dialogue act based on the determined dialogue information using the dialogue management module, wherein determining the dialogue act comprises selecting a next state from the plurality of states stored in the dialogue management module, wherein selecting the next state comprises selecting a state which is specified by the transition information in a current state or selecting a state which is specified by a rule in a first set of one or more rules;
outputting, by way of a first output, first output data relating to speech or text information specified by the determined dialogue act through the first interface, the first input data and the first output data forming at least part of a dialogue with the user;

determining whether the next state includes information specifying at least one turn level configuration setting;

in response to the next state not including information specifying at least one turn level configuration setting, maintaining a configuration of the dialogue platform based at least in part on the set of one or more project level configuration settings, and in response to the next state including information specifying at least one turn level configuration setting, updating the configuration of the dialogue platform for the next user input based at least in part on the specified at least one turn level configuration setting, thereby tailoring the configuration of the dialogue platform for the next user input.

* * * * *